(12) United States Patent
Yoshida et al.

(10) Patent No.: US 7,999,879 B2
(45) Date of Patent: Aug. 16, 2011

(54) LIQUID CRYSTAL DISPLAY DEVICE

(75) Inventors: Hidefumi Yoshida, Kawasaki (JP);
Takashi Sasabayashi, Kawasaki (JP);
Arihiro Takeda, Kawasaki (JP);
Yasutoshi Tasaka, Kawasaki (JP);
Hideo Chida, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/716,920

(22) Filed: Mar. 12, 2007

(65) Prior Publication Data

US 2007/0159585 A1 Jul. 12, 2007

Related U.S. Application Data

(62) Division of application No. 10/109,446, filed on Mar. 28, 2002, now Pat. No. 7,209,205.

(30) Foreign Application Priority Data

Oct. 12, 2001 (JP) .................... 2001-316040

(51) Int. Cl.
*G02F 1/1343* (2006.01)
*G02F 1/1337* (2006.01)
(52) U.S. Cl. .................... 349/39; 349/129; 349/139
(58) Field of Classification Search ............ 349/42–43, 349/138–139, 38–39, 129
See application file for complete search history.

(56) References Cited

U.S. PATENT DOCUMENTS

| 5,309,264 A | 5/1994 | Lien et al. |
|---|---|---|
| 5,899,548 A | 5/1999 | Ishiguro |
| 5,917,563 A | 6/1999 | Matsushima |
| 6,172,728 B1 | 1/2001 | Hiraishi |
| 6,266,064 B1 | 5/2001 | Shimada et al. |
| 6,281,956 B1 | 8/2001 | Ohmuro et al. |
| 6,285,430 B1 | 9/2001 | Saito |
| 6,330,108 B1 | 12/2001 | Nishikouji et al. |
| 6,339,460 B1 | 1/2002 | Saitoh |
| 6,452,657 B1 | 9/2002 | Suzuki et al. |
| 6,501,524 B1 | 12/2002 | Yoshida et al. |
| 6,504,589 B1 | 1/2003 | Kashima et al. |
| 6,504,592 B1 | 1/2003 | Takatori et al. |
| 6,512,564 B1 | 1/2003 | Yoshida et al. |
| 6,642,984 B1 | 11/2003 | Yoshida et al. |
| 6,671,019 B1 | 12/2003 | Petschek et al. |
| 6,768,530 B2 | 7/2004 | Matsuyama et al. |

(Continued)

FOREIGN PATENT DOCUMENTS

JP 01-270024 10/1989

(Continued)

*Primary Examiner* — Dung T. Nguyen
(74) *Attorney, Agent, or Firm* — Greer, Burns & Crain, Ltd

(57) ABSTRACT

A liquid crystal display device is provided which has a pair of substrates and a liquid crystal layer sandwiched between the pair of substrates, in which liquid crystal molecules are vertically aligned with respect to the substrates when no voltage is applied between the substrates and the liquid crystal molecules tilt in a plurality of directions to be almost parallel to the substrates by applying a voltage between the substrates. In the liquid crystal layer, when the voltage is applied, a proportion of a region where the liquid crystal molecules tilt in a direction of 0 degrees to 180 degrees is different from a proportion of a region where the liquid crystal molecules tilt in a direction of 180 degrees to 360 degrees with the angle being defined counterclockwise with the right direction on a screen being 0 degrees.

4 Claims, 53 Drawing Sheets

U.S. PATENT DOCUMENTS

| | | |
|---|---|---|
| 6,812,986 B2 | 11/2004 | Takatori et al. |
| 6,927,822 B2 | 8/2005 | Matsuyama et al. |
| 7,190,429 B2 | 3/2007 | Yoshida et al. |
| 7,212,270 B2 | 5/2007 | Takatori et al. |
| 7,414,682 B2 * | 8/2008 | Shiota et al. .......... 349/114 |
| 2001/0006408 A1 | 7/2001 | Matsuyama et al. |
| 2002/0110651 A1 | 8/2002 | Suzushi |
| 2002/0159018 A1 | 10/2002 | Kataoka et al. |
| 2003/0025865 A1 | 2/2003 | Takatori et al. |
| 2003/0071774 A1 | 4/2003 | Hanaoka et al. |
| 2003/0095400 A1 | 5/2003 | Kashima et al. |
| 2003/0193625 A1 | 10/2003 | Yoshida et al. |
| 2004/0066480 A1 | 4/2004 | Yoshida et al. |
| 2004/0218128 A1 | 11/2004 | Matsuyama et al. |
| 2005/0036096 A1 | 2/2005 | Takatori et al. |
| 2007/0165172 A1 | 7/2007 | Takatori et al. |

FOREIGN PATENT DOCUMENTS

| | | |
|---|---|---|
| JP | 6-118406 | 4/1994 |
| JP | 7-253573 | 10/1995 |
| JP | 8-122813 | 5/1996 |
| JP | 9-329801 | 12/1997 |
| JP | 10-153782 | 6/1998 |
| JP | 10-221704 | 8/1998 |
| JP | 10-239692 | 9/1998 |
| JP | 10-319233 | 12/1998 |
| JP | 11-095208 | 4/1999 |
| JP | 11-133429 | 5/1999 |
| JP | 3006643 | 11/1999 |
| JP | 2000-39610 | 2/2000 |
| JP | 2000-056305 | 2/2000 |
| JP | 2000-137116 | 5/2000 |
| JP | 2000-193938 | 7/2000 |
| JP | 2000-193962 | 7/2000 |
| JP | 2000-193976 | 7/2000 |
| JP | 2000-267101 | 9/2000 |
| JP | 2000-292795 | 10/2000 |
| JP | 2000-305100 | 11/2000 |
| JP | 2001-066598 | 3/2001 |
| JP | 2001-174824 | 6/2001 |
| JP | 2001-264784 | 9/2001 |
| JP | 2001-281690 | 10/2001 |
| KR | 1998-071427 | 10/1998 |
| KR | 2001-30475 | 4/2001 |

* cited by examiner

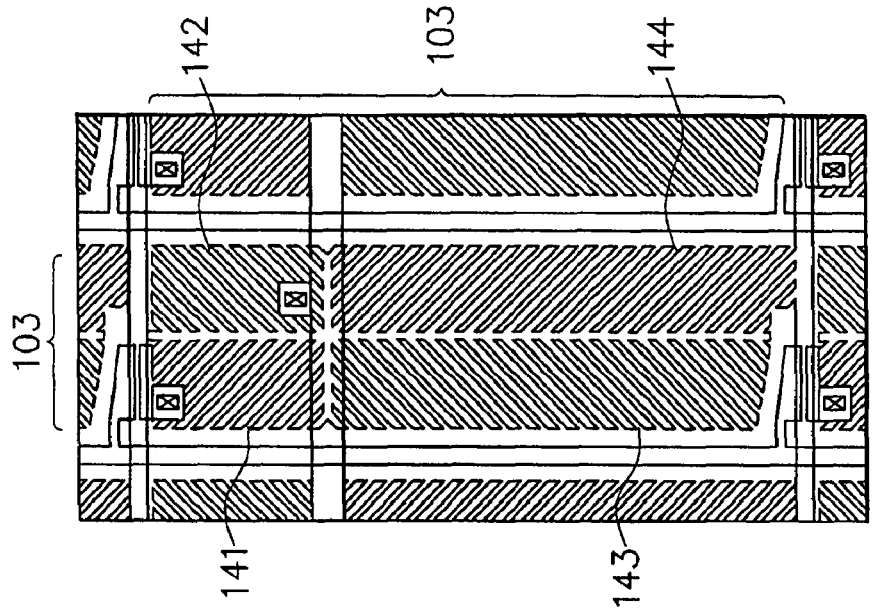
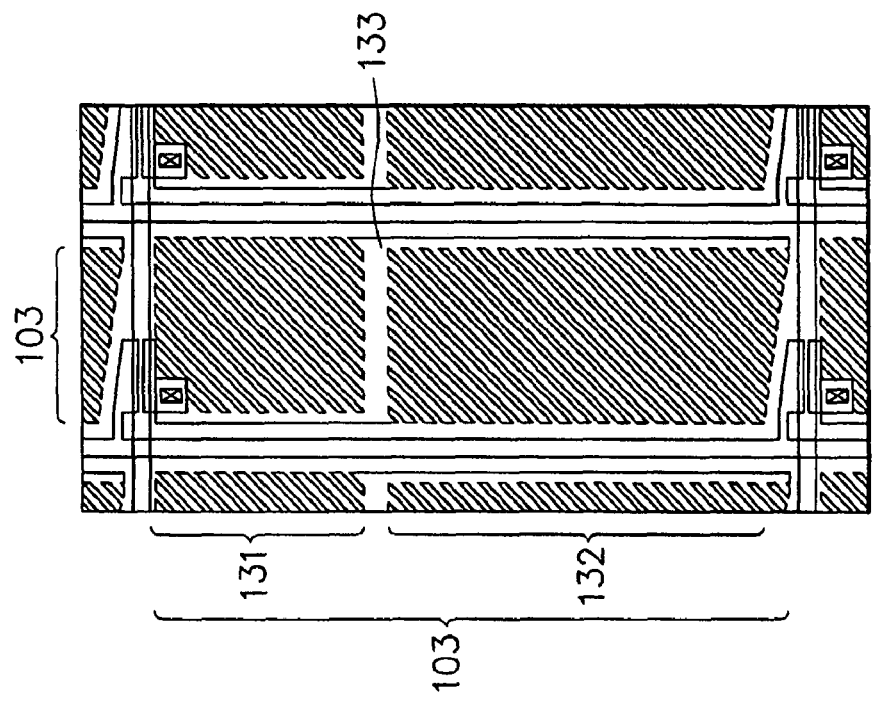

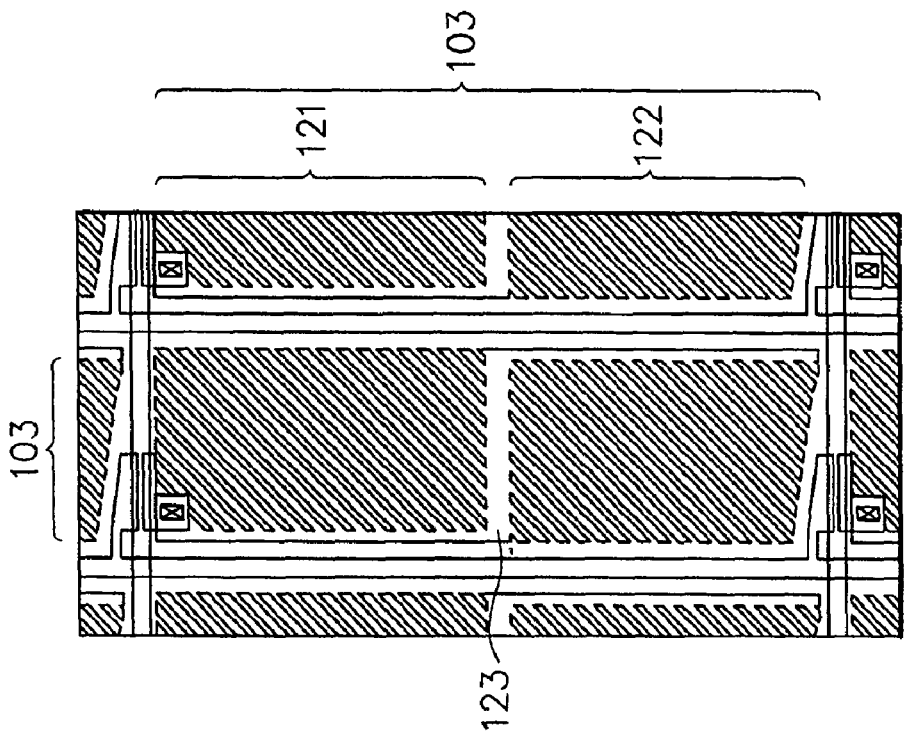
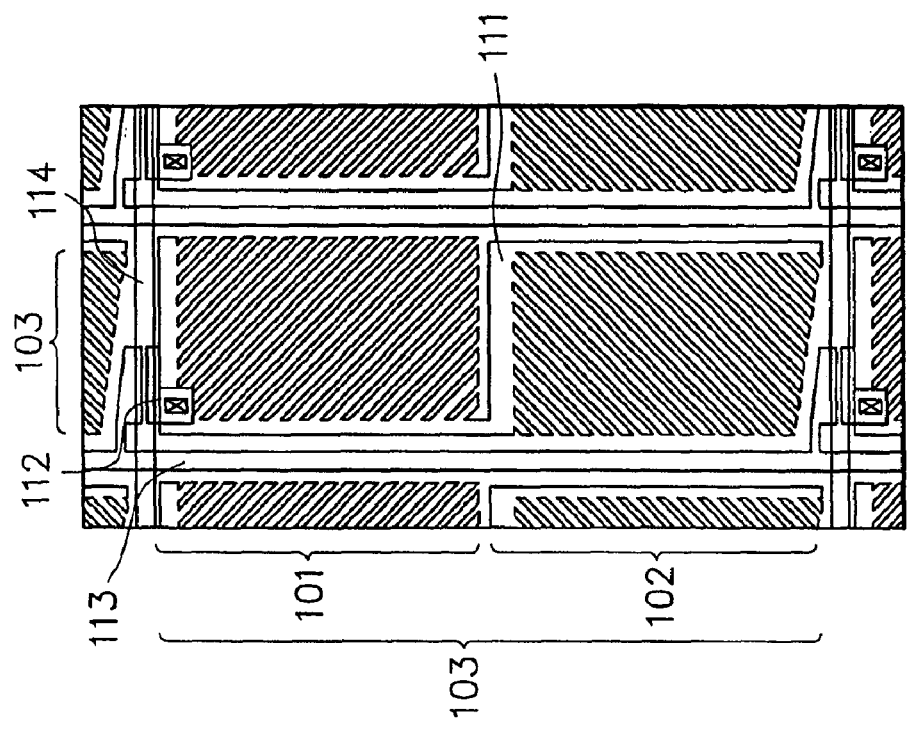

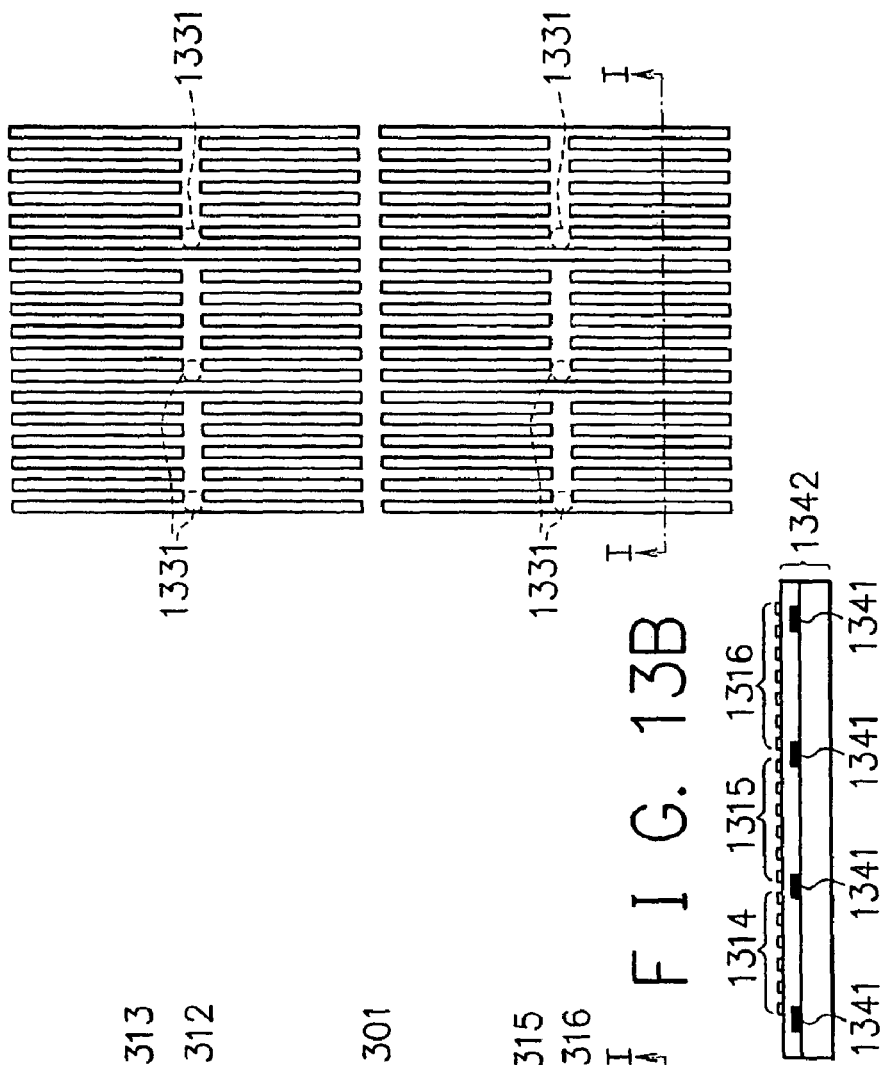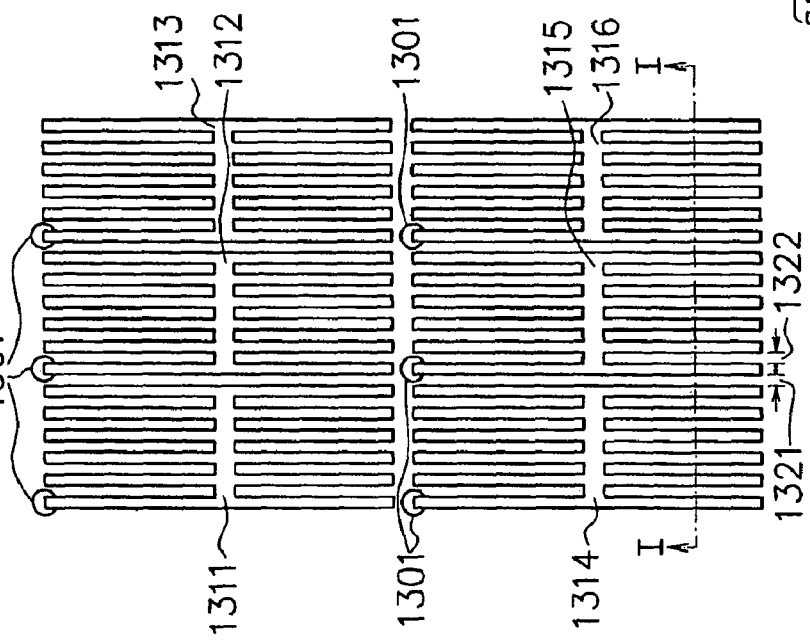

F I G. 16
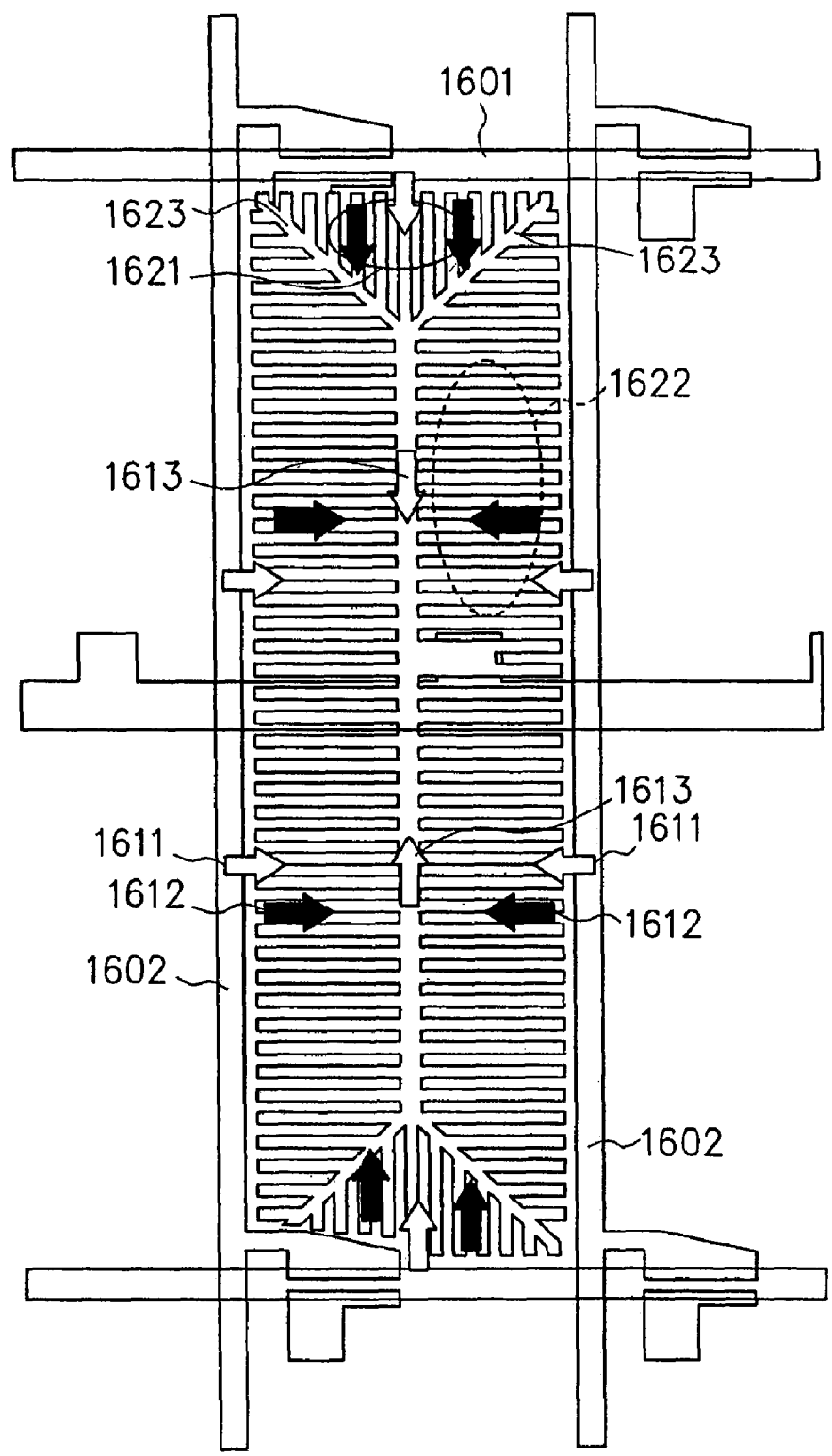

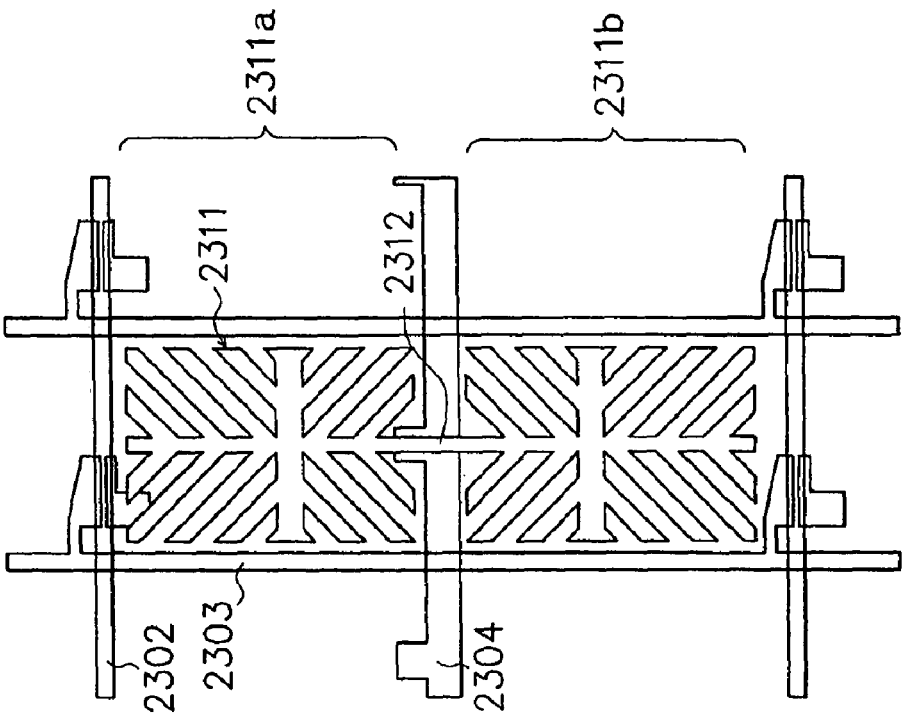
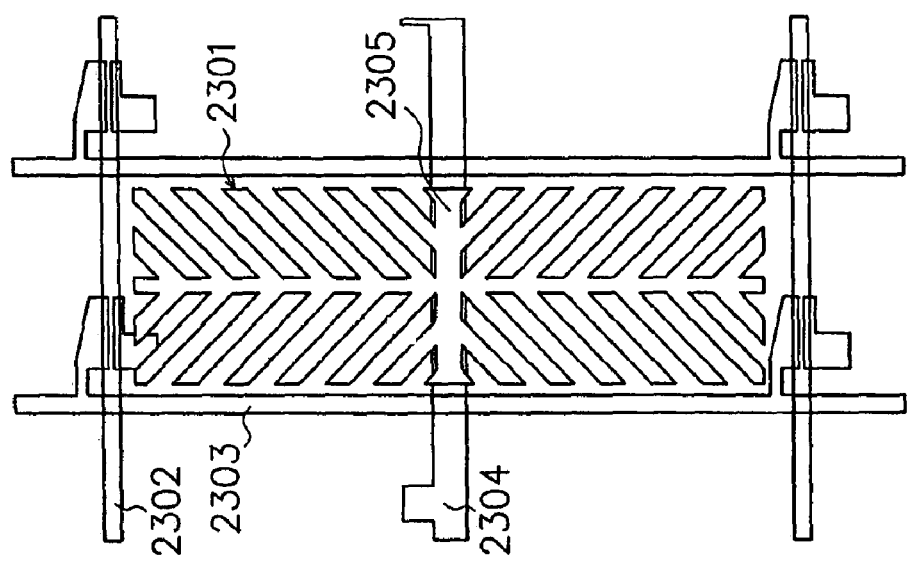

FIG. 30A
FIG. 30B
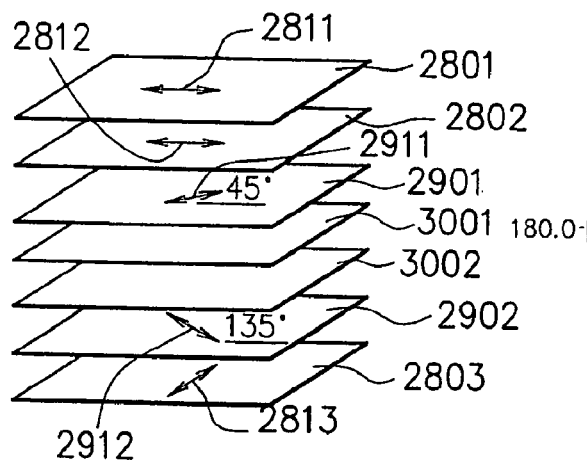
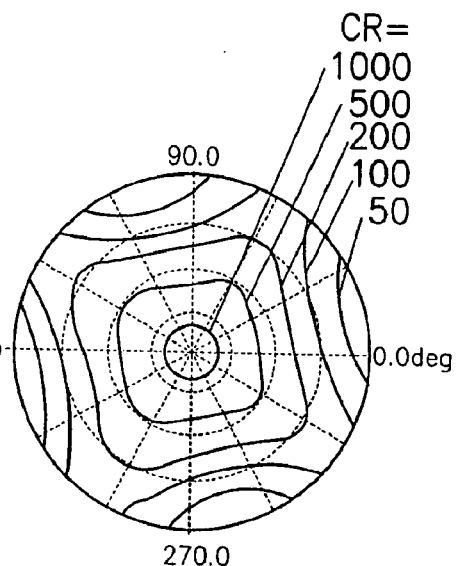
FIG. 31A
FIG. 31B
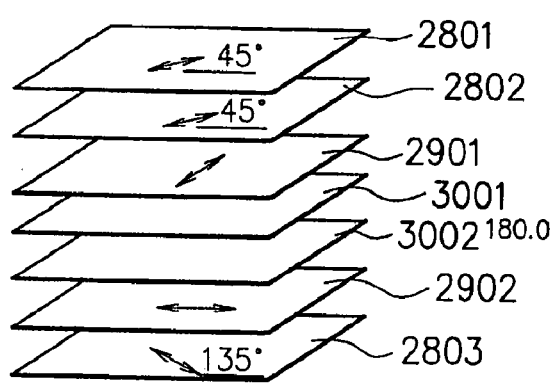
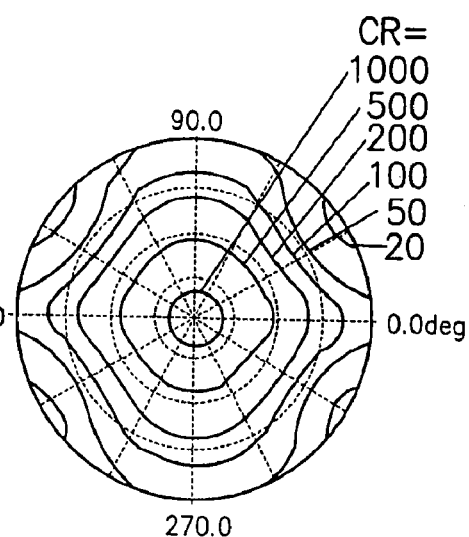

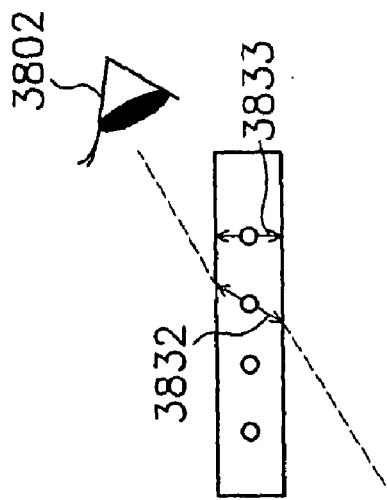
F I G. 38A
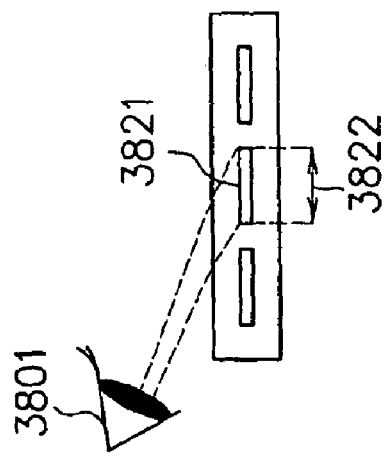
F I G. 38B
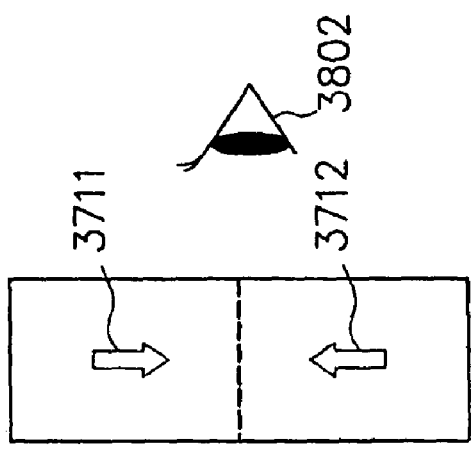
F I G. 38C

FIG. 44A
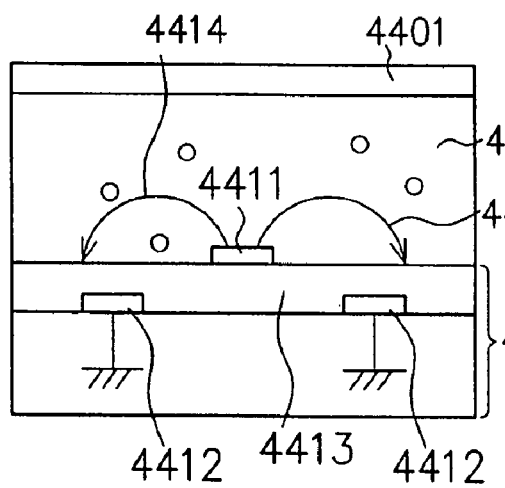
FIG. 44B
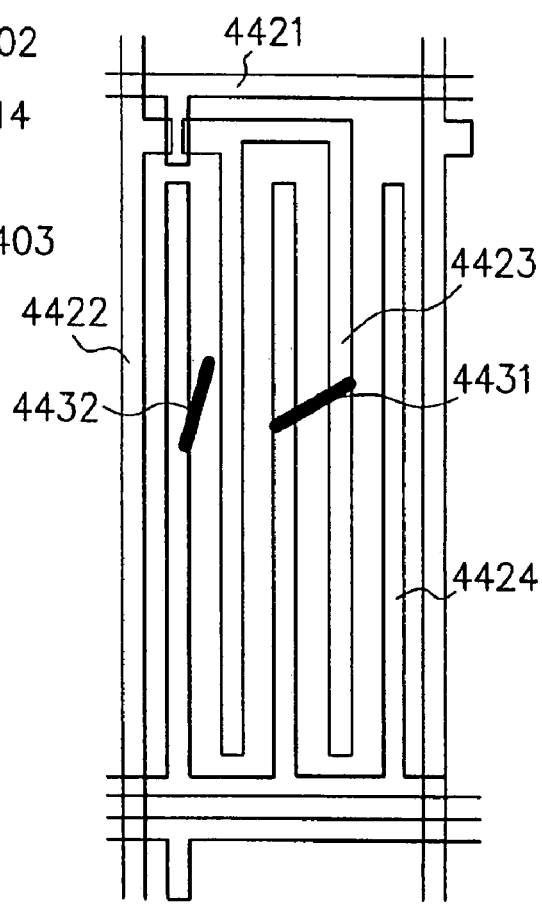
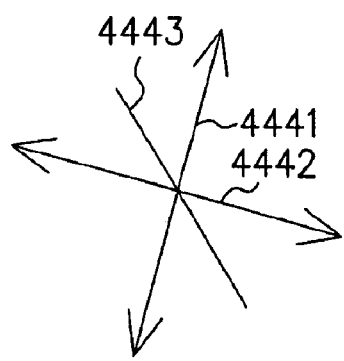

F I G. 54
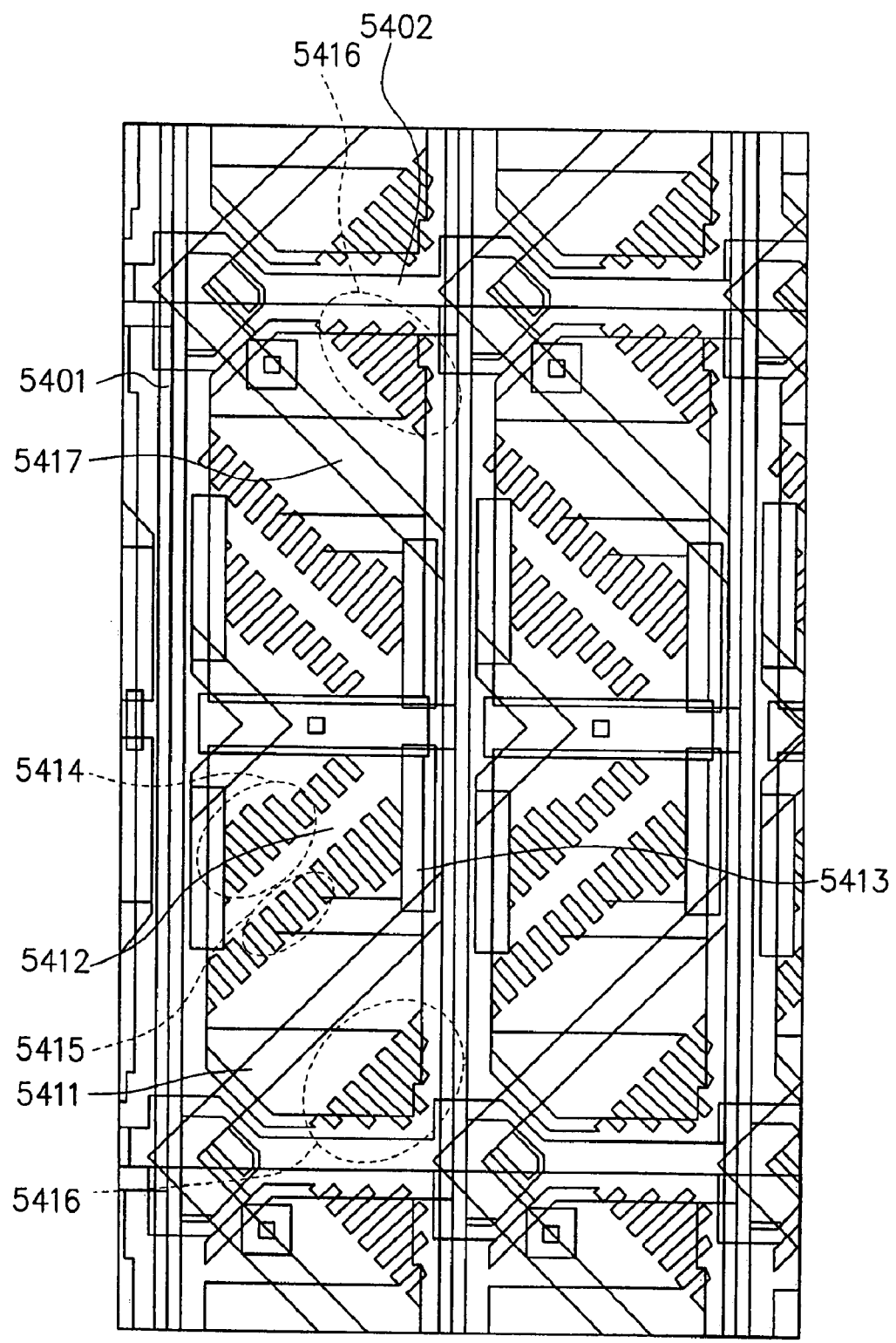

F I G. 60
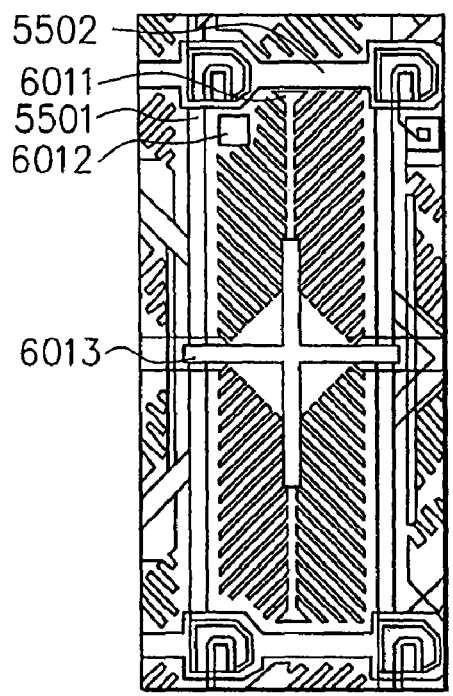
F I G. 61
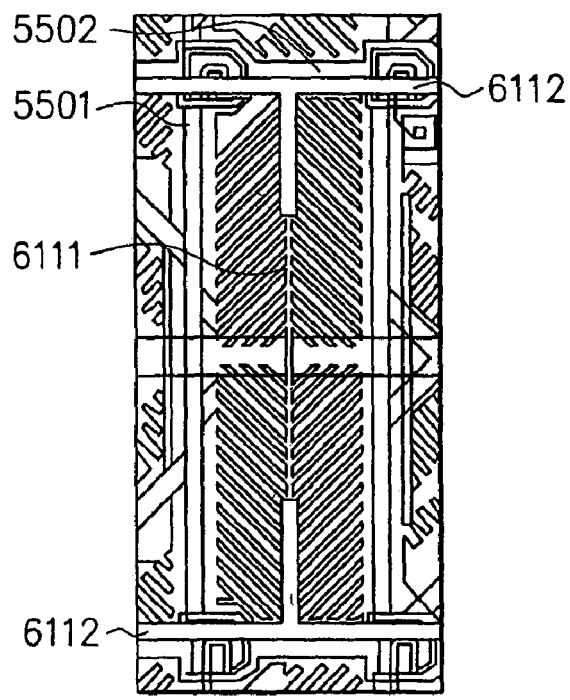

LIQUID CRYSTAL DISPLAY DEVICE

CROSS-REFERENCE TO RELATED APPLICATIONS

This application is a divisional application of Ser. No. 10/109,446, filed Mar. 28, 2002 now U.S. Pat. No. 7,209,205, which is based upon and claims priority of Japanese Patent Application No. 2001-316040, filed on Oct. 12, 2001, the contents being incorporated herein by reference.

BACKGROUND OF THE INVENTION

1. Field of the Invention

The present invention relates to a liquid crystal display device.

2. Description of the Related Art

In recent years, liquid crystal display devices have been broadly used in various applications taking advantage of their thin-profile and light weight, low voltage drive, low power consumption and so on. Display characteristics comparable to those of CRT are realized in the liquid crystal display devices, so that they have been used for application such as monitors and televisions for which CRTs are conventionally mainly used.

The liquid crystal display devices have been improved in terms of upsizing, gray-scale display, and high contrast to be used as monitors of computers or image display devices of televisions. In such applications, it is necessary that the liquid crystal display device can be viewed from any direction.

As a technology for realizing this wide viewing angle, an MVA (Multi-domain Vertical Alignment) mode liquid crystal display device is proposed from Fujitsu Co., Ltd.

A configuration of a basic principle of the MVA-mode liquid crystal display device is shown in FIGS. 2A and 2B. FIG. 2A shows the liquid crystal display device where no voltage is applied between substrates 201 and 202, and FIG. 2B shows the liquid crystal display device where a voltage is applied between the substrates 201 and 202. The substrate 201 is provided with protrusions 203, and the substrate 202 is provided with a protrusion 204. In FIG. 2A, liquid crystal molecules 212 are vertically aligned, and liquid crystal molecules 211 near the protrusions 203 and 204 are aligned with a tilt. In FIG. 2B, liquid crystal molecules 221 are aligned in accordance with the direction of electric fields. In other words, the liquid crystal molecules are vertically aligned where no voltage is applied thereto, and when a voltage is applied, the liquid crystal molecules tilt in four directions separately in four regions respectively. As a result of mixture of visual angle characteristics in the respective regions, a wide viewing angle can be obtained.

Fujitsu Co., Ltd. applied for the technology of further improving the visual angle characteristics of the MVA-mode liquid crystal display device (for example, Japanese Patent Laid-Open No. Hei 10-153782), and the technology of improving the display brightness (Japanese Patent Application No. 2001-106283).

It is desired to realize a wider viewing angle in the liquid crystal display device. Further, a liquid crystal display device with high brightness is desired. Furthermore, a liquid crystal display device having both a wide viewing angle and high brightness is desired.

SUMMARY OF THE INVENTION

It is an object of the present invention to provide a liquid crystal display device which realizes a wide viewing angle and/or high brightness.

According to an aspect of the invention, a liquid crystal display device is provided which has a pair of substrates and a liquid crystal layer sandwiched between the pair of substrates, in which liquid crystal molecules are vertically aligned with respect to the substrates when no voltage is applied between the substrates and the liquid crystal molecules tilt in a plurality of directions to be almost parallel to the substrates by applying a voltage between the substrates. In the liquid crystal layer, when the voltage is applied, a proportion of a region where the liquid crystal molecules tilt in a direction of 0 degrees to 180 degrees is different from a proportion of a region where the liquid crystal molecules tilt in a direction of 180 degrees to 360 degrees with the angle being defined counterclockwise with the right direction on a screen being 0 degrees.

The proportions of the region where liquid crystal molecules tilt in a direction of 0 degrees to 180 degrees and the region where liquid crystal molecules tilt in a direction of 180 degrees to 360 degrees are made different to be appropriate proportions, which makes it possible to perform a suitable display even if a screen is viewed from the top or the bottom direction.

According to another aspect of the invention, a liquid crystal display device is provided which has: a first and a second substrate; a liquid crystal layer sandwiched between the first and second substrates, in which liquid crystal molecules are vertically aligned with respect to the first and second substrates in a state where no voltage is applied between the first and second substrates; thin film transistors each provided on the first substrate and including a gate, a source, and a drain; gate lines each connected to the gate of the thin film transistor; data lines each connected to the source of the thin film transistor; and pixel electrodes each in a comb or a slit shape connected to the drain of the thin film transistor, directions of comb teeth thereof, near the gate line, extending toward the gate line and directions of comb teeth thereof, near the data line, extending toward the data line.

The shape of the pixel electrode is formed in accordance with the gate line and the data line, which allows the alignment directions of the liquid crystal molecules by the pixel electrode to match the alignment directions of the liquid crystal molecules by the gate line and the data line.

According to still another aspect of the invention, a liquid crystal display device is provided which has: a pair of polarizing layers having absorption axes perpendicular to each other; a half wave plate having a retardation of half wavelength sandwiched between the pair of polarizing layers; and a liquid crystal layer sandwiched between the pair of polarizing layers and having liquid crystal molecules capable of being vertically aligned.

The half wave plate, in which a film having a retardation of half wavelength is laminated, has a retardation $((nx+ny)/2-nz) \times d$ in a direction perpendicular to a film surface thereof (where nz is a refractive index in a direction perpendicular to the film surface, nx is a refractive index in a direction parallel to an optical axis of the film, ny is a refractive index in a film in-plane direction perpendicular to the optical axis of the film, and d is a thickness of the film) of 0 or ±20 nm or less, and the optical axis of the film are parallel or perpendicular to the absorption axis of the adjacent polarizing layer or, in which two films having a retardation of half wavelength are laminated, has values $(nx-nz)/(nx-ny)$ of the two films of 0.5 or less and 0.5 or more respectively, where nz is a refractive index in a direction perpendicular to the film surface, nx is a refractive index in a direction parallel to the optical axis of the film, and ny is a refractive index in a film in-plane direction perpendicular to the optical axis of the film, and the optical axes of the two films are parallel to each other and parallel or perpendicular to the absorption axis of the adjacent polarizing layer.

The half wave plate is provided between the pair of polarizing layers, which enables realization of a liquid crystal display device with a wide viewing angle and high brightness.

According to yet another aspect of the invention, a liquid crystal display device is provided which has: a first and a second polarizing plate; a liquid crystal layer sandwiched between the first and second polarizing plates and having liquid crystal molecules capable of being vertically aligned; and a retardation film having a retardation in a plane sandwiched between the first and second polarizing plates, provided such that an optical axis thereof is perpendicular to an absorption axis of an adjacent polarizing plate, and having a relationship of refractive indexes nx>nz>=ny (where nx is a refractive index in a direction of the optical axis, ny is a refractive index in an in-plane direction perpendicular to nx, and nz is a refractive index in a direction perpendicular to the plane).

A predetermined retardation film is provided between the first and second polarizing plates, which enables realization of a liquid crystal display device with a wide viewing angle and high brightness.

According to another aspect of the invention, a liquid crystal display device is provided which has: a cholesteric liquid crystal layer; a quarter wave plate; a backlight for supplying light; and a liquid crystal panel having liquid crystal molecules capable of being aligned. The cholesteric liquid crystal layer and the quarter wave plate are sandwiched between the backlight and the liquid crystal panel, and alignment directions of liquid crystal molecules of the liquid crystal panel and an optical axis of the quarter wave plate are perpendicular to each other.

The alignment directions of the liquid crystal molecules of the liquid crystal panel and the optical axis of the quarter wave plate are arranged perpendicular to each other, which can prevent coloring of the display screen even if it is viewed at an incline angle.

According to another aspect of the invention, a liquid crystal display device is provided which has: a liquid crystal panel in which a liquid crystal sealed between a pair of substrates; a pair of polarizing elements arranged on both sides of the liquid crystal panel such that absorption axes thereof are perpendicular to each other; and a domain control means including a periodical pattern of any of or a combination of a projection, a depression or a slit provided in an electrode, on a surface of at least one of the pair of substrates constituting the liquid crystal panel, for controlling alignment of liquid crystal molecules in the liquid crystal panel. Alignment directions of the liquid crystal molecules by the periodically disposed domain control means include directions to form angles of 45 degrees with the absorption axes of the polarizing elements and another direction, and the liquid crystal molecules are aligned almost perpendicular to the substrates when no voltage is applied thereto and the liquid crystal molecules are tilted by the domain control means in a plurality of directions in each pixel when a voltage is applied thereto.

By virtue of the domain control means, the alignment directions of the liquid crystal molecules include the directions to form angles of 45 degrees with the absorption axes of polarizing elements and another direction, which enables a display with high brightness.

According to another aspect of the invention, a liquid crystal display device is provided which has: two substrates having substrate surfaces subjected to vertical alignment processing; a negative type liquid crystal sandwiched between the substrates; and a domain control means for conducting control to provide a plurality of liquid crystal domain directions in each pixel including a first domain control means, provided in a part of the pixel or a peripheral region thereof, for varying an alignment direction of the liquid crystal in a range of 90 degrees to 180 degrees across a center of the partially provided domain control means, and a second domain control means for varying the alignment direction of the liquid crystal in a range of 0 degrees to 90 degrees.

Both the first and second domain control means are provided, which improves controllability of the alignment of the liquid crystal in the entire pixel.

BRIEF DESCRIPTION OF THE DRAWINGS

FIGS. 1A and 1B are views showing patterns of a pixel electrode according to a first embodiment of the present invention;

FIGS. 6A and 6B are views showing patterns of the pixel electrode;

FIGS. 13A and 13C are views showing patterns of the pixel electrodes, and FIG. 13B is a cross-sectional view of a TFT substrate;

FIG. 16 is a view showing a liquid crystal display device according to a second embodiment of the invention;

FIG. 23A is a view showing a configuration in which the electrode is obliquely formed, and FIG. 23B is a view showing a configuration utilizing the oblique electric field from the Cs line;

FIGS. 30A and 30B are views showing a film configuration and characteristics according to the embodiment;

FIGS. 31A and 31B are views showing a film configuration and characteristics according to the embodiment;

FIGS. 38A to 38C are views showing a problem of the two-domain alignment;

FIGS. 44A and 44B are views showing an IPS-mode liquid crystal display device;

FIG. 54 is a view showing a layout of the liquid crystal display device;

FIG. 60 is a view showing a layout of the liquid crystal display device;

FIG. 61 is a view showing a layout of the liquid crystal display device;

DETAILED DESCRIPTION OF THE PREFERRED EMBODIMENTS

First Embodiment

Figure 2A:
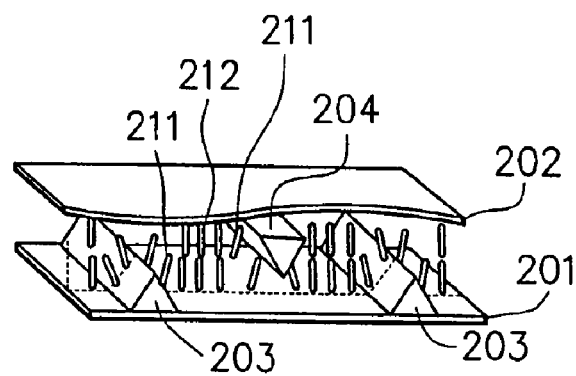
FIGS. 2A and 2B are perspective views showing a basic configuration of an MVA-mode liquid crystal display device.
Figure 2B:
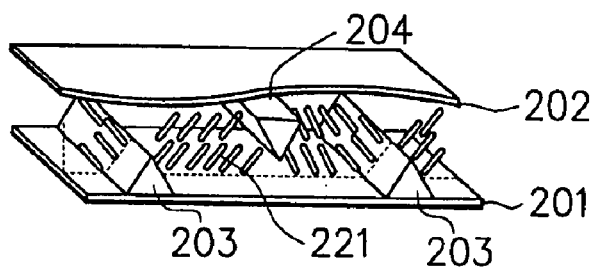
Figure 3:
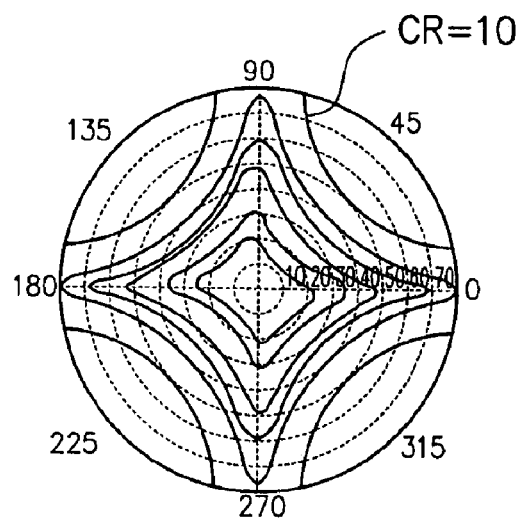
FIG. 3 is a view showing visual angle characteristics of the contrast between black and white of the MVA-mode liquid crystal display device.

FIG. 3 shows visual characteristics of the contrast between black and white of an MVA-mode liquid crystal display device (LCD). As for indication of angles on a circumference of a circle in FIG. 3, 0° indicates the right, 90° the top, 180° the left, and 270° the bottom. The horizontal and vertical axes indicate an angle inclined from a display surface with its center indicating 0 degrees. A black and white viewing angle of a contrast 10 (CR=10) or more is achieved at visual angles in the top and bottom and right and left directions even at an inclined angle of 80 degrees.

When a halftone is displayed, however, a phenomenon is observed in which while a normal display is viewed from the front, the whole surface becomes whitish with a lowered contrast when viewed at a visual angle in the bottom direction. We discovered that the phenomenon of becoming whitish is peculiar to the MVA-mode or a vertical alignment-mode panel, or a multi-domain type panel.

Figure 4A:
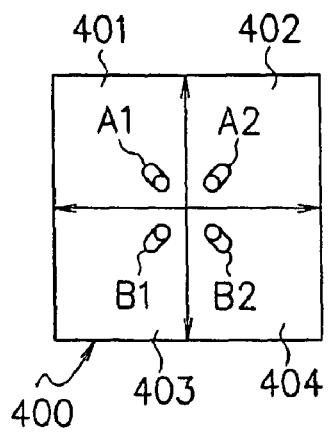
FIGS. 4A to 4C are views for explaining the reason of occurrence of a phenomenon that a display surface becomes whitish and the principle thereof.
Figure 4B:
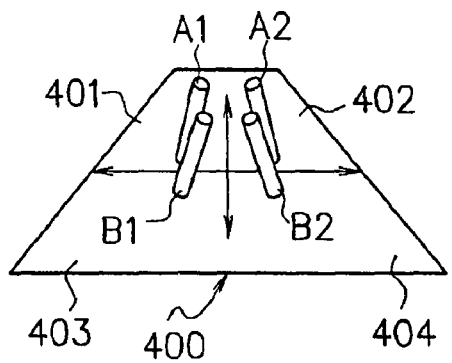
Figure 4C:
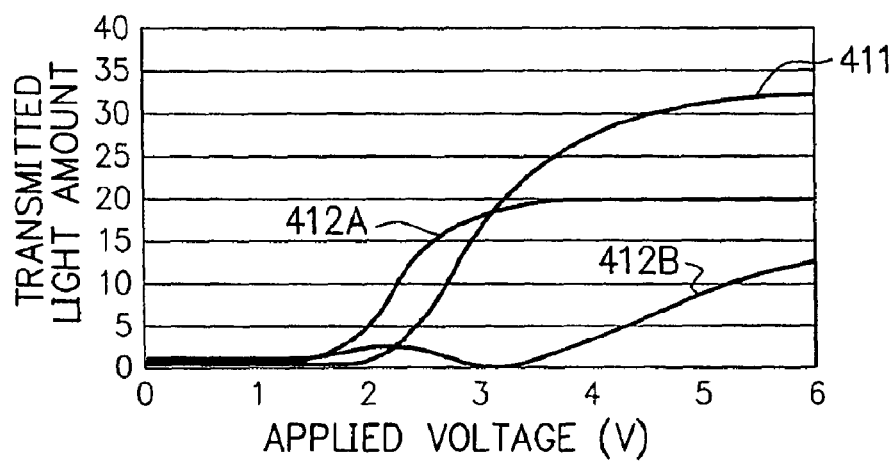

Explanation is made with reference to FIGS. 4A to 4C. FIG. 4A is a view of the display surface observed from the front. A case in which a liquid crystal display device 400 is divided into four domains 401 to 404 is explained. In a state that no light leaks because no voltage is applied or liquid crystal are almost vertically aligned, light leakage in black is considerably little even at an inclined visual angle. In the domains 401, 402, 403, and 404, liquid crystal molecules A1, A2, B1 and B2 tilt in different directions respectively. The liquid crystal molecules A1, A2, B1 and B2 are almost vertical and have a low birefringence within a low voltage range.

FIG. 4B is a view of the display surface observed from this side (at a visual angle in the bottom direction). The liquid crystal molecules substantially lie at an inclined visual angle.

Because the liquid crystal molecules form a slight angle with a polarizing plate, a birefringence occurs to cause light leakage.

In FIG. 4C, the horizontal axis indicates an applied voltage and the vertical axis indicates the amount of transmitted light. A characteristic line 411 shows characteristics when the display surface is observed from the front as shown in FIG. 4A. A characteristic line 412A shows characteristics of the liquid crystal molecules B1 and B2 when observed from this side as shown in FIG. 4B. A characteristic line 412B shows characteristics of the liquid crystal molecules A1 and A2 when observed from this side as shown in FIG. 4B.

When a dark gray-scale is displayed with the voltage slightly exceeding the threshold value, the amount of transmitted light increases as shown in FIG. 4C. This is because projection axes out of axes of the tilted liquid crystal molecules deviate from a projection axis of the polarizing plate as shown in FIG. 4B. This phenomenon occurs in the same manner in either the liquid crystal molecules located in an upper half part of a pixel or the liquid crystal molecules located in a lower half part of the pixel. Here, a case is considered in which some optical substance is inserted therein to correct the light leakage. In this case, it is possible to compensate a dark halftone but, on the other hand, unintended optical effects may be produced when a black display is performed. This may produce black floating at an inclined visual angle, which narrows its good contrast visual angle range.

The aforementioned problem is solved by basically breaking the ratio between a region where the liquid crystal molecules tilt in the upper (including the top right and the top left) direction and a region where the liquid crystal molecules tilt in the lower (including the bottom right and the bottom left) direction.

Figure 5A:
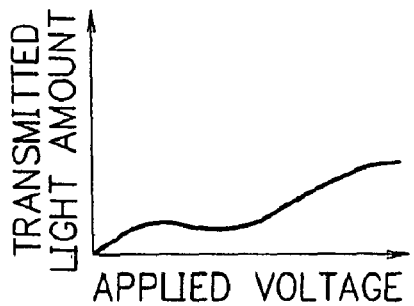
FIGS. 5A and 5B are views showing the transmitted light amount-applied voltage characteristics.

FIG. 5A shows the transmitted light amount-applied voltage (T-V) characteristics when the ratio is 1:1 between the regions of the liquid crystal molecules A1 and A2 and the regions of the liquid crystal molecules B1 and B2. In this case, the characteristic line loses its shape, and the display surface becomes whitish.

Figure 5B:
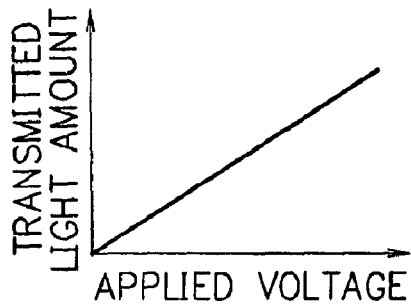

FIG. 5B shows the T-V characteristics when the ratio between the regions of the liquid crystal molecules A1 and A2 and the regions of the liquid crystal molecules B1 and B2 is adjusted to an appropriate value. The amount of transmitted light is almost proportional to the applied voltage to allow a suitable display.

FIGS. 6A and 6B show a configuration when alignment control is conducted by fine slits. In FIG. 6A, the configuration is made for all the liquid crystal molecules to tilt in a lower direction on a screen. One pixel region 103 is divided into two alignment regions 101 and 102. The pixel region 103 is provided corresponding to a gate line 114 and a data line 113. The pixel region 103 is constituted of an ITO (indium tin oxide) transparent electrode 111. The transparent electrode 111 is provided with a contact region 112 for connecting to a drain of a thin film transistor (TFT). The ratio between the alignment regions 101 and 102 is 1:1. In FIG. 6B, the ratio is set to 1:1 between a region 121 where the liquid crystal molecules tilt in the upper direction and a region 122 where the liquid crystal molecules tilt in the lower direction. The alignment in the regions 121 and 122 is controllable by the direction of slits of a transparent electrode 123.

In FIG. 1A, the shape of a transparent electrode 133 is changed, in which the ratio is set to 1:3 between a region 131 where the liquid crystal molecules tilt in the upper direction and a region 132 where the liquid crystal molecules tilt in the lower direction. Thus, as for the directions of the liquid crystal molecules tilting, the ratio of the regions is normally set to 1:1 but is, with their balance intentionally broken, set to 1:X (X<>1).

When the balance is broken as above, the ratio in superimposing the T-V characteristics at the visual angle in the top direction on those at the visual angle in the bottom direction shown in FIG. 4C is changed as a result. In this event, the T-V characteristics are the sum of the two T-V characteristic lines 412A and 412B shown in FIG. 4C corresponding to the aforesaid ratio. Here, in the case where the region shown by the characteristic line 412A in FIG. 4C is increased, while its blackish image becomes entirely whitish, the black and white contrast is balanced, so that an excellent display is achieved by virtue of the contrast. On the other hand, in the case where the region shown by the characteristic line 412B is increased, its blackish image is entirely filled in black and can be partially inverted. The blackish image, however, does not become whitish but still remains black. In the case where the effect of the characteristic line 412A and the effect of the characteristic line 412B are completely mixed 1:1, both excellent characteristics are cancelled each other, which makes it difficult to achieve excellent visual angle characteristics. It was found that, however, an excellent display can be attained by adjusting the ratio, especially by setting the proportion of the region of the characteristic line 412A to 70%±20% of the whole.

FIGS. 6A and 6B are explained in more detail. It should be noted that description is made with "gridiron shape" being regarded the same as "comb shape" in this specification. FIG. 6A shows an example in which all the liquid crystal molecules are aligned downward. The transparent electrode formed on the TFT substrate is patterned. The transparent electrode 111 is provided in a comb shape here. The pixel is divided here into the two regions 101 and 102, in which teeth of the comb are set to extend to the bottom right in the upper half part. On the other hand, teeth of the comb are set to extend to the bottom left in the lower half part. Here, the width of each electrode of the comb tooth is set to 3 µm, and the gap between the comb teeth is set to 3 µm. FIG. 6B shows a case in which its aperture ratio is set to the maximum and the ratio between the upper and lower parts is made 1:1.

FIG. 1A shows an example in which the ratio between the upper and lower parts is changed while the aperture ratio is set to the maximum. The ratio between the upper and lower parts is changed without changing the basic configuration in FIG. 6B. The ITO electrodes in the comb-teeth shape are set, from the ITO electrode pattern, in the top right direction in the upper region 131 and set in the bottom left direction in the lower region 132. Here, the ratio of the upper region 131 is set to 30% of the whole.

FIG. 1B shows an example in which an ITO electrode pattern is vertically provided at the middle in the horizontal direction of the pixel and the proportions between the upper and lower parts are changed. The pixel region 103 is divided into four regions 141 to 144. The ITO electrodes in the comb-teeth shape are set, from this ITO electrode pattern, in upper directions in the upper side regions 141 and 142 and in lower directions in the lower side regions 143 and 144. The manner of extending the ITO electrodes in the comb-teeth shape is set such that arms are stretched upward on the upper side of the pixel. On the other hand, the form is set such that both arms are put down while spreading to the right and left on the lower side of the pixel. Here, the proportion of the upper side regions 141 and 142 is set to 30% of the whole.

Figure 8A:
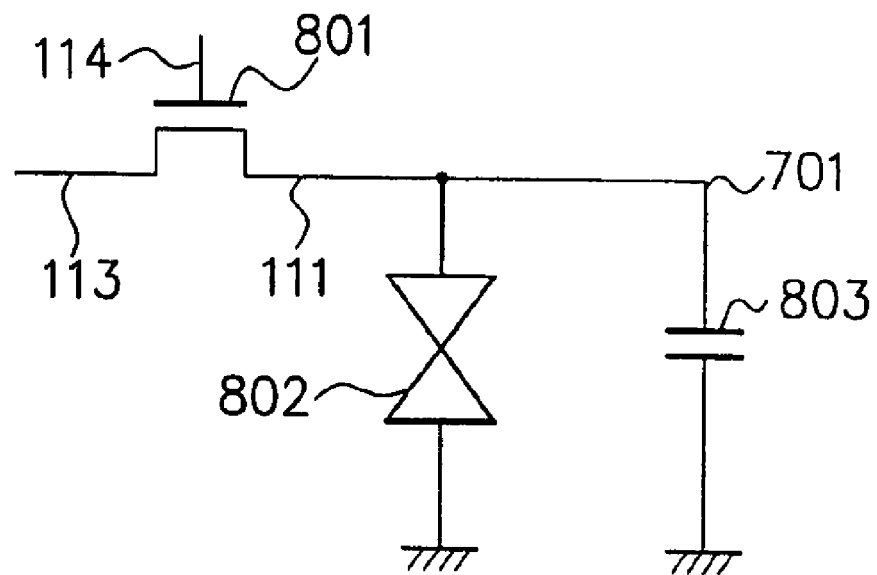
FIGS. 8A and 8B are views showing a basic configuration of the liquid crystal display device.

FIG. 8A shows the essential configuration of the liquid crystal display device. A TFT 801 has a gate connected to the gate line 114, a source connected to the data line 113 and a drain connected to the transparent electrode 111. A liquid crystal layer 802 has an end connected to the transparent electrode 111 on the TFT substrate and the other end connected to a common electrode (ground electrode) of an opposite substrate. A subsidiary capacitor 803 has an end connected to the transparent electrode 111 through a contact region 701 and the other end connected to the ground potential.

Figure 8B:
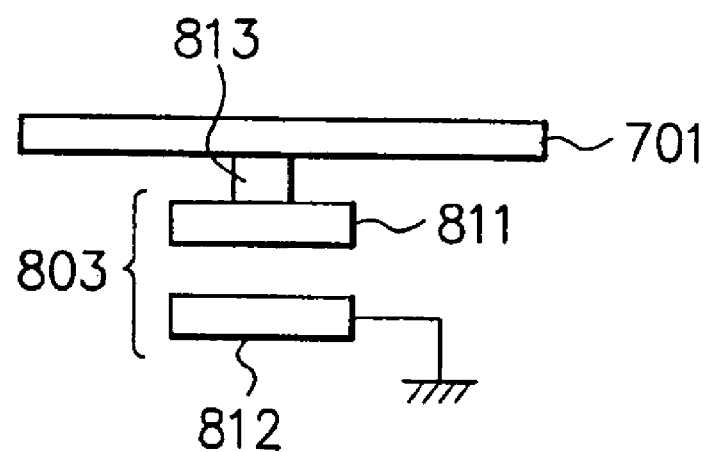

FIG. 8B is a cross-sectional view of the subsidiary capacitor 803 and the surroundings. The subsidiary capacitor 803 is formed by providing an insulating layer between metal layers 811 and 812. The metal layer 811 is formed on the same layer as that of the TFT 801 (FIG. 8A) while it is not connected to the source electrode of the TFT 801. The metal layer 812 is also referred to as a subsidiary capacitor (Cs) layer hereafter. The Cs layer 812 is connected to the ground potential. The metal layer 811 is connected to the contact region 701 through a contact hole 813.

Figure 7:
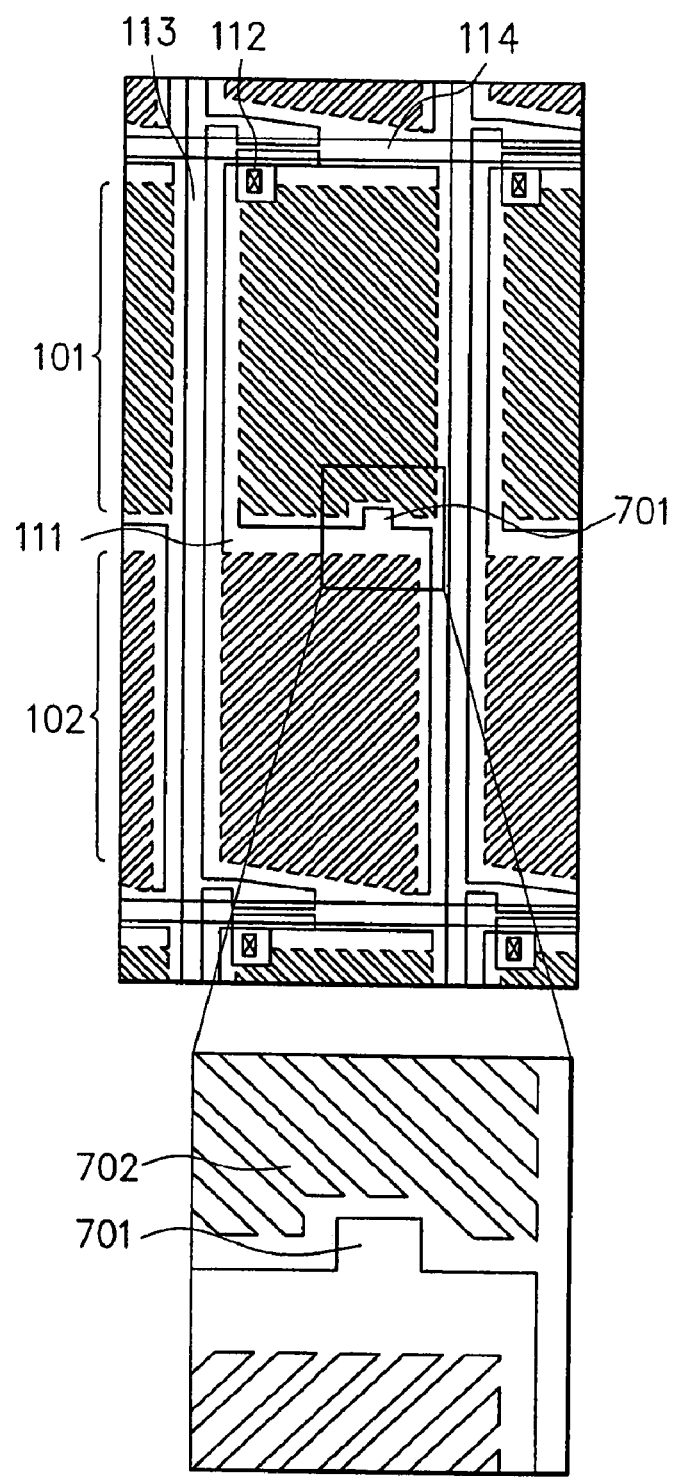
FIG. 7 is a view showing a contact region for connecting the pixel electrode and a subsidiary capacitor.
Figure 9:
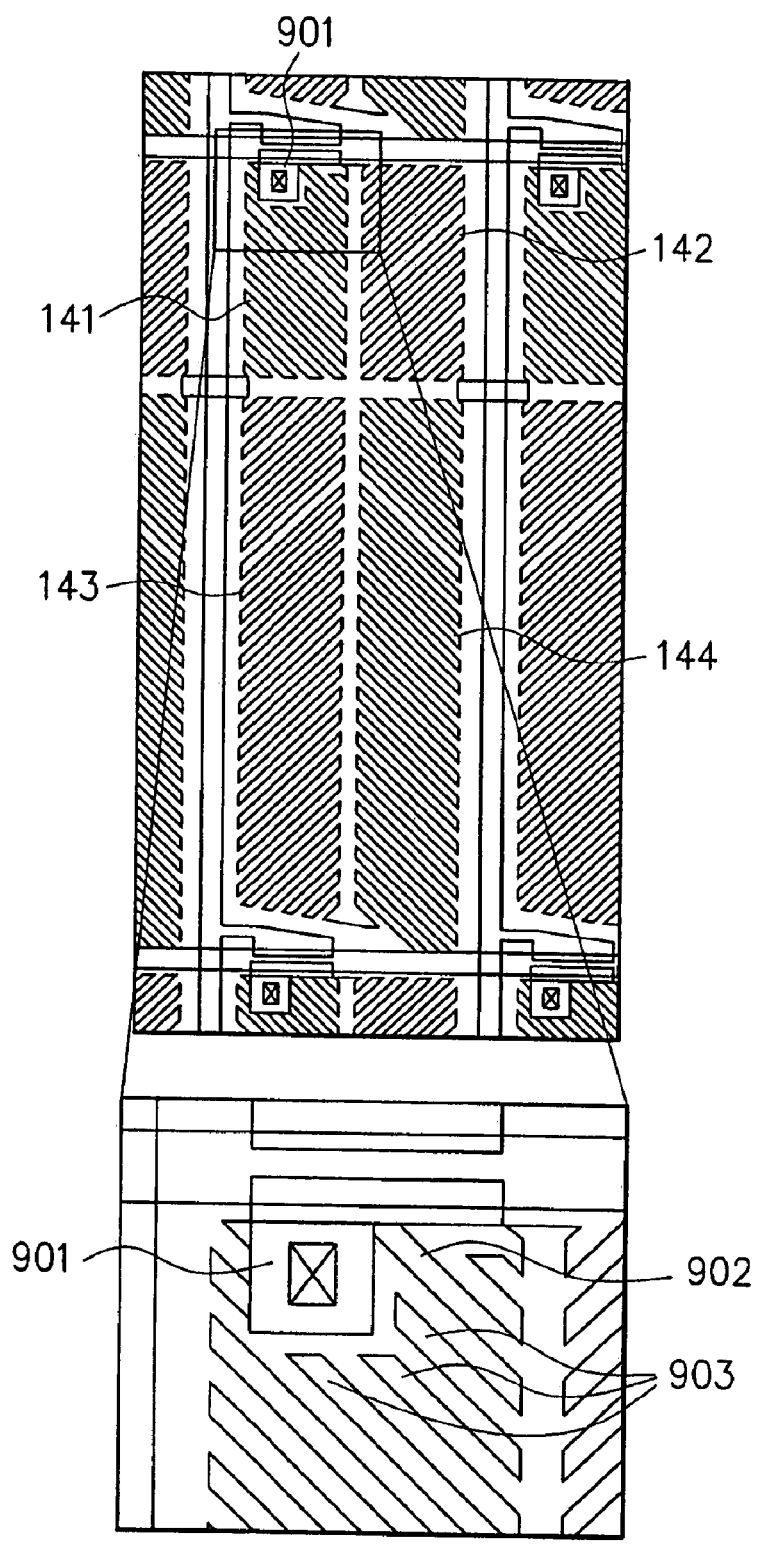
FIG. 9 is a view showing a contact region for connecting the pixel electrode and a TFT.

Referring to FIG. 7 and FIG. 9, a more accurate layout of the electrode in a gridiron shape is explained. FIG. 7 corresponds to FIG. 6A, and FIG. 9 corresponds to FIG. 1B.

In FIG. 7, the electrode 812 (FIG. 8B) for the subsidiary capacitor (Cs) is formed in the horizontal direction at a middle part of the pixel, and the contact region 701 is formed for contacting the ITO electrode 111 and the metal layer 811 (FIG. 8B). The configuration is made such that the end of the electrode 702 in a gridiron-line shape is kept away from the contact region 701 as in an enlarged view shown at a lower part in FIG. 7.

Figure 10:
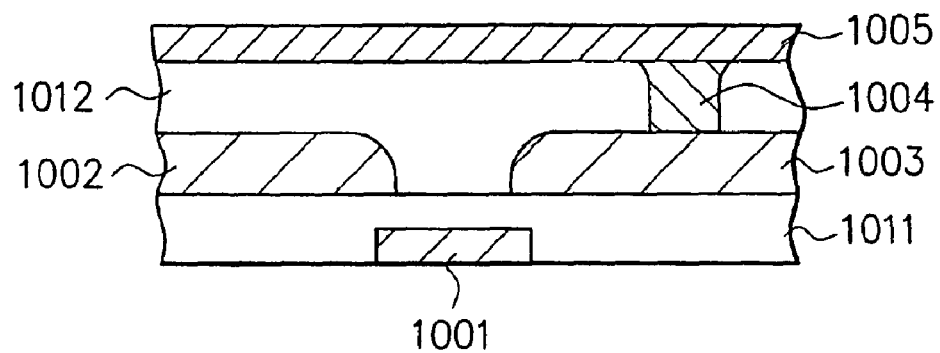
FIG. 10 is a cross-sectional view of the TFT.

FIG. 10 is a cross-sectional view of the TFT. Above a gate electrode 1001, a source electrode 1002 and a drain electrode 1003 are formed through an insulating film 1011. Further, an ITO electrode 1005 is formed thereabove through an insulating film 1012. The ITO electrode 1005 and the drain electrode 1003 are connected with each other through a contact hole 1004.

The lower part in FIG. 9 shows an enlarged view of the drain electrode of the TFT and a contact region 901 of the ITO electrode. It is important that the ends of electrodes 903 in a gridiron-line shape are open, and thus it is designed to form, as much as possible, a part in a slit shape interposed between the ends and the drain electrode. An electrode 902 in a gridiron-line shape is connected to the contact region 901.

Figure 11:
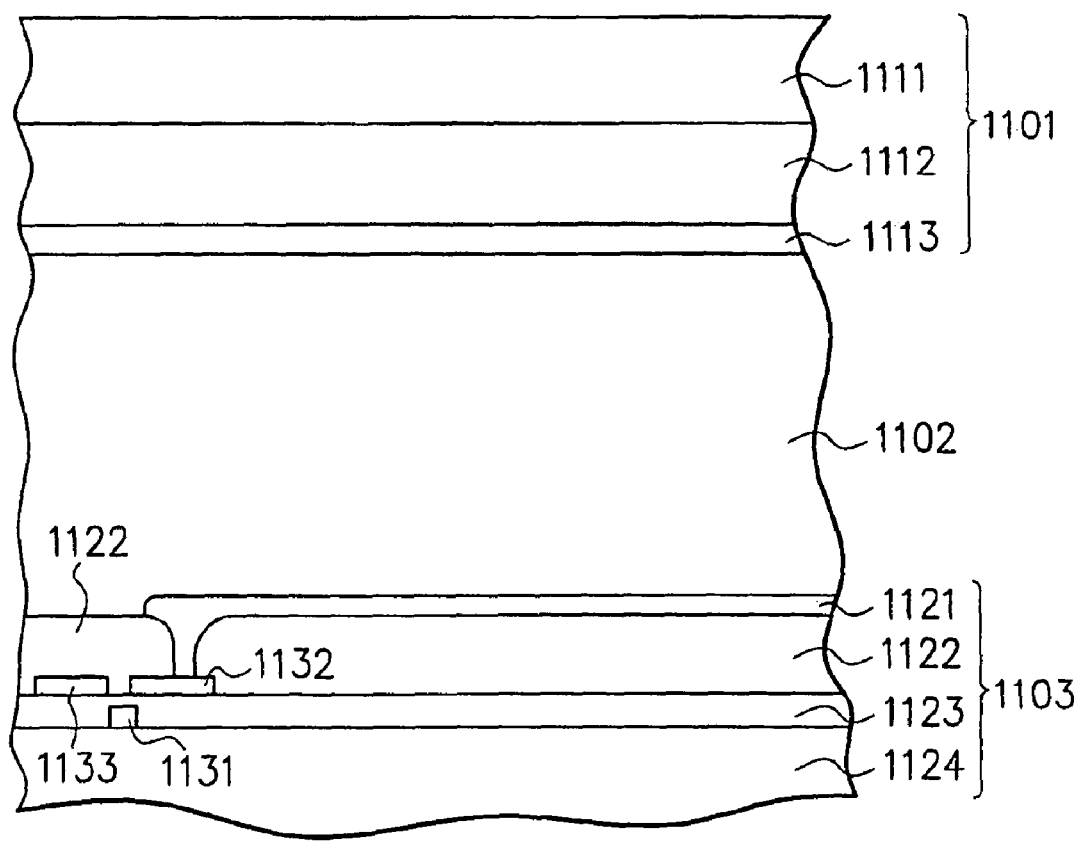
FIG. 11 is a cross-sectional view of the liquid crystal display device.

FIG. 11 is a cross-sectional view of a typical liquid crystal display device. A liquid crystal layer 1102 is provided between an opposite substrate 1101 and a TFT substrate 1103. In the opposite substrate 1101, a glass substrate 1111, a color filter 1112 and an ITO electrode 1113 are laminated in order. In the TFT substrate 1103, a glass substrate 1124, an insulating layer 1123, an insulating layer 1122 and an ITO electrode 1121 are laminated in order. Above a gate electrode 1131, a source electrode 1133 and a drain electrode 1132 are formed through the insulating layer 1123. The ITO electrode 1121 is connected to the drain electrode 1132.

Figure 12A:
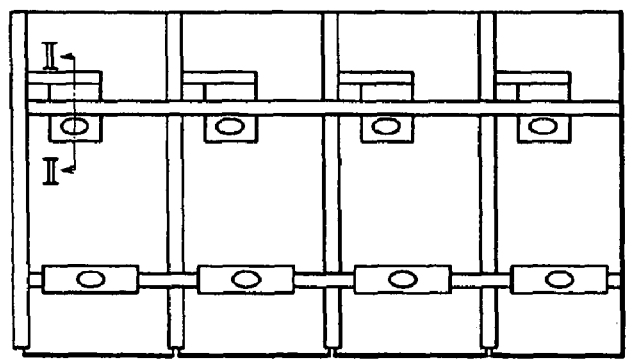
FIG. 12A is a plane view of the liquid crystal display device.
Figure 12B:
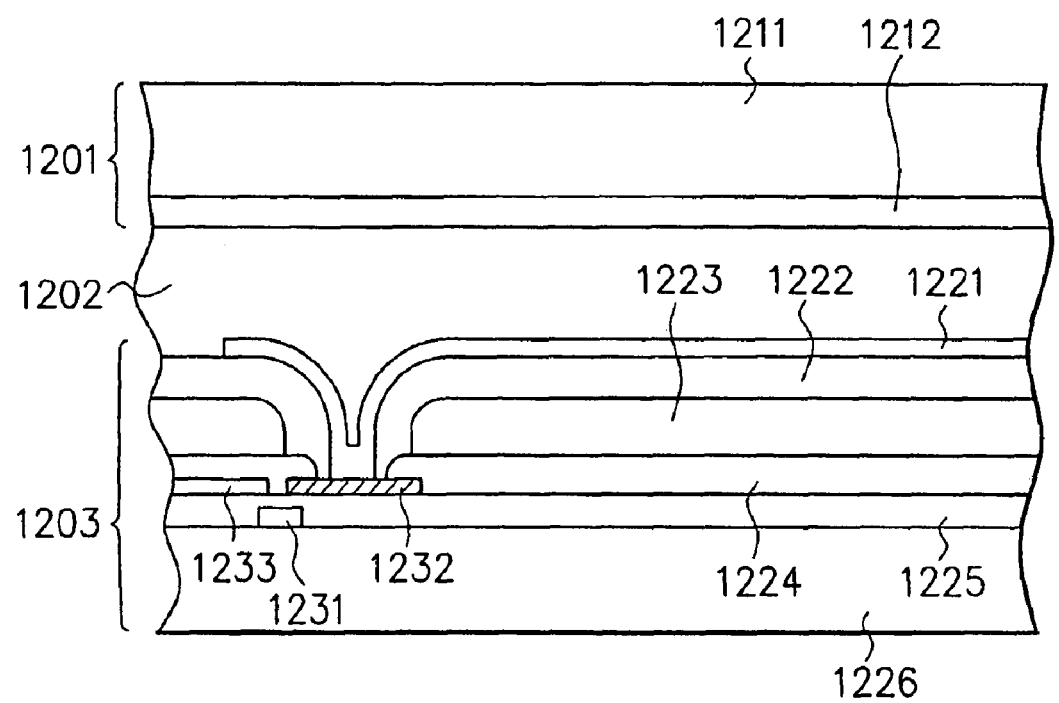
FIG. 12B is a cross-sectional view of the liquid crystal display device.

FIGS. 12A and 12B show a liquid crystal display device in which a color filter 1223 is formed in a TFT substrate 1203. FIG. 12A is a plane view of the liquid crystal display device. FIG. 12B is a cross-sectional view taken along a line II-II in FIG. 12A. A liquid crystal layer 1202 is provided between an opposite substrate 1201 and the TFT substrate 1203. In the opposite substrate 1201, a glass substrate 1211 and an ITO electrode 1212 are laminated. In the TFT substrate 1203, a glass substrate 1226, an insulating layer 1225, an insulating layer 1224, a color filter 1223, an acrylic resin layer 1222 and an ITO electrode 1221 are laminated in order. Above a gate electrode 1231, a source electrode 1233 and a drain electrode 1232 are formed through the insulating layer 1225. The ITO electrode 1221 is connected to the drain electrode 1232.

When the color filter 1223 is provided on the TFT substrate 1203, the electrode pattern can freely be laid out. With the configuration of FIG. 11, its brightness decreases by influence of a horizontal electric field from the data line, and the liquid crystal molecules tilt in a direction different from a direction at a desired angle, which presents a problem that the visual angle characteristics are poor. In contrast to the above, when the color filter 1223 is provided in the TFT substrate 1203 as shown in FIG. 12B, the data line hides behind the color filter 1223. Here, as for the slit electrode, an oblique electric field which occurs between the self-pixel and an adjacent pixel causes an alignment defect. Therefore, conversely, the configuration is arranged so that the adjacent pixel is also used to improve the alignment. As shown in FIG. 13A, a gap 1321 between the electrode of the adjacent pixel and the self-pixel is made equal to a gap 1322 between the slits in the self-pixel, and its phase of drive is matched with those of horizontally adjacent pixels for display operation. Specifically, frame inversion or line inversion drive is performed. In this event, for example, when an entire gray display is performed, the distribution of the electric field in the self-pixel is completely the same as that between the pixels. Thus, no alignment defect occurs at all. In this case, the alignment becomes uniform in the vertical direction on the entire surface to realize excellent visual angle characteristics and a uniform, bright display.

FIG. 13A shows ITO electrodes 1311 to 1316 corresponding to regions of six pixels. A contact region 1301 for connecting to the drain electrode of the TFT is provided at the top left of each of the ITO electrodes 1311 to 1316. The gap 1321 is a gap between each of the ITO electrodes 1311 to 1316. The gap 1322 is a gap between the electrodes in a gridiron-line shape in each of the ITO electrodes 1311 to 1316. The gaps 1321 and 1322 are equal.

In FIG. 13C, a contact hole 1331 for establishing a connection with the TFT is provided at a part joining the gridiron lines at the middle of the pixel to stable the aperture ratio and alignment.

FIG. 13B is a cross-sectional view taken along a line I-I in FIGS. 13A and 13C. In a TFT substrate 1342, a data line 1341 is provided under the gap between each of the ITO electrodes 1314 to 1316.

According to this embodiment, as shown in FIG. 12B, the pair of substrates 1201 and 1203 are provided. The liquid crystal layer 1202 is sandwiched between the pair of substrates 1201 and 1203, so that the liquid crystal molecules are vertically aligned with respect to the substrates 1201 and 1203 when no voltage is applied between the substrates 1201 and 1203, and the liquid crystal molecules tilt in a plurality of directions to be almost parallel to the substrates 1201 and 1203 by applying a voltage between the substrates 1201 and 1203 (see FIGS. 1A and 1B). In the liquid crystal layer 1202, when a voltage is applied, the proportion of the region 131 where the liquid crystal molecules tilt in a direction of 0 degrees to 180 degrees differs from the proportion of the region 132 where the liquid crystal molecules tilt in a direction of 180 degrees to 360 degrees with the angle being defined counterclockwise with the right direction on the screen being 0 degrees as shown in FIG. 1A.

Alternatively, in the liquid crystal layer 1202, when a voltage is applied, the proportion of the regions 141 and 142 where the liquid crystal molecules tilt in directions of 45 degrees and 135 degrees is different from the proportion of the regions 143 and 144 where the liquid crystal molecules tilt in directions of 225 degrees and 315 degrees with the angle being defined counterclockwise with the right direction on the display screen being 0 degrees as shown in FIG. 1B. In the liquid crystal layer 1202, the proportion of the regions 141 and 142 where the liquid crystal molecules tilt in the directions of 45 degrees and 135 degrees is preferably 40% or less of the whole.

As shown in FIG. 1B, the pixel electrode, which is a pixel electrode in a gridiron shape with lines having a width of 10 μm or less and a gap of 10 μm or less, is provided in the TFT substrate 1203 (FIG. 12B). In the liquid crystal layer 1202, alignment directions of the liquid crystal molecules are controlled by the pixel electrode so that the liquid crystal molecules tilt in four directions. The pixel electrode has a shape in which the gridiron lines extend in directions of 45 degrees, 135 degrees, 225 degrees and 315 degrees, so that the liquid crystal molecules tilt in four directions of 45 degrees, 135 degrees, 225 degrees and 315 degrees respectively in the liquid crystal layer 1202.

The thin film transistor includes the gate, the source and the drain. As shown in FIG. 9, the pixel electrode has the contact region 901 for connecting to the drain of the thin film transistor, and the slit is provided between at least the parts 903 of a plurality of gridiron lines and the contact region 901. The gate line is connected to the gate of the thin film transistor. In the pixel electrode, the gridiron line 902 of the plurality of gridiron lines, located at the nearest position of the gate line, is connected to the contact region 901.

As shown in FIG. 13A, as for the pixel electrode, the gap 1322 in the self-pixel electrode in a gridiron shape is equal to the gap 1321 between the self-pixel electrode and the adjacent pixel electrode. As shown in FIG. 12A, the thin film transistor is connected to the pixel electrode 1221 in the TFT substrate 1203. The color filter layer 1223 is formed in the TFT substrate 1203.

As described above, a display with excellent visual characteristics can be realized according to this embodiment.

Second Embodiment

Figure 14:
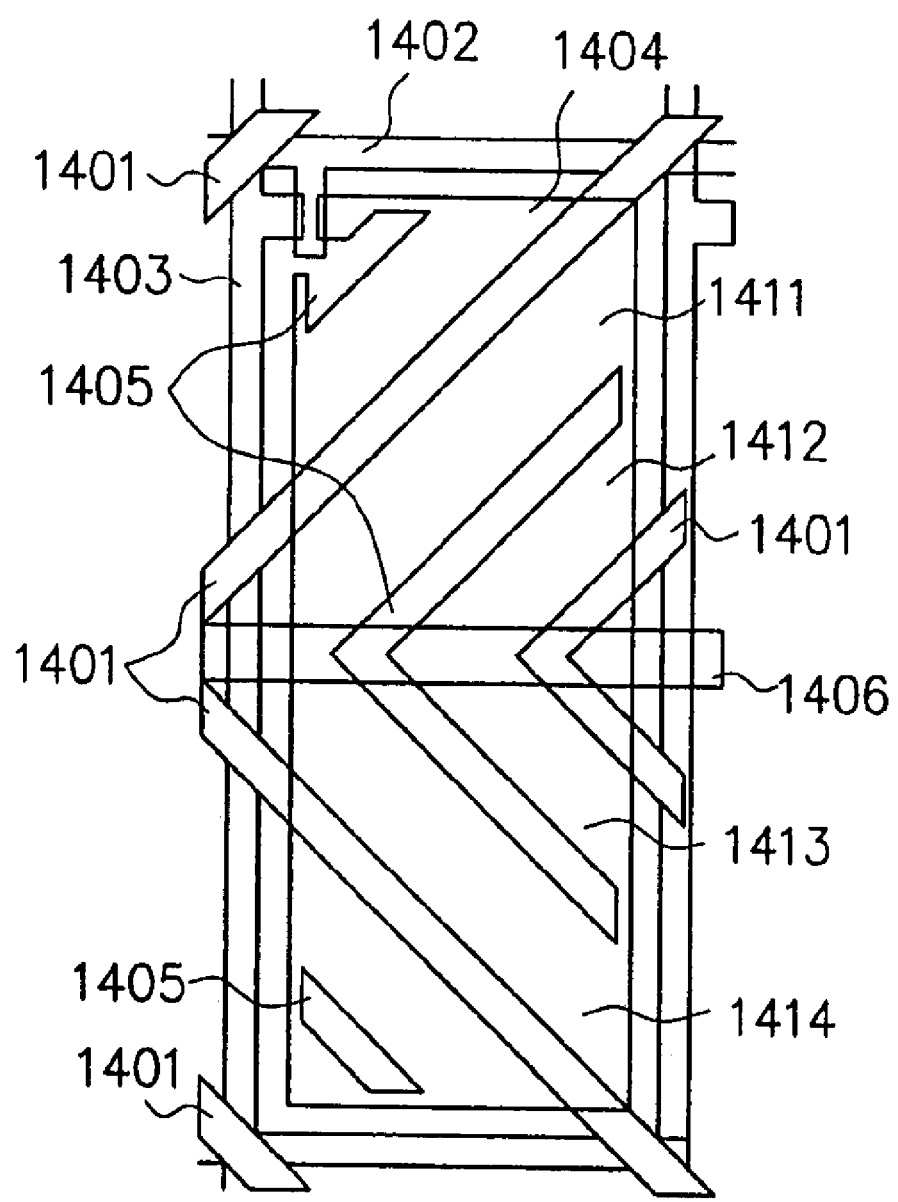
FIG. 14 is a view showing a four-domain MVA-mode liquid crystal display device.
Figure 15:
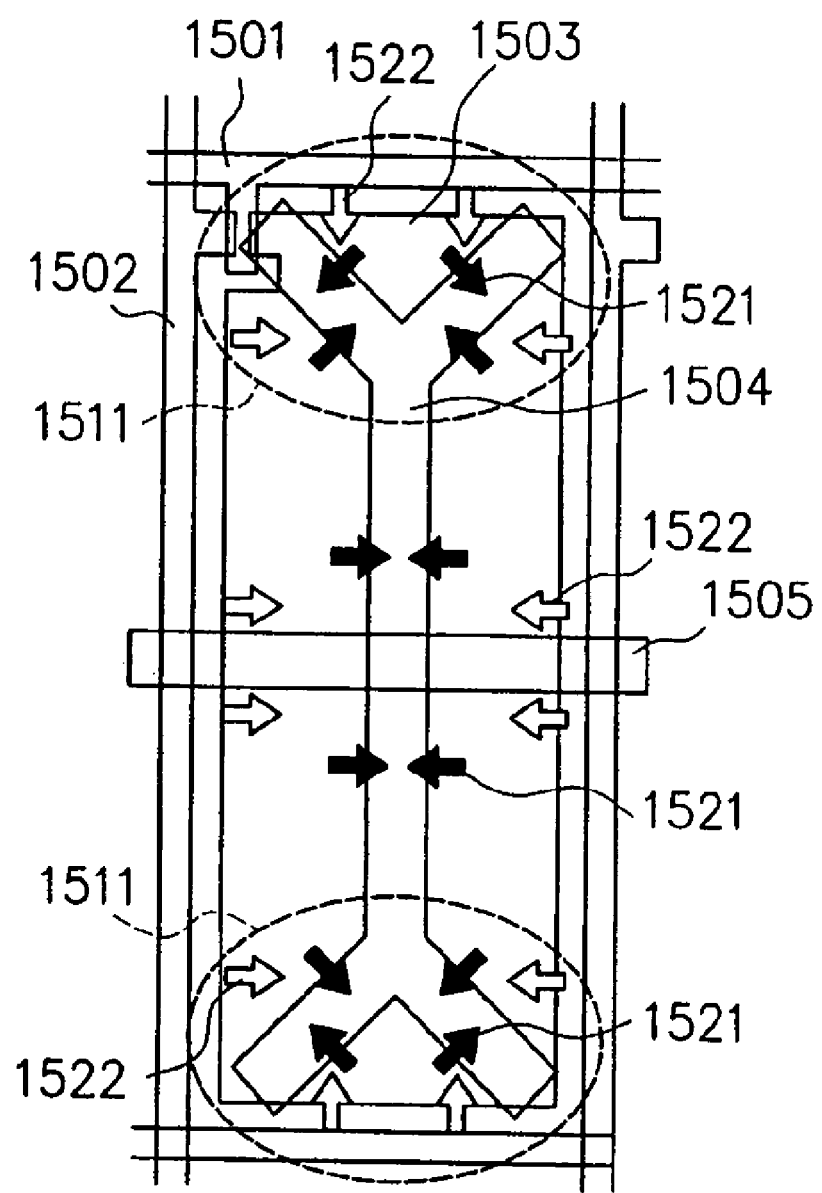
FIG. 15 is a view showing a technique of aligning liquid crystal molecules by providing a slit in a shape of the letter Y on an opposite substrate.

Referring to FIG. 14 and FIG. 15, problems of the MVA-mode liquid crystal display device are explained. FIG. 14 shows the MVA-mode liquid crystal display device. Sits 1405 are provided in an ITO pixel electrode 1404 on the TFT substrate side, and protrusions 1401 are formed, using a resist, on an ITO electrode of the opposite substrate. Further, a gate line 1402, a data line 1403 and a subsidiary capacitor forming electrode 1406 are formed on the TFT substrate. The pixel electrode is divided into four regions 1411 to 1414. The liquid crystal molecules in the regions 1411 to 1414 are aligned in directions of the liquid crystal molecules A1, B2, A2 and B1 in FIG. 4A respectively. In comparison to the configuration of a TN-type display here, it is necessary to form a resist pattern on the ITO electrode of the opposite substrate, which increases the number of processing steps, resulting in increased cost.

FIG. 15 shows a case in which the ITO electrode on the opposite substrate is provided with a slit 1504. The TFT substrate is formed with a gate line 1501, a data line 1502, a subsidiary capacitor forming electrode 1505 and an ITO electrode 1503. Black arrows 1521 show directions of alignment control by the slit electrode 1504. White arrows 1522 show directions of alignment control by the gate line 1501 and the data line 1502. In regions 1511, response is delayed because of two or more directions of alignment control.

Further, in comparison to the TN-type display, it is necessary to provide the slit 1504 in the ITO electrode of the opposite substrate, which increases the number of processing steps, resulting in increased cost in this case. When the color filter is provided on the opposite substrate, the color filter layer is exposed within a part of the slit 1504, which presents a problem that reliability decreases due to dropping-out of impurities from the color filter layer. Further, since the direction of alignment control by the data line 1502 or the gate line 1501 differs by 45 degrees from that by the slit electrode 1504, it takes time for the alignment to stabilize, which presents a problem that response is slow.

FIG. 16 shows a pattern of the pixel electrode according to this embodiment of the invention. The TFT substrate is formed with a gate line 1601, a data line 1602 and fine slit pixel electrodes 1621 and 1622.

Black arrows 1612 show directions of alignment control by the fine slit electrodes 1621 and 1622. White arrows 1611 show directions of alignment control by the gate line 1601 and the data line 1602.

Near the data line 1602 the fine slit pixel electrodes 1622 are provided in the horizontal direction (perpendicular to the data line). Near the gate line 1601 the fine slit pixel electrodes 1621 are provided in the vertical direction (perpendicular to the gate line). Further, as a part joining the electrodes, an ITO electrode 1613 is vertically extended at the middle of the pixel, and ITO electrodes 1623 are extended toward intersections between the data lines 1602 and the gate lines 1601. The angle of the ITO electrodes 1623 intersecting each other is 45 degrees. The ITO electrode 1613 is formed in a backbone shape, on which the alignment direction of the liquid crystal molecules is determined by influence of alignment of liquid crystal molecules near the gate lines 1601. Here, the electrode width of the fine electrodes 1621 and 1622 is set to about 3 μm, and the width of the slit between the electrodes 1621 and 1622 is also set to about 3 μm.

On the fine electrodes 1621 and 1622, the directions, in which the liquid crystal molecules tilt when a voltage applied between the electrode on the TFT substrate and the electrode on the opposite electrode, are parallel to the directions in which the fine electrodes extend. This operation is explained using FIGS. 17A and 17B.

Figure 17A:
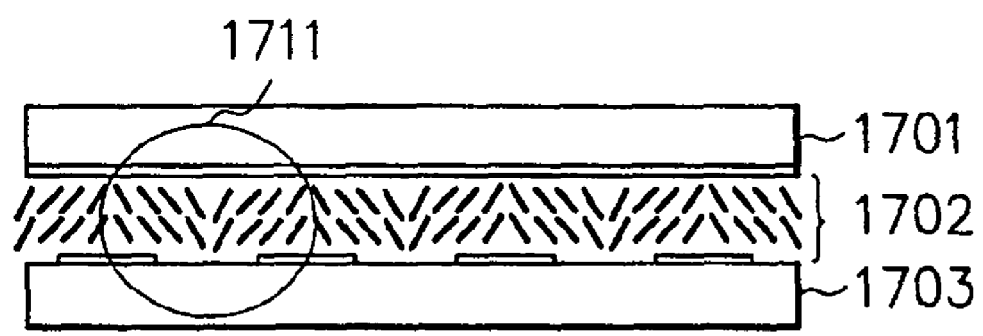
FIGS. 17A and 17B are views showing the principle and configuration of liquid crystal molecules tilting when fine slits are provided.

FIG. 17A shows a case of a rough pixel electrode pattern. A liquid crystal layer 1702 is provided between an opposite substrate 1701 and a TFT substrate 1703. On the opposite substrate 1701, an ITO transparent electrode is formed on the entire surface. The electrode pattern interval on the TFT substrate 1703 is large. In a region 1711, the liquid crystal molecules tilt in accordance with the gradient of the electric field since gaps of the electrodes are large. The liquid crystal molecules tilt in the horizontal direction in FIG. 17A because the region is distant from a region where the liquid crystal molecules tilt in an opposite direction to produce no mutual interference.

Figure 17B:
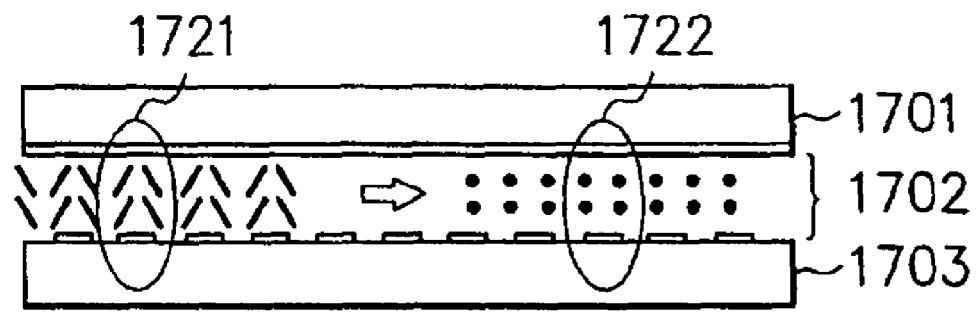

FIG. 17B shows a case of a fine electrode pattern on the TFT substrate 1703. In a region 1721, the liquid crystal molecules tilting in accordance with the gradient of the electric field collide with each other and can not tilt since gaps between the electrodes are small. In order to escape from the stress, liquid crystal molecules 1722 tilt in a direction parallel to the electrode (direction perpendicular to the paper surface of FIG. 17B).

This embodiment employs the above principle, in which, at parts where the fine electrodes 1622 extending perpendicular to the data lines 1602 exist as shown in FIG. 16, the liquid crystal molecules tilt in the horizontal direction by the influence of the fine electrodes 1622 and the horizontal electric fields from the data lines 1602. Since the direction of alignment control by the fine electrodes 1622 matches the direction of alignment control by the horizontal electric fields from the data lines 1602, the liquid crystal molecules simply tilt here. On the other hand, at parts where the fine electrodes 1621 extending perpendicular to the gate lines 1601 exist, the liquid crystal molecules tilt in the vertical direction by the influence of the fine electrodes 1621 and the horizontal electric fields from the gate lines 1601. Since the direction of alignment control by the fine electrodes 1621 matches the direction of alignment control by the horizontal electric fields from the gate lines 1601, the liquid crystal molecules simply tilt here.

Since the alignment control is simply exerted on the liquid crystal molecules as described above, it is unnecessary to provide on the opposite substrate a special structure such as a protrusion or a slit.

FIG. 16 is explained in more detail. The ITO transparent electrode is provided within the pixel region surrounded by the gate lines 1601 and the data lines 1602, and a display voltage is applied thereto by the TFT. The ITO electrode is patterned into a comb-teeth shape such that the direction of the comb is set perpendicular to the data lines 1602 near the data lines 1602 and perpendicular to the gate lines 1601 near the gate lines 1601. The teeth of the comb join the electrode 1613 which vertically extends at the middle of the pixel. This electrode 1613 like a backbone is in the shape of a letter Y which extends toward the intersections between the data lines 1602 and the gate lines 1601. When the angle between opening arms of the letter Y is set to a range from 30 degrees to 120 degrees, excellent alignment can be obtained. Here, the width of the ITO electrode of the slit electrode is set to 3 μm to 5 μm, and the ITO gap between the slits is set to 2 μm to 5 μm.

Figure 18:
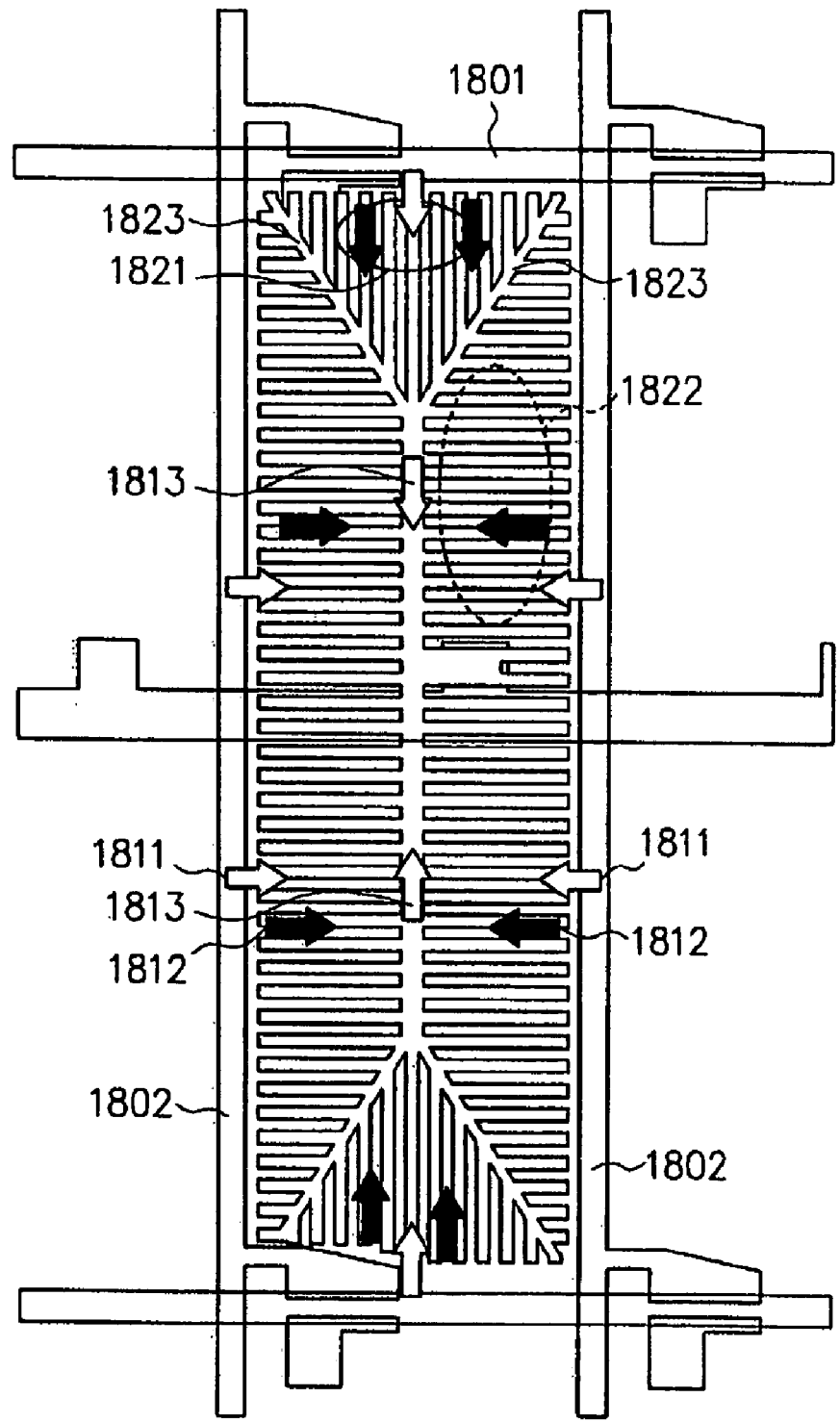
FIG. 18 is a view for explaining an example in which the open angle of the letter Y of the pixel electrode is changed.

FIG. 18 shows a case in which the angle between the opening arms is about 60 degrees. Electrodes 1821 in the comb-teeth shape extending in the vertical direction (perpendicular to gate lines 1801) have greater lengths. In this case, it is possible to effectively utilize the horizontal electric fields from the gate lines 1801.

Figure 19A:
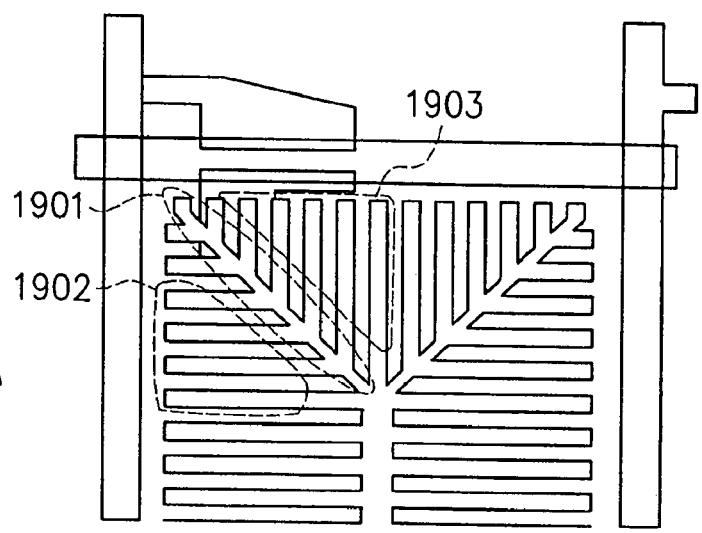
FIGS. 19A to 19C are views for explaining modifications of the fine slits.
Figure 19B:
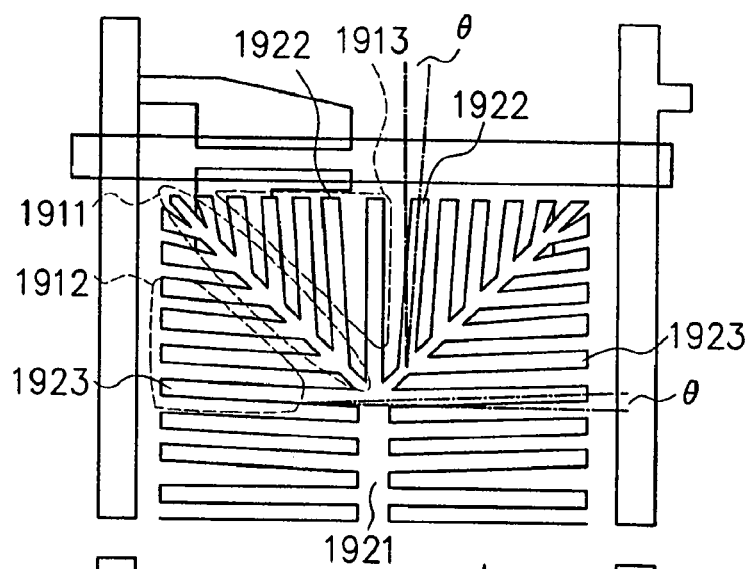
Figure 19C:
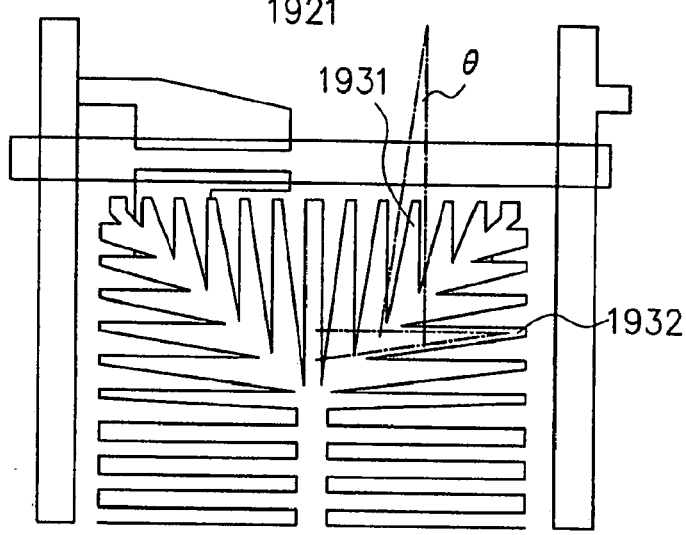

FIGS. 19A to 19C show enlarged views of patterns of the ITO electrode.

FIG. 19A shows the simplest configuration, in which the width of the ITO electrode in the comb-tooth shape is fixed. The liquid crystal molecules tilt in the horizontal direction in FIG. 19A in a region 1902, the liquid crystal molecules tilt in the vertical direction in FIG. 19A in a region 1903, and the liquid crystal molecules tilt in an oblique direction of 45 degrees in FIG. 19A in a region 1901.

In FIG. 19B, the direction of the electrodes in the comb-teeth shape is tilted θ degrees. The directions, in which the electrodes in the comb-teeth shape extending upward from open arms of a backbone extend, are tilted from the upward direction to the directions of the open arms. In other words, electrodes 1922 in the comb-teeth shape, which are electrodes near the gate line, are tilted θ degrees from the longitudinal direction of an electrode 1921 in a backbone shape. Electrodes in the comb-teeth shape 1923, which are electrode near the data line, are tilted θ degrees from the vertical direction of the electrode 1921 in the backbone shape. The tilted angle θ was changed from 1 degree to 45 degrees.

In a region 1911, the liquid crystal molecules tilt in an oblique direction of 45 degrees in FIG. 19B. The tilts of the liquid crystal molecules in the regions 1902 and 1903 in FIG. 19A differ from each other by 90 degrees. Since the difference between regions 1912 and 1913 in FIG. 19B in tilt of the liquid crystal molecules therein is smaller than 90 degrees, the tilts of the liquid crystal molecules gradually change between the regions 1911 and 1913.

Figure 20A:
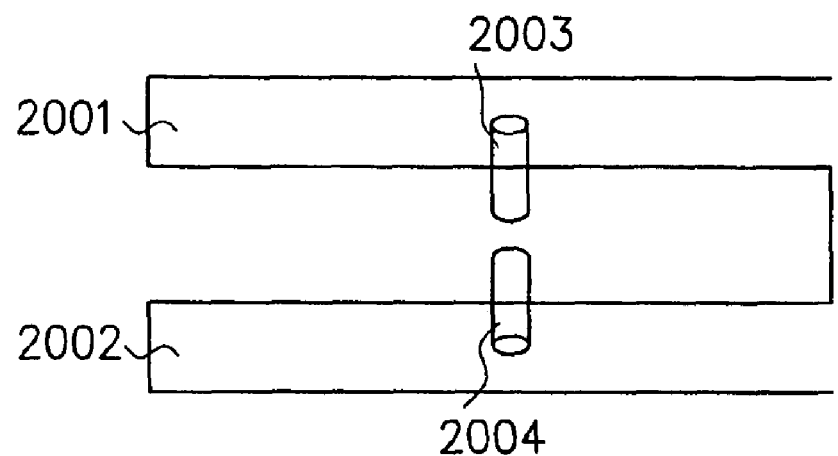
FIGS. 20A and 20B are views for explaining effects of the pixel electrode having a tapered shape.
Figure 20B:
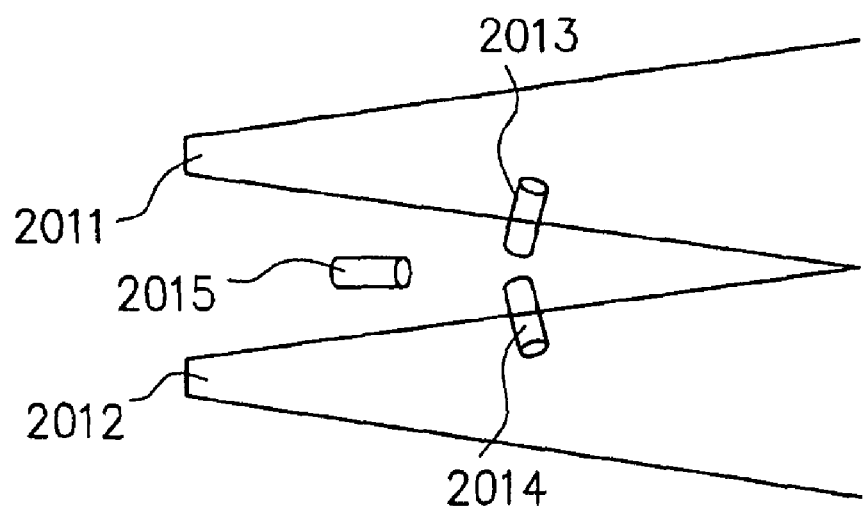

FIG. 19C shows a configuration when the shape of the electrode is tapered. The angle θ of the tapered electrodes 1931 and 1932 is set here to about 1 degree to about 20 degrees. The effects of tapering the shape of the electrode are explained. FIG. 20A shows a case in which fine electrodes 2001 and 2002 are parallel to each other. A liquid crystal molecule 2003 near the fine electrode 2001 differs from a liquid crystal molecule 2004 near the fine electrode 2002 in tilt by 180 degrees. FIG. 20B shows a case in which the shape of fine electrodes 2011 and 2012 is tapered. The difference in tilt between a liquid crystal molecule 2013 near the fine electrode 2011 and a liquid crystal molecule 2014 near the fine electrode 2012 is smaller than 180 degrees. The tilts of the liquid crystal molecules 2013 to 2015 gradually change.

Figure 21A:
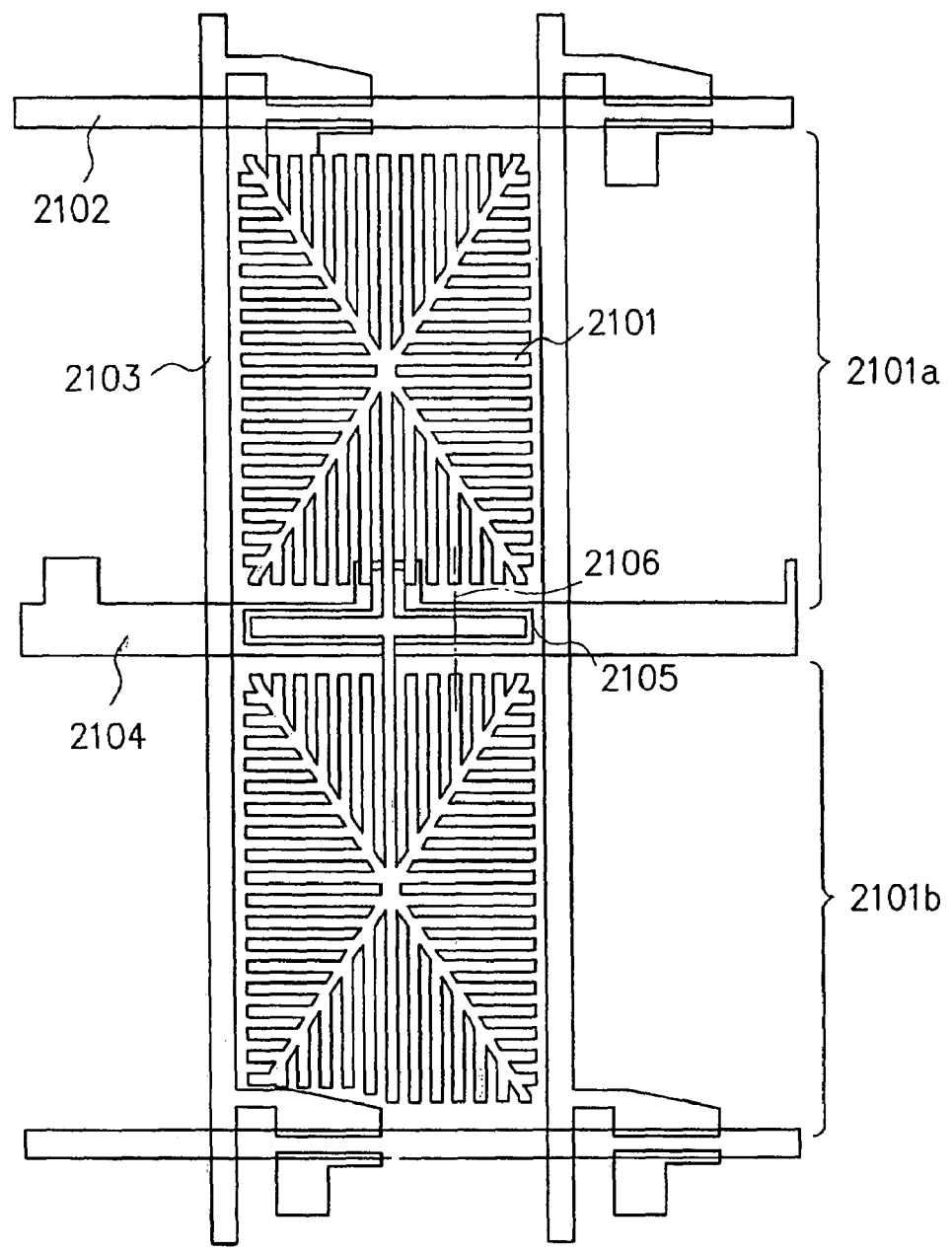
FIGS. 21A and 21B are a plane view and a cross-sectional view of a liquid crystal display device utilizing an oblique electric field from a Cs line.
Figure 21B:
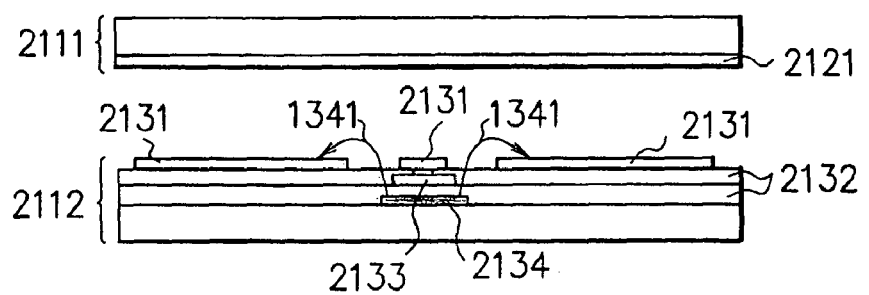

FIGS. 21A and 21B show a configuration of a case of utilizing a subsidiary capacitor forming Cs line. FIG. 21A is a plane view of the liquid crystal display device. A horizontal electric field is formed from a Cs line 2104 similarly to a gate line 2102 or a data line 2103. This horizontal electric field is positively utilized.

A metal layer 2105, which corresponds to the metal layer 811 in FIG. 8B, is connected to an ITO pixel electrode 2101. It is important to point the tips of the comb of the electrode in the comb-teeth shape here, as in the case shown in FIG. 16. FIG. 18, and FIGS. 19A to 19C, to the electrode which causes the horizontal electric field (the data line or the gate line in FIG. 16, FIG. 18, and FIGS. 19A to 19C).

In FIG. 21A, as the electrode in the comb-teeth shape, electrodes in a comb-teeth shape are extended upward and downward and leftward and rightward in each of an upper half part 2101a and a lower half part 2101b of a pixel.

FIG. 21B is a cross-sectional view taken along a line 2106 in FIG. 21A. An ITO pixel electrode 2121 is formed on the entire surface of an opposite substrate 2111. In a TFT substrate 2112, a metal layer 2133 is formed above a Cs line 2134 through an insulating film 2132. The metal layer 2133 and an ITO pixel electrode 2131 are connected with each other. The Cs line 2134 corresponds to the Cs line 2104 in FIG. 21A, and the metal layer 2133 corresponds to the metal layer 2105 in FIG. 21A. As described above, an oblique electric field 1341 produced from the Cs line 2134 can be positively utilized for alignment.

Figure 22:
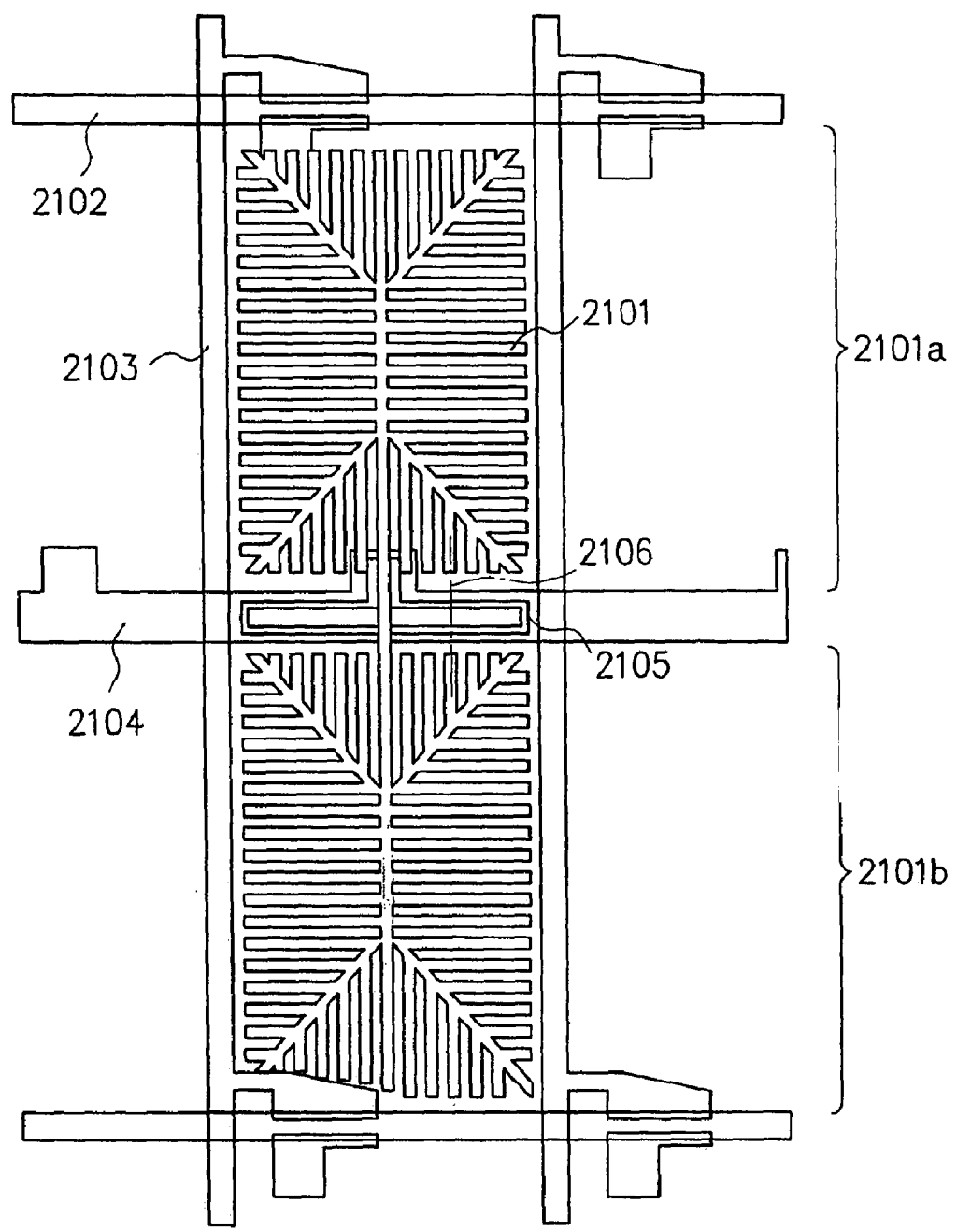
FIG. 22 is a plane view of another liquid crystal display device.

It should be noted that, a backbone region may be provided in the ITO pixel electrode 2101 in each of the regions 2101a and 2101b as shown in FIG. 22.

FIG. 23A shows an example in which a pixel electrode 2301 is extended to the top right, the top left, the bottom left and the bottom right. The TFT substrate is formed with a gate line 2302, a data line 2303 and a Cs line 2304 in addition to the pixel electrode 2301. The pixel electrode 2301 includes an electrode 2305 parallel to the Cs line 2304.

FIG. 23B shows a configuration in which the Cs line 2304 is positively utilized. In a pixel electrode 2311, regions 2311a and 2311b having different alignments are formed in a cross shape in an upper half part and a lower half part of each pixel. The regions 2311a and 2311b are connected with each other via a pixel electrode 2312.

In FIG. 21A, a transparent electrode for transmitting a voltage from the TFT is provided across the Cs line 2104. The ITO transparent electrode 2101 is set here in such a manner to extend along the Cs line 2104 on the Cs line 2104. This realizes a subsidiary capacitor.

Figure 24:
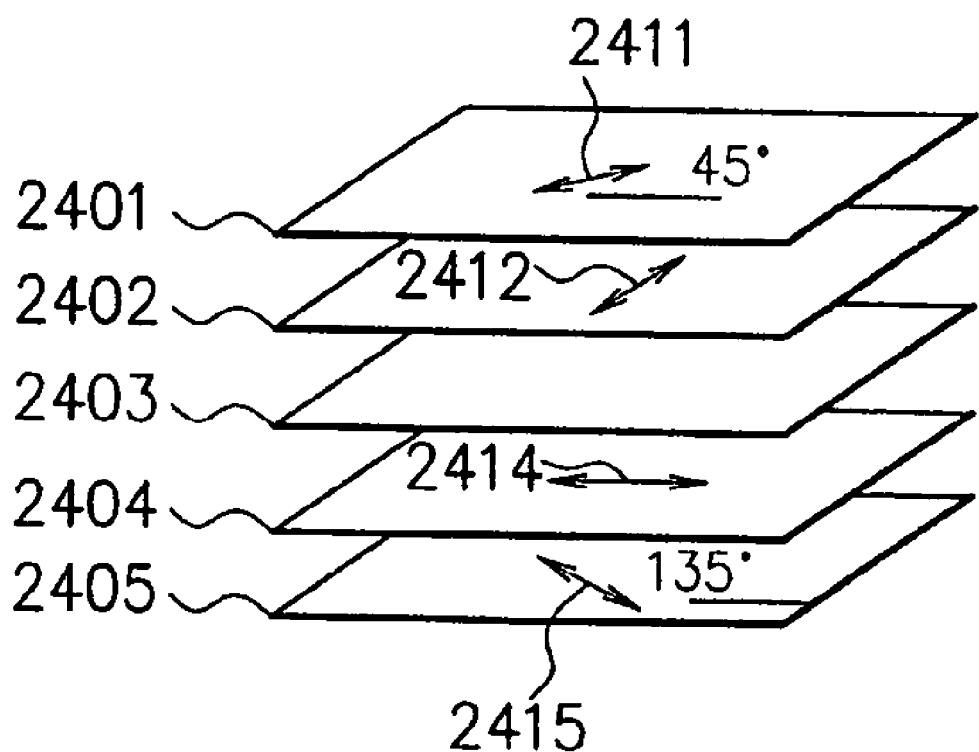
FIG. 24 is a view showing a liquid crystal display device employing quarter wave plates.

FIG. 24 shows a configuration in which the aforementioned liquid crystal panel is sandwiched between a pair of λ (wavelength)/4 plates. A liquid crystal panel 2403 is sandwiched between quarter wave plates 2402 and 2404, and further both sides thereof are sandwiched between polarizing plates 2401 and 2405. An absorption axis 2411 of the polarizing plate 2401 deviates by 45 degrees from the horizontal direction in FIG. 24. An optical axis 2412 of the quarter wave plate 2402 deviates by 90 degrees from the horizontal direction in FIG. 24. An optical axis 2414 of the quarter wave plate 2404 is in the same direction as the horizontal direction in FIG. 24. An absorption axis 2415 of the polarizing plate 2405 deviates by 135 degrees from the horizontal direction in FIG. 24. The polarizing plates 2401 and 2405 absorb light components in the absorption axes 2411 and 2415 respectively. The quarter wave plates 2402 and 2404 convert between linearly polarized light and circularly polarized light and then output it. The liquid crystal panel 2403 is sandwiched between the pair of quarter wave plates 2402 and 2404, resulting in improved brightness.

Figure 25C:
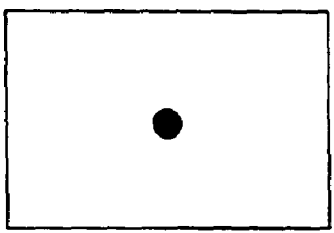
FIG. 25C is a view showing a distribution of the amount of transmitted light in the case of employing the quarter wave plates.
Figure 25B:
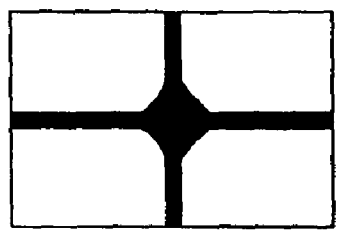
FIG. 25B is a view showing a distribution of the amount of transmitted light in the case of employing no quarter wave plate.
Figure 25A:
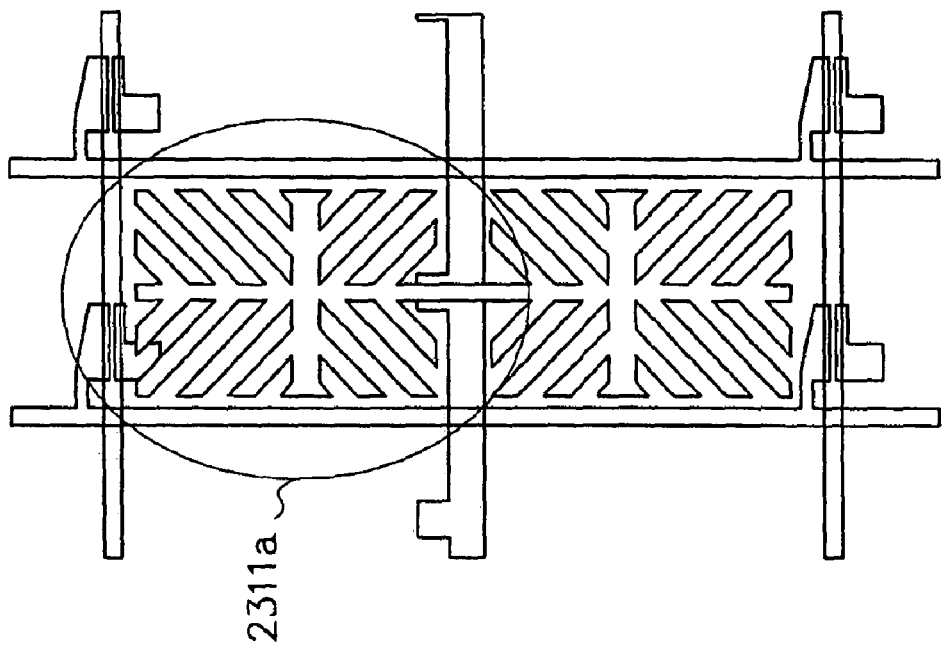
FIG. 25A is a plane view of the liquid crystal display device.

FIG. 25A is the same configuration as in FIG. 23B, the distribution of the amount of transmitted light in the upper half pixel region 2311a is shown in FIGS. 25B and 25C. FIG. 25B shows a distribution without a quarter wave plate, in which a black region in a cross shape appears in the pixel. This is because the liquid crystal molecules tilt in a direction perpendicular or parallel to the optical axis of the polarizing plate. FIG. 25C shows a distribution in a case of employing the quarter wave plates 2402 and 2404 as shown in FIG. 24, in which a black region exists only at the central part of the pixel, realizing a bight display.

According to this embodiment, as shown in FIG. 16, the pixel electrode is a pixel electrode in the comb-teeth shape or in the slit shape, in which the directions of the comb teeth extend toward the gate lines 1601 near the gate lines and toward the data lines 1602 near the data lines.

As shown in FIG. 21A, the Cs line (subsidiary capacitor forming electrode line) 2104 extends in the horizontal direction at the middle of the pixel. The pixel electrode is formed divided into the upper and lower parts with the subsidiary capacitor forming electrode line 2104 as a boundary and extends, near the subsidiary capacitor forming electrode line 2104, in the same direction as that of the subsidiary capacitor forming electrode line to overlap therewith.

Further, as shown in FIG. 16, in the pixel electrode, the electrode 1613 is formed in the backbone shape in the vertical direction at the middle of the pixel, and the electrode parts 1623, which join the electrodes 1621 in the comb-teeth shape toward the gate lines 1601 and the electrodes 1622 in the comb-teeth shape toward the data lines 1602, extend in the four directions from the electrode 1613 in the backbone shape to be in the shape of arms of the letter Y.

As shown in FIG. 21A, in the pixel electrode, the directions of the comb teeth extend, near the subsidiary capacitor forming electrode line 2104, toward the subsidiary capacitor forming electrode line. The pixel electrode has electrodes in the shape of arms of the letter Y, which join the electrodes in the comb-teeth shape toward the subsidiary capacitor forming electrode line 2104 and the electrodes in the comb-teeth shape toward the data lines 2103, and electrodes in the shape of arms of the letter Y, which join the electrodes in the comb-teeth shape toward the gate lines 2102 and the electrodes in the comb-teeth shape toward the data lines 2103.

The angle formed by the aforesaid electrodes in the shape of arms of the letter Y is preferably 30 degrees or more to 150 degrees or less. Further, as shown in FIG. 19B, in the pixel electrode, the directions of the electrodes 1922 in the comb-teeth extending toward the gate lines, near the data lines, extend tilting toward the data lines, and the directions of the electrodes 1923 in the comb-teeth extending toward the data lines, near the gate lines, extend tilting toward the gate lines. Further, as shown in FIG. 19C, the shape of the comb teeth of the pixel electrode is made such that the tip parts of the teeth are narrower or tapered.

As shown in FIG. 21A, in the pixel electrode, the electrode, which is provided across the subsidiary capacitor forming electrode line 2104 to transmit a voltage from the drain of the thin film transistor, extends, near the subsidiary capacitor forming electrode line 2104, in the same direction as that of the subsidiary capacitor forming electrode line to overlap therewith.

Further, as shown in FIG. 24, the pair of quarter wave plates 2402 and 2404, of which optical axes are perpendicular to each other, interpose the liquid crystal panel (the pair of substrates interposing the liquid crystal layer therebetween) 2403 therebetween.

As described above, the use of this embodiment enables realization of a liquid crystal display which is bright and has a wide viewing angle.

Third Embodiment

Figure 26:
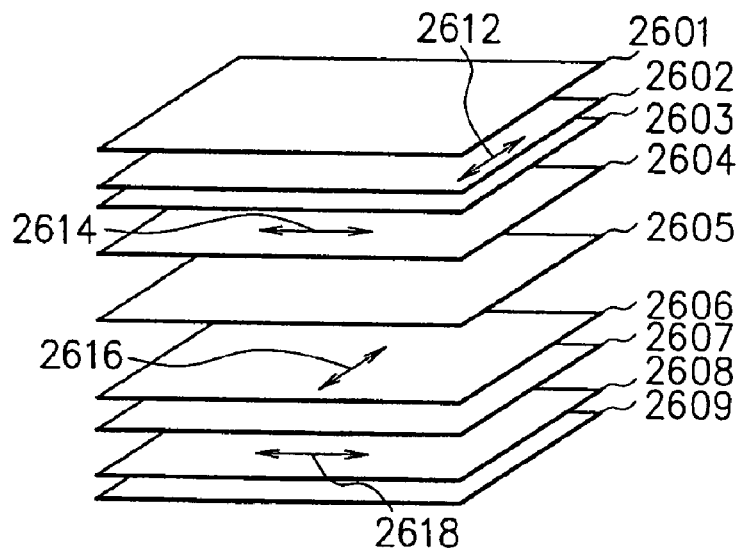
FIG. 26 is a view showing a film configuration for realizing a wide viewing angle.

In order to further improve the visual angle characteristics of the MVA-mode liquid crystal display device, a film configuration as shown in FIG. 26 is proposed. A liquid crystal layer 2605 is sandwiched between a pair of retardation. films 2604 and 2606 having in-plane retardation. Further, both sides thereof are sandwiched between a pair of negative retardation films 2603 and 2607. Furthermore, both sides thereof are sandwiched between a pair of polarizers 2602 and 2608. Further, both sides thereof are sandwiched between a pair of protective layers 2601 and 2609. An absorption axis 2612 of the polarizer 2602 and an absorption axis 2618 of the polarizer 2608 deviate from each other by 90 degrees. An optical axis 2614 of the retardation film 2604 and an optical axis 2616 of the retardation film 2606 deviate from each other by 90 degrees. The absorption axis 2612 of the polarizer 2602 and the optical axis 2614 of the retardation film 2604 deviate from each other by 90 degrees. As for the visual angle characteristics, a range of a contrast 10 or more is achieved at an inclined angle of ±80 degrees or more in all directions. However, the brightness can not be improved.

Figure 27:
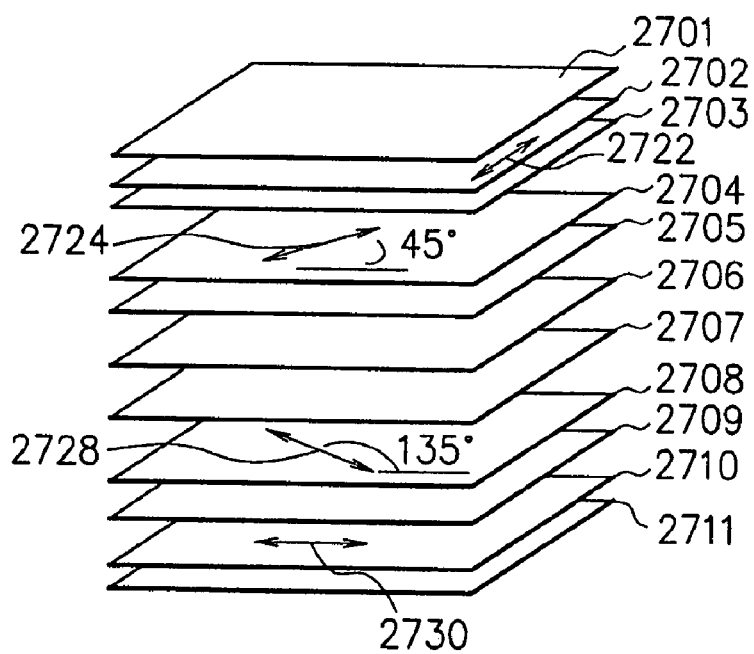
FIG. 27 is a view showing a film configuration for realizing high brightness.

On the other hand, a technique using a circularly polarizing plate as shown in FIG. 27 is proposed as a technique for improving the brightness. A liquid crystal panel 2706, in which a liquid crystal layer is sandwiched between two substrates, is sandwiched between a pair of triacetylcellulose (TAC) films 2705 and 2707. Further, both sides thereof are sandwiched between a pair of quarter wave films 2704 and 2708. Furthermore, both sides thereof are sandwiched between a pair of TAC films 2703 and 2709. Further, both sides thereof are sandwiched between a pair of polyvinyl alcohol (PVA) polarizing layers 2702 and 2710. Further, both sides thereof are sandwiched between a pair of TAC films 2701 and 2711.

An absorption axis 2722 of the polarizing layer 2702 deviates by 90 degrees from the horizontal direction in FIG. 27. An optical axis 2724 of the quarter wave film 2704 deviates by 45 degrees from the horizontal direction in FIG. 27. An optical axis 2728 of the quarter wave film 2708 deviates by 135 degrees from the horizontal direction in FIG. 27. An absorption axis 2730 of the polarizing layer 2710 is in the same direction as the horizontal direction in FIG. 27.

While the brightness is improved by 20% to 50% with this configuration, it is impossible to attain the visual angle characteristics which can be achieved by the configuration shown in FIG. 26. Although a range of a contrast 10 or more is achieved at ±80 degrees in top and bottom and right and left directions, it is achieved only at ±50 degrees in 45 degree oblique directions.

This embodiment of the invention has a configuration having both characteristics of FIG. 26 and FIG. 27.

Figure 28A:
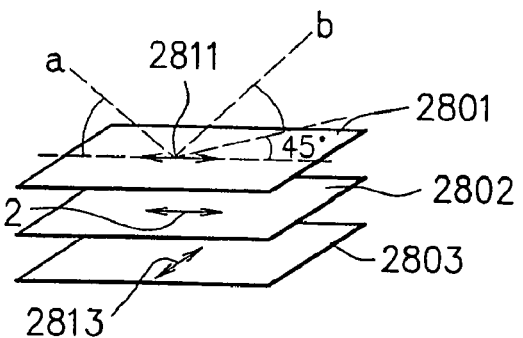
FIGS. 28A and 28B are views showing a film configuration and characteristics according to a third embodiment of the invention.

FIG. 28A shows the simplest principle configuration in this embodiment. A λ (wavelength)/2 plate 2802 is sandwiched between a pair of polarizing layers 2801 and 2803. An absorption axis 2811 of the polarizing layer 2801 is in the same direction as the horizontal direction in FIG. 28A. An optical axis 2812 of the half wave plate 2802 is also in the same direction as the horizontal direction in FIG. 28A. An absorption axis 2813 of the polarizing layer 2803 deviates by 90 degrees from the horizontal direction in FIG. 28A.

Figure 28B:
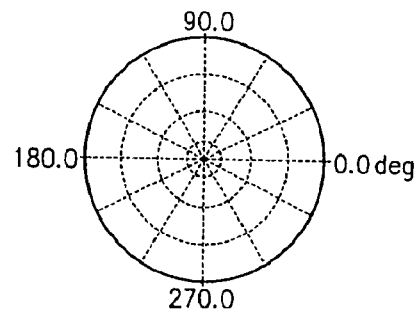

The polarizing layers 2801 and 2803 denote PVA polarizing layers, and a state is shown here in which there are no TAC films though a polarizing plate is typically provided with a pair of triacetylcellulose (TAC) films on both sides of the PVA polarizing layers. The half wave plate 2802 is provided between the pair of polarizing layers 2801 and 2803, where the retardation ((nx+ny)/2−nz)×d in a direction perpendicular to the film of the half wave plate 2802 is zero. In the above equation, nx, ny and nz are refractive indexes in respective directions, and d is a thickness. The optical axis 2812 of the half wave (retardation) plate 2802 is parallel or perpendicular to the absorption axes 2811 and 2813 of the adjacent polarizing layers 2801 and 2803. FIG. 28B shows the state of leaking light in this case, in which it is found that there is almost no leaking light in all directions.

The configuration of the entire liquid crystal panel is made to be substantially the same as this configuration. In other words, optical films and a liquid crystal layer are laminated on this configuration, but they cancel each other out so that substantially nothing exists thereon to make the configuration substantially the same as in FIG. 28A.

Figure 29A:
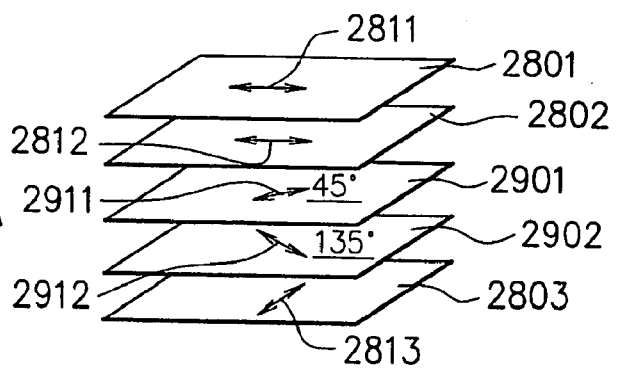
FIGS. 29A and 29B are views showing a film configuration and characteristics according to the embodiment.
Figure 29B:
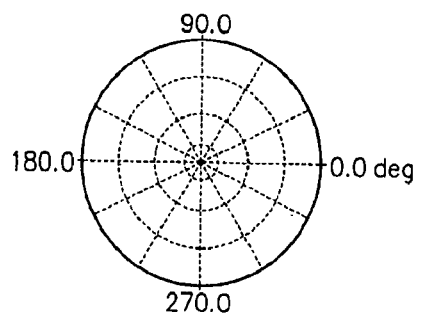

FIG. 29A shows a case in which a pair of quarter wave films 2901 and 2902 are laminated in such a manner that their optical axes 2911 and 2912 are perpendicular to each other. The quarter wave films 2901 and 2902 are inserted between the half wave plate 2802 and the polarizing layer 2803. The directions of the optical axes 2911 and 2912 of the quarter wave plates (films) 2901 and 2902 are set here to form angles of 45 degrees with the absorption axes 2811 and 2813 of the polarizing layers 2801 and 2803 respectively. The negative retardation of the quarter wave plates 2901 and 2902 is also set to zero. The quarter wave plates 2901 and 2902 convert between linearly polarized light and circularly polarized light. FIG. 29B shows the state of leaking light in this case, in which it is found that there is very little leaking light in all directions.

In FIG. 30A, a liquid crystal layer 3001 capable of vertical alignment and a film 3002 having a negative retardation $$((nx+ny)/2-nz) \times d < 0$$

only in a direction perpendicular to the film surface are further laminated. The vertically aligned liquid crystal layer 3001 has a positive retardation, anisotropy in refractive index of a liquid crystal, $$\Delta n \times \text{cell thickness } d > 0$$

only in a direction perpendicular to the liquid crystal layer 3001. The negative retardation of the aforesaid film 3002 and the positive retardation of the liquid crystal layer 3001 are set to be equal to each other to optically cancel out each other completely. The Δn is n//−n⊥, n// is a refractive index in the longitudinal direction of a liquid crystal molecule, and n⊥ is a refractive index in a direction perpendicular to the longitudinal direction of the liquid crystal molecule.

The laminated liquid crystal layer 3001 and the film 3002 are inserted between the pair of quarter wave films 2901 and 2902. The Δn×d of the film 3002 is the same as that of the liquid crystal layer 3001. The Δn of the film 3002 is nx−nz.

When the configuration in FIG. 28A is employed, leakage of light from polarizing layers 2801 and 2803 in a cross-Nicol arrangement is actually very little when viewed from any direction, and this operation is explained. The polarizing layers 2801 and 2803 in a cross-Nicol arrangement when observed from an inclined angle is considered here. The absorption axes 2811 and 2813 of the polarizing layers 2801 and 2803 are perpendicular to each other when they are viewed from the front. When viewed from an inclined angle, the absorption axes 2811 and 2813 of the polarizing layers 2801 and 2803 are still perpendicular to each other, from an a direction in FIG. 28A, without leakage of light. In contrast to the above, when they are viewed from a b direction in FIG. 28A, the absorption axes 2811 and 2813 of the polarizing layers 2801 and 2803 are not perpendicular to each other. This can easily be understood by placing, for example, two pencils to be perpendicular to each other and then observing them from a direction such as the b direction. Changing the polarized state of incident light to prevent the light from leaking therefrom even in the b direction is the operation of the half wave plate 2802 in FIG. 28A. In consideration of the case of observing from the a direction, the angles of the absorption axes 2811 and 2813 of the polarizing layers 2801 and 2803 are set in the top left direction on the incident side and the top right direction on the exit side, and the optical axis 2812 of the half wave plate 2802 is set in the top right direction. With an inclined angle in the b direction here, the absorption axis on the incident side deviates from the top left toward the left direction, and the absorption axis on the exit side deviates from the top right toward the right direction. On the other hand, the optical axis of the half wave plate 2802 having a negative retardation of 0 does not move from the top left direction. Therefore, the polarization direction of the incident light and the half wave (retardation) plate 2802 form a certain angle therebetween in the b direction. Then, the incident light, of which the polarization direction is rotated because of its half wave retardation, is brought into linearly polarized light to exit from the retardation plate 2802. The exit light, of which the polarization direction matches the direction of the absorption axis of the polarizing layer on the exit side, is completely absorbed. Therefore, there is almost no leaking light when the polarizing layers are observed from any direction as shown in FIG. 28B.

Next, the operations of the quarter wave plates 2901 and 2902, of which optical axes are perpendicular to each other, employed in FIG. 29A will be described. As described above in the description of the half wave (retardation) plate 2802, the directions of the optical axes thereof are unchangeable even when observed at an inclined angle because the retardation in the direction perpendicular to the film surface is 0. Accordingly, the optical axes 2911 and 2912 of the quarter wave plates 2901 and 2902, which are perpendicular to each other at the front, are perpendicular to each other when observed in any direction and at any inclined angle. As a result, the effects of the quarter wave plates 2901 and 2902 are cancelled out each other, which comes to the same thing as if there exists nothing.

Next, the operation of the film 3002 having negative retardation in FIG. 30A which is laminated with the liquid crystal layer 3001 is described. The negative retardation of the film 3002 here is equal to the positive retardation of the vertically aligned liquid crystal layer 3001. The optical effects of the two layers in such a relationship as described above are completely cancelled out, which comes to the same thing as if there exists nothing. Therefore, the black display as the liquid crystal display is black when viewed from any direction. FIG. 30A shows a liquid crystal panel of which the inside of the pixel is broadly divided into four types where the liquid crystal molecules tilt in the top right, the top left, the bottom left and the bottom right direction with the application of voltage. It can be understood that, as shown in FIG. 30B, the contrast of 10 or more is realized in all directions.

The optical axes 2911 and 2912 of the quarter wave plates 2901 and 2902 are perpendicular to each other and set to form angles of 45 degrees with the absorption axes 2811 and 2813 of the polarizing layers 2801 and 2803, which configuration corresponds to a so-called a circularly polarizing plate. The quarter wave plates 2901 and 2902 serve a function of bringing linearly polarized light passed through the polarizing layer into circularly polarized light. The optical effects of each film and the vertically aligned liquid crystal layer are cancelled out each other to create no optical effect in the description by now, but the state is completely changed when a voltage is applied across the liquid crystal layer 3001. Specifically, the liquid crystal layer 3001 has an optical effect to realize a white display. Further, the quarter wave retardation plates 2901 and 2902 improve the brightness of the white display at a front visual angle as mentioned in the above description.

The half wave retardation plate 2802 and the quarter wave retardation plates 2901 and 2902 are realized by stretching a polycarbonate film or a norbornene-based film. As for the stretching manner, the film is stretched in a plane and is additionally drawn in the direction perpendicular thereto with a stress exerted thereon.

The half wave retardation plate 2802 here is also realized by laminating two quarter wave retardation plates. Such a film is commercially available, by names such as NZ film from Nitto Denko Co., Ltd. or SZ film from Sumitomo Chemical Co., Ltd.

The film 3002 having the negative retardation is realized by stretching a polycarbonate film or a norbornene-based film in two directions or by applying a resin onto a film having no optical effect. Such a film is also commercially available from Nitto Denko Co., Ltd., and a film by the name of VAC film is available from Sumitomo Chemical Co., Ltd.

As the liquid crystal panel 3001, the MVA-mode liquid crystal panel which is commercially available from Fujitsu Co., Ltd. is used. As for the alignment direction thereof, one pixel is broadly divided into four types of regions where the liquid crystal molecules tilt in directions of the top right, the top left, the bottom left and the bottom right direction respectively by applying a voltage.

As the polarizing plates 2801 and 2803, a triacetylcellulose (TAC) film is typically used as a holding material of the polarizing plate, but if the TAC films exist between the polarizing layers 2801 and 2803, and, the liquid crystal layer 3001 respectively, their optical effects produce adverse effect. Therefore, this holding material is used only on one side in laminating films and should not be set on the liquid crystal layer side. Such a polarizing plate, in which the TAC film is actually provided only on one side of a polarizing layer, is commercially available from, for example, Sumitomo Chemical Co., Ltd. by name of Ultra-Thin-Polarizer. Optical films are laminated on this polarizing plate to realize the film configuration shown in FIG. 30A.

FIG. 30B is a calculation example of the visual angle characteristics when the aforementioned films and the liquid crystal layer are laminated as shown in FIG. 30A.

In the configuration in FIG. 30A, the visual angle characteristics are as shown in FIG. 30B, in which the direction with particularly high contrast is, as is clear from FIG. 30B, the top right, the top left, the bottom left and the bottom right direction. Particularly, a wide visual angle is needed in the visual directions of the top and the bottom and the right and the left, and the configuration in FIG. 31A is adopted to meet the need. The directions of the absorption axes of the polarizing layers and the directions of the optical axes of the films are rotated here from those in FIG. 30A by 45 degrees. The calculation result of the visual angle characteristics in this event is shown in FIG. 31B. The contrast is 10 or more in all directions and further, the visual angle characteristics are vertically and horizontally symmetric with particularly wide visual angle ranges at the top and the bottom and the right and the left. This enables a bright display with perfect viewing angle characteristics.

Figure 32:
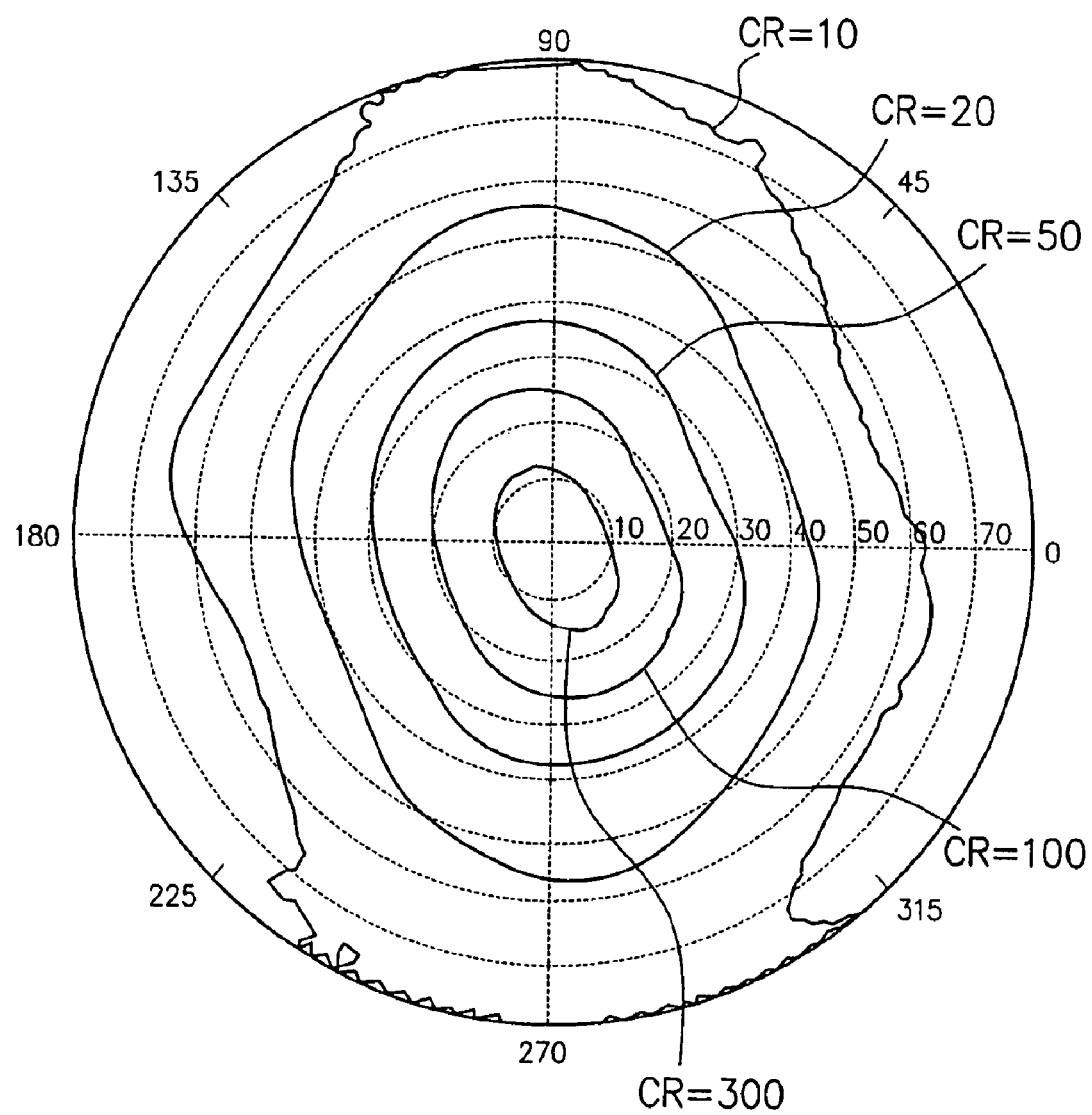
FIG. 32 is a view showing visual angle characteristics.

The measured value of the visual angle characteristics of a prototype of a liquid crystal panel is shown in FIG. 32. Since the characteristics of the films are not perfect, they differ from the calculation characteristics, but a wide viewing angle could be obtained. In addition, the display brightness of white at the front could be improved, at the same time, by 20% as compared with the case of adopting no films.

Although the description has been made by now assuming that the half wave plate 2802 in FIG. 28A is employed, more preferable visual angle characteristics can be obtained if a liquid crystal panel laminated with a pair of special half wave plates is used. This arrangement is reported by Tohoku University in SID00.

Two films having a retardation of half wavelength are laminated, in which a film having a Nz constant of 0.25 and a film having a Nz constant of 0.75, $$Nz\ \text{constant} = (nx-nz)/(nx-ny)$$

where nz is a refractive index in a direction perpendicular to the film surface, nx is a refractive index in a direction parallel to the optical axis of the film, and ny is a refractive index in a film in-plane direction perpendicular to the optical axis of the film, are laminated in such a manner that optical axes thereof are parallel to each other, and retardation axes of the films are set to be parallel or perpendicular to absorption axes of adjacent polarizing layers. This arrangement is employed in place of that in FIG. 28A and further, films and a liquid crystal layer are arranged as shown in FIG. 29A, FIG. 30A and FIG. 31A.

Moreover, when the values of (nx−nz)/(nx−ny) of the two films are 0.5 or less and 0.5 or more respectively, and the sum thereof is about 1 such as, preferably, 0.25 and 0.75, or 0.15 and 0.85, the same excellent light leakage characteristics can be obtained.

As for the negative retardation of the above-described film, it is difficult in fabrication to bring the negative retardation completely to 0 in the half wave plates and the quarter wave plates. It was found that excellent viewing angle characteristics can be obtained when the range of each negative retardation thereof is ±20 nm or less, preferably ±10 nm or less.

According to this embodiment, as shown in FIG. 31A, the half wave plate 2802, in which a film having a retardation of half wavelength is laminated, has a retardation ((nx+ny)/2−nz)×d in a direction perpendicular to the film surface (where nz is a refractive index in a direction perpendicular to the film surface, nx is a refractive index in a direction parallel to the optical axis of the film, ny is a refractive index in a film in-plane direction perpendicular to the optical axis of the film, and d is a thickness of the film) of 0 or ±20 nm or less, and the optical axes of the films are parallel or perpendicular to the absorption axis of the adjacent polarizing layer 2801.

Alternatively, the half wave plate 2802, in which two films having a retardation of half wavelength are laminated, may have values (nx−nz)/(nx−ny) of the two films of 0.5 or less and 0.5 or more respectively, where nz is a refractive index in a direction perpendicular to the film surface, nx is a refractive index in a direction parallel to the optical axis of the film, and ny is a refractive index in a film in-plane direction perpendicular to the optical axis of the film, and the optical axes of the two films may be parallel to each other, and may be parallel or perpendicular to the absorption axis of the adjacent polarizing layer 2801.

The film 3002 has a negative retardation equal to the value of $\Delta n \times d$ of the liquid crystal layer 3001 (where $\Delta n$ is $n//-n\perp$, $n//$ is a refractive index in the longitudinal direction of a liquid crystal molecule, $n\perp$ is a refractive index in a direction perpendicular to the longitudinal direction of the liquid crystal molecule, and d is a thickness), and is provided adjacent to the liquid crystal layer 3001.

The pair of quarter wave plates 2901 and 2902 have a negative retardation of 0 or ±10 nm or less, and provided to interpose the liquid crystal layer 3001 and the film 3002 therebetween. The optical axes of the pair of quarter wave plates 2901 and 2902 are perpendicular to each other and form angles of 45 degrees with the absorption axes of the pair of polarizing layers 2801 and 2803. The direction of the absorption axis of the polarizing layer on the light incident side is set at any of 0 degrees, 45 degrees, 90 degrees and 135 degrees with the right direction on the screen being 0 degrees.

As shown in FIG. 31A, the directions of the absorption axes of the polarizing layers are adjusted so that the directions in which the contrast becomes maximum are the top and bottom and right and left directions while the relationship between the optical axes of the polarizing layer on the light incident side, the polarizing layer on the light exit side, the quarter wave plates and the half wave plates in FIG. 30A is maintained.

In the liquid crystal layer 3001, the liquid crystal molecules are vertically aligned where no voltage is applied thereto, and the liquid crystal molecules are aligned to tilt, broadly, in two or more different directions in a pixel where a voltage is applied thereto. Preferably, in the liquid crystal layer 3001, the liquid crystal molecules tilt broadly in four different directions of the top right, the top left, the bottom left and the bottom right direction in a pixel where a voltage is applied thereto, and the alignment of the liquid crystal is controlled using the slits provided between the electrodes and/or the projections (protrusions) provided on the electrodes.

As described above, the use of this embodiment enables realization of a liquid crystal display which is bright and has a wide viewing angle.

Fourth Embodiment

Figure 33:
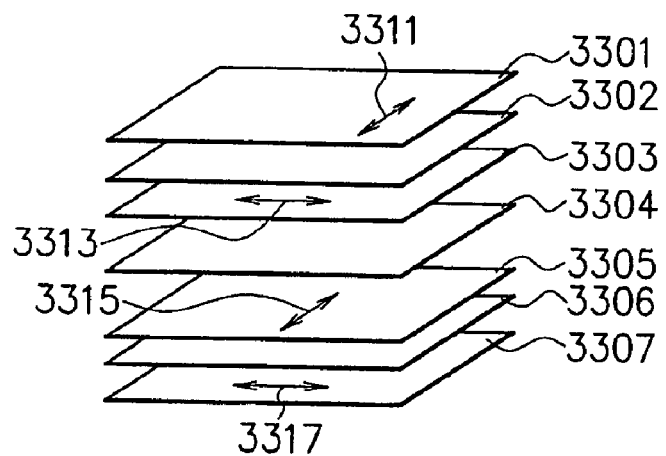
FIG. 33 is a view showing a film configuration.

In order to further improve the visual angle characteristics of the MVA-mode liquid crystal display device, a film configuration as shown in FIG. 33 is proposed. A liquid crystal layer 3304 is sandwiched between a pair of retardation films 3303 and 3305 having in-plane retardation. Further, both sides thereof are sandwiched between a pair of negative retardation films 3302 and 3306. Furthermore, both sides thereof are sandwiched between a pair of polarizing plates 3301 and 3307. An absorption axis 3311 of the polarizing plate 3301 and an absorption axis 3317 of the polarizing plate 3307 deviate from each other by 90 degrees. An optical axis 3313 of the retardation film 3303 and an optical axis 3315 of the retardation film 3305 deviate from each other by 90 degrees. The absorption axis 3311 of the polarizing plate 3301 and the optical axis 3313 of the retardation film 3303 deviate from each other by 90 degrees.

As for the visual angle characteristics, a range of a contrast 10 or more is achieved at an inclined angle of ±80 degrees or more in all directions. However, two films are used, and special film have been used which have a relationship $nx>ny>nz$ which are refractive indexes of the films in some cases.

Figure 34:
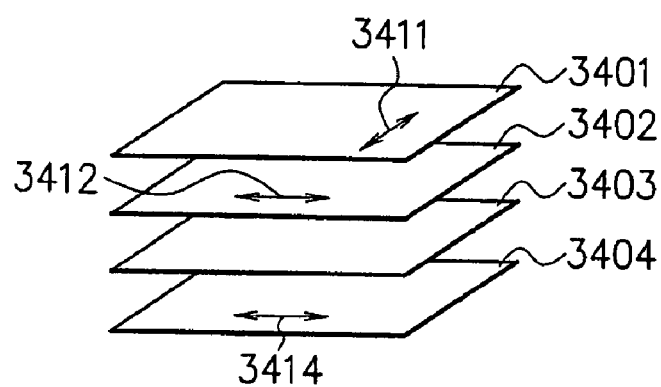
FIG. 34 is a view showing a film configuration according to a fourth embodiment of the invention.

As shown in FIG. 34, this embodiment of the invention realizes a display having excellent viewing angle characteristics without using such special films. In this embodiment, only one film 3402 is added for use to polarizing plates 3401 and 3404, and has a relationship $nx>nz>=ny$ which are refractive indexes of the film 3402.

As for the polarizing plates 3401 and 3404, the thickness of the entire polarizing plate shall be 100 microns or more. On the other hand, the in-plane retardation $(nx-ny) \times d$ of the film is set to 40 nm or more to 140 nm or less.

The retardation when a liquid crystal layer 3403 is vertically aligned shall be defined by $RLC=(n//-n\perp) \times d$.

When the sum of the negative retardation of the protective films for the polarizing plates 3401 and 3404, the negative retardation of the film 3402 having in-plane retardation, and the negative retardation of another layer having negative retardation is $Rnega$total, the following relationship is set:

20 nm<$RLC-Rnega$total<150 nm.

This makes it possible to achieve a contrast 10 or more at an inclined angle of ±70 degrees or more in all directions.

The in-plane retardation of the film 3402 having in-plane retardation serves as a function of rotating the polarization direction of polarized light. The film having negative retardation in a direction perpendicular to the layer serves as a function of canceling the positive retardation of the liquid crystal layer 3403. A positive retardation which has not been completely cancelled $RLC-Rnega$total has a function of bringing the polarized light from linearly polarized light into elliptically polarized light and adjusting its ellipticity. Further it acts to change the rotation direction of polarization of the elliptically polarized light.

A norbornene-based resin film is stretched in one direction to realize the film having the relationship $nx>nz>=ny$ as refractive indexes of the film 3402.

The polarizing plates 3401 and 3404, the polarizing plates having a large thickness, have been conventionally used, for which polarizing plates each having a protective film made of triacetylcellulose and a thickness of 100 μm or more are used.

The retardation film 3402 and the liquid crystal layer 3403 are sandwiched between the pair of polarizing plates 3401 and 3404. An absorption axis 3411 of the polarizing plate 3401 and an optical axis 3412 of the retardation film 3402 adjacent thereto are arranged to be perpendicular to each other. The absorption axis 3411 of the polarizing plate 3401 and an absorption axis 3414 of the polarizing plate 3404 are perpendicular to each other.

Figure 35:
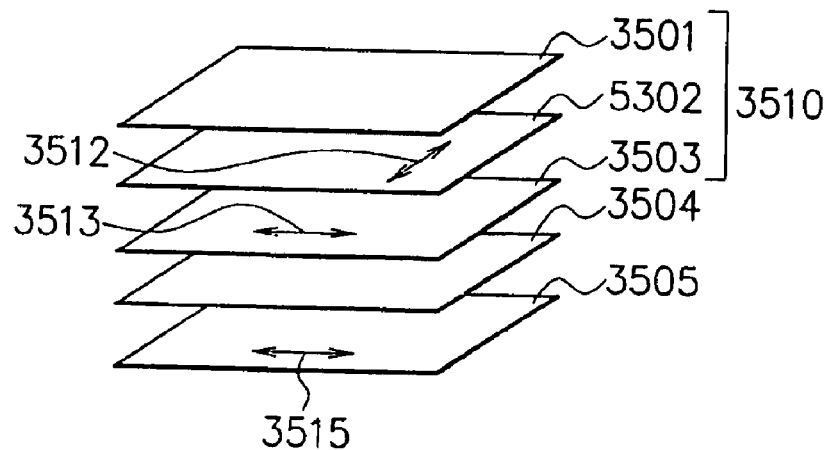
FIG. 35 is a view showing another film configuration.

In FIG. 35, a configuration is employed in which a film 3503 having an in-plane retardation of 40 nm to 130 nm (preferably from 60 nm to 110 nm) is used as a protective film for a polarizing plate 3510. The polarizing plate 3510 is constituted by laminating a protective film 3501, a polarizing layer 3502, and the retardation film and protective film 3503. A liquid crystal layer 3504 is sandwiched between the polarizing plates 3510 and 3505. The polarizing layer 3502, the retardation film and protective film 3503, the liquid crystal layer 3504 and the polarizing plate 3505 correspond to the polarizing plate 3401, the retardation film 3402, the liquid crystal layer 3403 and the polarizing plate 3404 in FIG. 34 respectively.

Since the retardation film 3503 also serves as the protective film for the polarizing plate 3510, the number of films for use in total decreases, which enables reduced cost. The negative retardation of this film is also adjusted to satisfy the above-described relationship of retardation.

For example, a norbornene-based resin film is stretched in two directions or more to realize the film having negative retardation.

Figure 36:
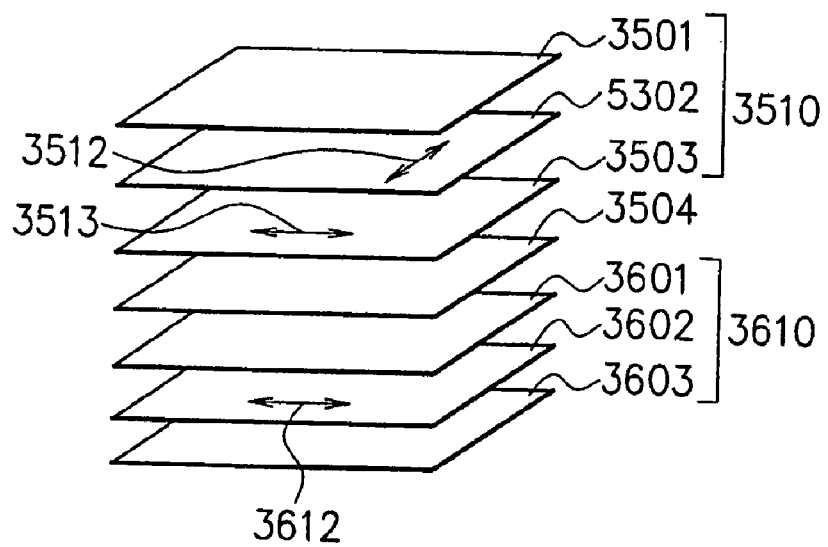
FIG. 36 is a view showing another film configuration.

FIG. 36 shows a generalized configuration, in which the polarizing plate 3505 on the lower side in FIG. 35 is changed. In place of the polarizing plate 3505, a polarizing plate 3610 is used. The polarizing plate 3610 is constituted by laminating a film 3601, a polarizing layer 3602 and a protective film 3603. An absorption axis 3612 of the polarizing layer 3602 is in the same direction as that of the absorption axis 3515 of the polarizing plate 3505 in FIG. 35.

The film 3601 is also capable of having in-plane retardation. In this case, its optical axis is set perpendicular to the absorption axis 3612 of the adjacent polarizing layer 3602. Further, it is also possible to set the in-plane retardation of the film 3601 to almost zero. It is also possible to use a film having only negative retardation without in-plane retardation.

According to this embodiment, in FIG. 34, liquid crystal molecules can be vertically aligned in the liquid crystal layer 3403. The retardation film 3402, which is a retardation film having retardation in the plane, is provided such that its optical axis is perpendicular to the absorption axis of the adjacent polarizing layer 3401, and has a relationship of refractive indexes nx>nz>=ny (where nx is a refractive index in a direction of the optical axis, ny is a refractive index in an in-plane direction perpendicular to nx, and nz is a refractive index in a direction perpendicular to the plane). The first polarizing plate 3401 is provided with a protective film having a thickness of 100 microns or more. The retardation film 3402 has an in-plane retardation (nx−ny)×d (d is a thickness) of 40 nm or more to 130 nm or less.

The liquid crystal layer 3403 has a retardation RLC=(n//−n⊥)×d (n// is a refractive index in the longitudinal direction of a liquid crystal molecule, n⊥ is a refractive index in a direction perpendicular to the longitudinal direction of the liquid crystal molecule, and d is a thickness) when the liquid crystal molecules are vertically aligned. The liquid crystal layer 3403 has a relationship 20 nm<RLC−Rnegatotal<150 nm where Rnegatotal is the sum of the negative retardation of the protective film for the polarizing plate 3401, the negative retardation of the retardation film 3402 and a negative retardation of another layer having the negative retardation when it is added. The polarizing plate 3401 includes a protective film made of triacetylcellulose, norbornene-based resin, or polycarbonate.

In FIG. 35, the polarizing plate 3510 includes the protective film 3503 having in-plane retardation. The protective film 3503 is provided such that the optical axis thereof is perpendicular to the absorption axis of the polarizing layer 3502. The polarizing plate 3510 is configured such that the in-plane retardation (nx−ny)×d of the protective film 3503 (nx is a refractive index in a direction of the optical axis, ny is a refractive index in a in-plane direction perpendicular to nx, and d is a thickness) is set to 40 nm or more to 130 nm or less and, in the case of two protective films, the sum of in-plane retardations of the two films is set to 40 nm or more to 130 nm or less.

The liquid crystal layer 3504 has a retardation RLC=(n//−n⊥)×d when the liquid crystal molecules are vertically aligned and a relationship 20 nm<RLC−Rnegatotal<150 nm where Rnegatotal is the sum of the negative retardation of the protective film 3503 and a negative retardation of another layer having negative retardation when it is added.

As described above, the use of this embodiment enables realization of a liquid crystal display which is bright and has a wide viewing angle.

Fifth Embodiment

In order to realize a wide viewing angle, in the MVA-mode liquid crystal display device, liquid crystal molecules are vertically aligned when no voltage is applied thereto, and separately tilt in four directions in four regions respectively when a voltage is applied thereto. The visual angle characteristics in the respective regions are mixed, resulting in a wide viewing angle. In such a case, the boundary between alignment regions turns black, which presents a problem that the display brightness of white is not high. Therefore, a technique of realizing a bright display by limiting the number of division to two is considered.

Figure 37:
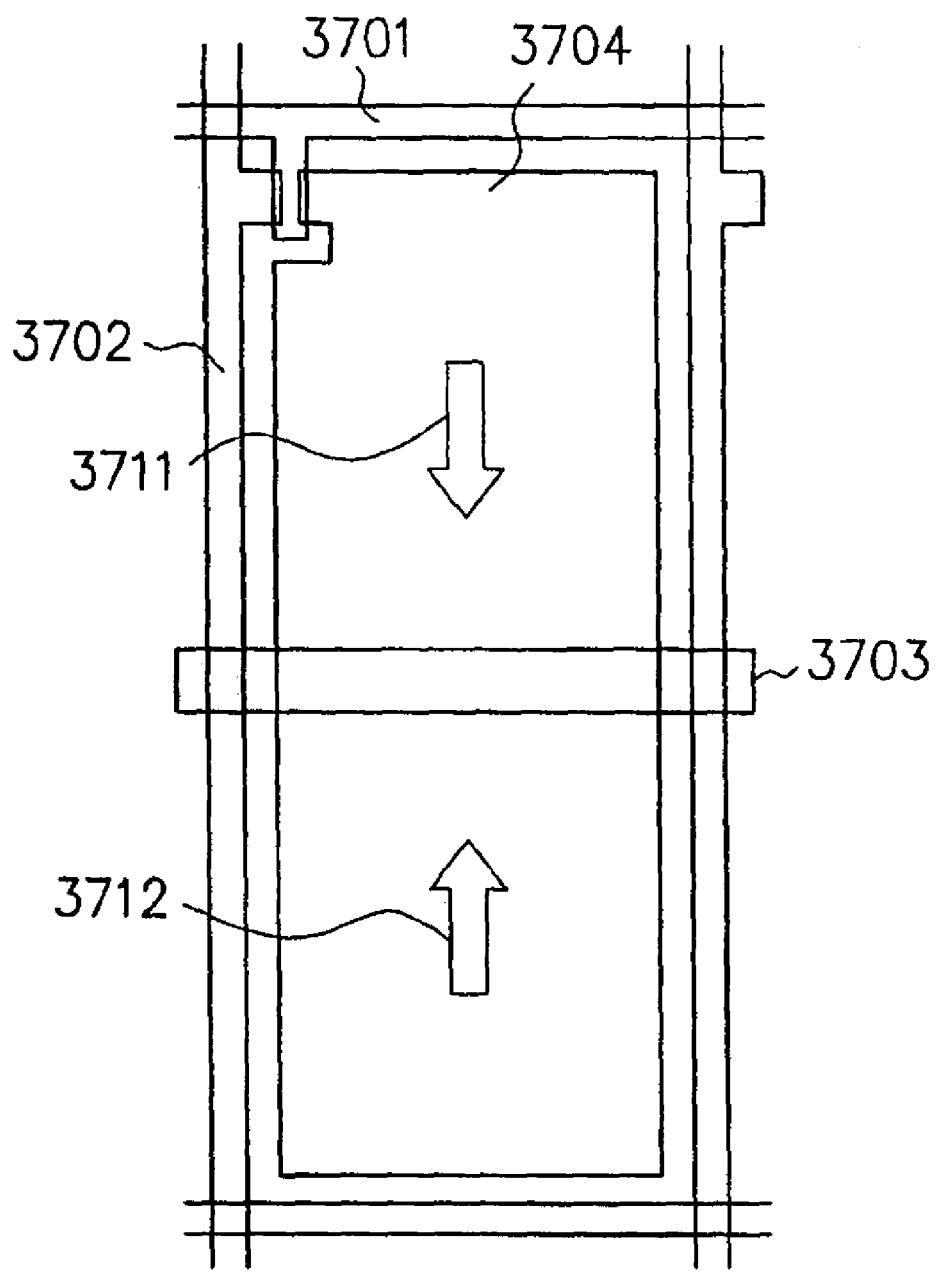
FIG. 37 is a view showing a two-domain liquid crystal display device.

FIG. 37 shows an example of the manner of alignment in the liquid crystal display device divided in two. The TFT substrate is formed with a gate line 3701, a data line 3702, a Cs line 3703 and an ITO pixel electrode 3704. As shown by thick arrows 3711 and 3712, alignment is divided by the Cs line 3703 running in the middle of a pixel and the gate line 3701. The boundaries of the alignment are hidden behind the gate line 3701 and the Cs line 3703. Such a two-domain display has a problem that its viewing angle is narrow compared with that of the four-domain type. Particularly, coloring at an inclined visual angle is a problem.

FIG. 38A shows its direction and the like. An example is taken in which liquid crystal molecules are aligned in a divided manner to tilt in the top and bottom directions as shown by the arrows 3711 and 3712. An absorption axis 3811 of an analyzer (polarizing plate) and an absorption axis 3812 of a polarizer (polarizing plate) are provided, in directions shown in FIG. 38A, perpendicular to each other. In this display, the liquid crystal molecules are vertically aligned where no voltage is applied thereto with the display in black. On the other hand, when a voltage is applied, the liquid crystal molecules tilt in the top and bottom directions in FIG. 38A, which allows light to pass therethrough by the birefringence of the liquid crystal to produce a white display.

A case in which an observer 3801 observes this display from the vertical direction is explained here. FIG. 38B is a cross-sectional view of FIG. 38A when viewed from the horizontal direction. A length 3822 of a liquid crystal molecule 3821 looks short when viewed by the observer 3801. Therefore, the actual birefringence of the liquid crystal decreases, its white display slightly darkens or becomes bluish to some extent.

On the other hand, a case in which an observer 3802 observes this display from the horizontal direction in FIG. 38A is explained. FIG. 38C is a cross-sectional view of FIG. 38A when viewed from the vertical direction. An optical path 3832 of the liquid crystal layer which the observer 3802 views is longer than an optical path 3833 when an observer views the liquid crystal layer from the front. In this case, the birefringence of the liquid crystal itself does not change, but the birefringence of the liquid crystal layer increases because of the longer optical path. This presents a problem that the display turns from white into yellowish.

It is an object of this embodiment of the invention to decrease the phenomenon of turning to bluish or yellowish. Though "technique of using a cholesteric layer and a quarter wave layer in combination" is proposed in order to increase the brightness of a backlight, the coloring at an inclined visual angle is utilized to decrease the coloring of the liquid crystal display at an inclined visual angle is the main point of this embodiment.

Figure 39:
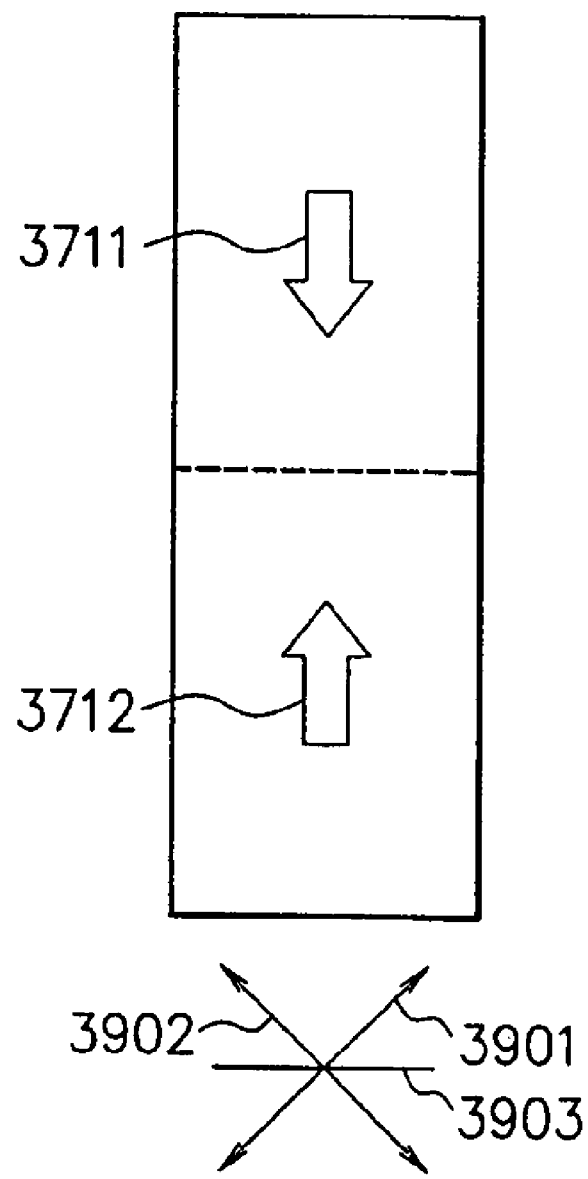
FIG. 39 is a plane view showing a liquid crystal display device according to a fifth embodiment of the invention.

As shown in FIG. 39, the liquid crystal molecule alignment directions 3711 and 3712 are opposite to each other. An absorption axis 3901 of a polarizing plate with a cholesteric reflective layer laminated thereon and an absorption axis 3902 of an analyzer are perpendicular to each other. An optical axis 3903 of a quarter wave retardation layer tilts 45 degrees from the above-described absorption axes 3901 and 3902. The optical axis 3903 of the quarter wave layer adjacent to the cholesteric layer is set to be perpendicular to the alignment directions 3711 and 3712 of the liquid crystal molecules.

Figure 40A:
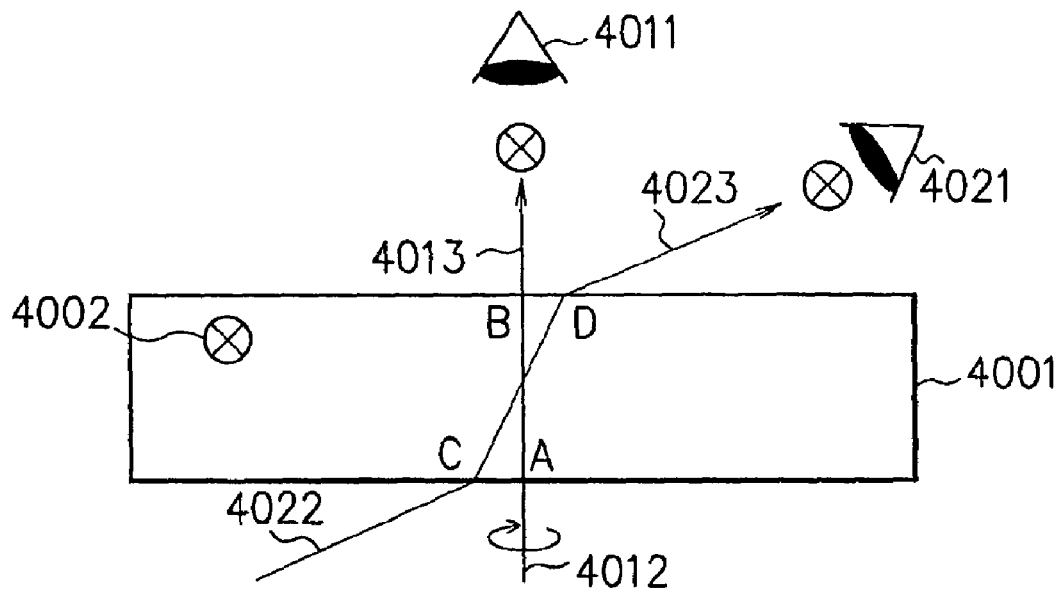
FIGS. 40A and 40B are views for explaining the quarter wave plate.
Figure 40B:
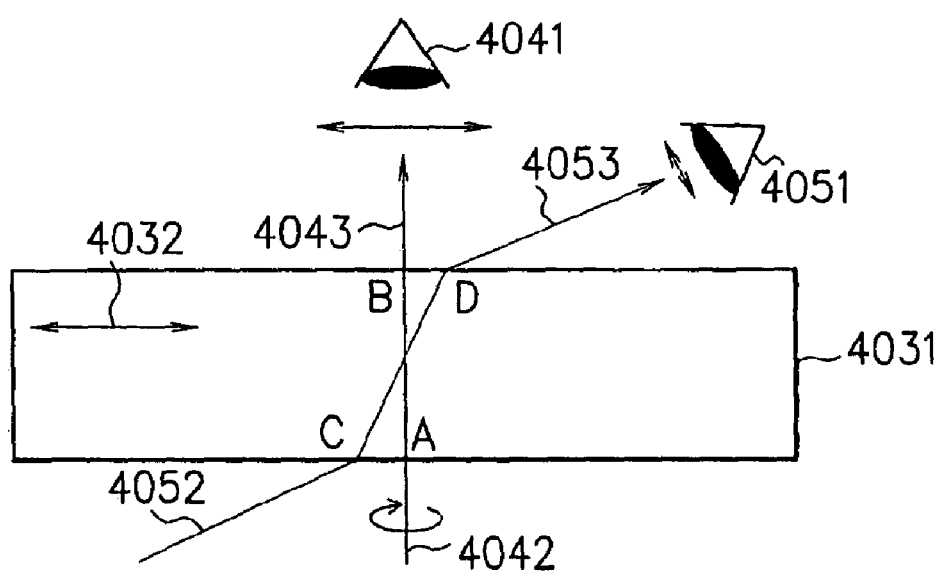
Figure 41A:
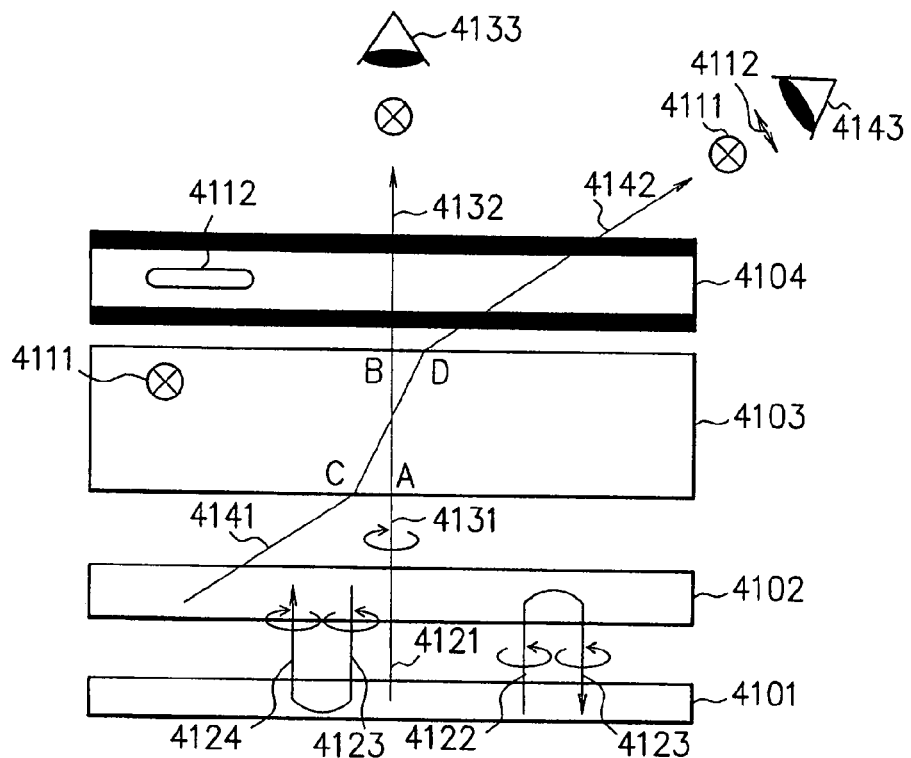
FIGS. 41A and 41B are cross-sectional views of the liquid crystal display device of the embodiment.

As shown in FIG. 41A, in the liquid crystal display device, a backlight 4101, a cholesteric layer 4102, a quarter wave plate 4103 and a liquid crystal layer (including polarizing plates) 4104 are laminated in order. The cholesteric layer 4102 and the quarter wave plate 4103 adjacent thereto are explained. Of incident light from the backlight 4101, the cholesteric layer 4102 reflects a counterclockwise circularly polarized light 4122 to make it a counterclockwise circularly polarized light 4123, and allows a clockwise circularly polarized light 4121 to pass as it is a clockwise circularly polarized light 4131. Then, the counterclockwise circularly polarized light 4123 which has been reflected by the cholesteric layer 4102 is reflected by a reflector of the backlight 4101 to be a clockwise circularly polarized light 4124, is incident again on the cholesteric layer 4102 and passes through it. In other words, the cholesteric layer 4102 converts, in cooperation with the backlight 4101, incident natural light into the clockwise circularly polarized light 4131. The quarter wave plate 4103 has a function of converting the incident circularly polarized light into linearly polarized light. The quarter wave plate is explained with reference to FIGS. 40A and 40B.

FIG. 40A shows a case in which an optical axis 4002 of a quarter wave plate 4001 points in a depth direction in FIG. 40A. The quarter wave plate 4001 allows circularly polarized lights 4012 and 4022 to be incident thereon and linearly polarized lights 4013 and 4023 to exit therefrom. An observer 4011 at the front receives the light 4013, and an observer 4021 at an inclined angle receives the light 4023.

When the quarter wave plate 4001 is a uniaxial optical film, the light 4023, which exits toward the observer 4021 at the inclined angle in a direction perpendicular to the optical axis 4002 of the quarter wave plate 4001, generally becomes yellowish. In this direction, the optical path length (from C to D in FIG. 40A) of the obliquely incident circularly polarized light 4022 is longer than the optical path length (from A to B in FIG. 40A) of the vertically incident circularly polarized light 4021, which increases birefringence. This results in excessive birefringence at an inclined visual angle to cause yellowish coloring in a system which is adjusted to create white without coloring at the front. This phenomenon corresponds to that of FIG. 38B.

FIG. 40B shows a case in which an optical axis 4032 of a quarter wave plate 4031 points in the horizontal direction in FIG. 40B. The quarter wave plate 4031 allows circularly polarized lights 4042 and 4052 to be incident thereon and linearly polarized lights 4043 and 4053 to exit therefrom. An observer 4041 at the front receives the light 4043, and an observer 4051 at an inclined angle receives the light 4053.

The light 4053, which obliquely exits in a direction parallel to the optical axis 4032 of the quarter wave plate 4031, generally becomes bluish. In this direction, the anisotropy in refractive index itself decreases at an inclined visual angle, which decreases effects of birefringence though the optical path length increases. Therefore, the birefringence is insufficient at the inclined visual angle, which causes bluish coloring. This phenomenon corresponds to that of FIG. 38C.

Considering the liquid crystal layer 4104 in FIG. 41A, the same description can apply thereto about coloring, when the direction in which the liquid crystal molecules are aligned is substituted for the direction of the optical axis of the aforementioned quarter wave plate, "having half wavelength" for the retardation, and linearly polarized light passed through the polarizer for the incident light. In short, the phenomena in FIGS. 38B and 38C occur.

Figure 41B:
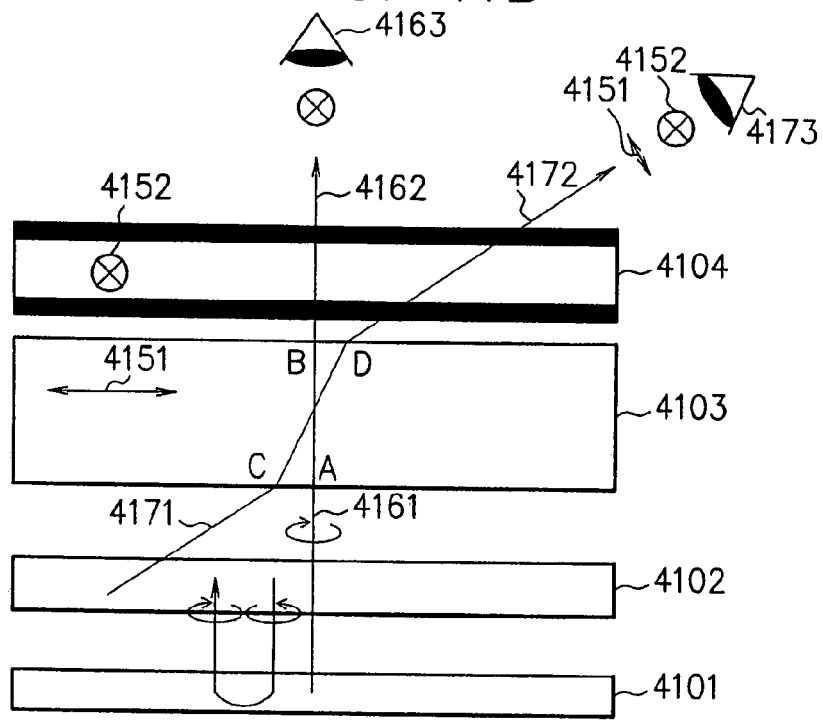

FIGS. 41A and 41B show the whole configuration of the liquid crystal layer (including the polarizing plates) 4104, the quarter wave plate 4103, the cholesteric layer 4102 and the backlight 4101, which are set such that optical axes 4111 and 4151 of the quarter wave plate 4103 and optical axes 4112 and 4152 of the liquid crystal molecule of the liquid crystal layer are perpendicular to each other. FIG. 41A shows a case when the whole configuration is observed from the top direction or the bottom direction in FIG. 39, and FIG. 41B shows a case when the whole configuration is observed from the top right direction or the top left direction.

FIG. 41A is first explained. An observer 4133 at the front receives a light 4132 which is a light 4131 after exiting through the quarter wave plate 4103 and the liquid crystal layer 4104. An observer 4143 at an inclined angle receives a light 4142 which is a light 4141 after exiting through the quarter wave plate 4103 and the liquid crystal layer 4104. The light 4142 passing through the quarter wave plate 4103 adjacent to the cholesteric layer 4102 becomes yellowish by the effect of its longer optical path length. This phenomenon corresponds to that of FIG. 40A. Then, this light 4142 passes through the liquid crystal layer 4104, and it becomes bluish because the actual birefringence of the liquid crystal becomes smaller. This phenomenon corresponds to that of FIG. 38B. Thus, the influence of the quarter wave plate 4103 (yellowish) and the influence of the liquid crystal layer 4104 (bluish) are canceled out each other, which realizes a display with almost no coloring.

FIG. 41B shows a case in which the whole configuration is observed from a direction different by 90 degrees from that of FIG. 41A. An observer 4163 at the front receives a light 4162 which is a light 4161 after exiting through the quarter wave plate 4103 and the liquid crystal layer 4104. An observer 4173 at an inclined angle receives a light 4172 which is a light 4171 after exiting through the quarter wave plate 4103 and the liquid crystal layer 4104. The light 4172 passing through the quarter wave plate 4103 adjacent to the cholesteric layer 4102 becomes bluish because the actual birefringence of the quarter wave plate 4103 becomes smaller. This phenomenon corresponds to that of FIG. 40B. Then, this light 4172 passes through the liquid crystal layer 4104, and it becomes yellowish by the effect of its longer optical path length. This phenomenon corresponds to that of FIG. 38B. Thus, the influence of the quarter wave plate 4103 (yellowish) and the influence of the liquid crystal layer 4104 (bluish) are canceled out each other, which realizes a display with almost no coloring.

As described above, the coloring by the liquid crystal layer 4104 and the coloring by the quarter wave plate 4103 are canceled out each other to realize an excellent display.

FIG. 37 is an alignment state when a typical two-domain alignment is performed. The pixel area is set which is surrounded by the gate lines 3701 and the data lines 3702. Each pixel is provided with the TFT. The liquid crystal molecules are vertically aligned where no voltage is applied thereto. The directions in which the liquid crystal molecules tilt with application of a voltage are controlled by applying ultraviolet light to the surface of an alignment film or by pre-tilt by rubbing the surface of the alignment film. The directions in which the liquid crystal molecules tilt are set to directions perpendicular to the gate lines 3701 such that they tilt in the formation of stretched arms viewed from the gate lines 3701.

FIG. 39 shows the alignment directions 3711 and 3712 and directions of the absorption axes 3901 and 3902 of the polarizing plates and the optical axis 3903 of the quarter wave plate with respect to this TFT-LCD. In FIGS. 41A and 41B, a film made by stretching a polycarbonate film is used as the quarter wave plate 4103. The value of birefringence at a wavelength of 550 nm is set in a range of 137.5 nm±10 nm. A TAC film is used as a substrate film of the cholesteric liquid crystal layer 4102. The pitch of the cholesteric liquid crystal is set to include a range of reflecting visible light and further to include the infrared region. This enables realization of characteristics without great change in reflection wavelength from the cholesteric liquid crystal layer 4102 even at an inclined angle in an oblique direction. As for the twisted direction, a clockwise twisted cholesteric layer is used for the cholesteric layer 4102. The cholesteric liquid crystal layer 4102 is formed by applying a cholesteric liquid crystal several times and drying individual layers at room temperature for cure.

Although FIG. 39 shows a plane view, the sectional configuration is explained using FIGS. 41A and 41B. A side-edge type backlight is used as the backlight 4101. This configuration is made by laminating the cholesteric liquid crystal layer 4102, the quarter wave plate 4103, the polarizer 4104, the liquid crystal panel 4104 and the analyzer 4104 in order viewed from the backlight 4101. The Δn×d of the liquid crystal layer is set in a range from 200 nm to 400 nm.

Figure 42:
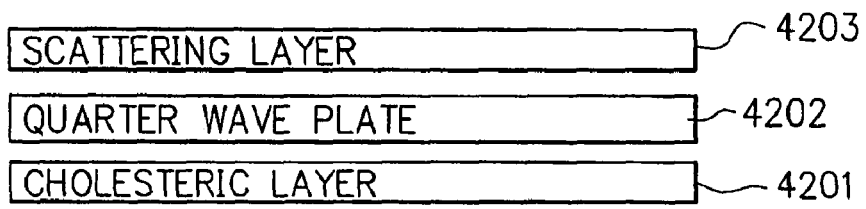
FIG. 42 is a view showing a configuration in which a scattering layer is added to a film.

It is effective to provide a light scattering layer between the quarter wave plate 4103 and the liquid crystal substrate 4104. That configuration is shown in FIG. 42. On a cholesteric layer 4201, a quarter wave plate 4202 and a scattering layer 4203 are laminated. This scattering layer 4203 is realized by mixing a scattering material in an adhesive which adheres the quarter wave plate 4202 to the polarizing plate. A scattering layer having scattering property of a Haze value of 40 or more is employed.

Figure 43:
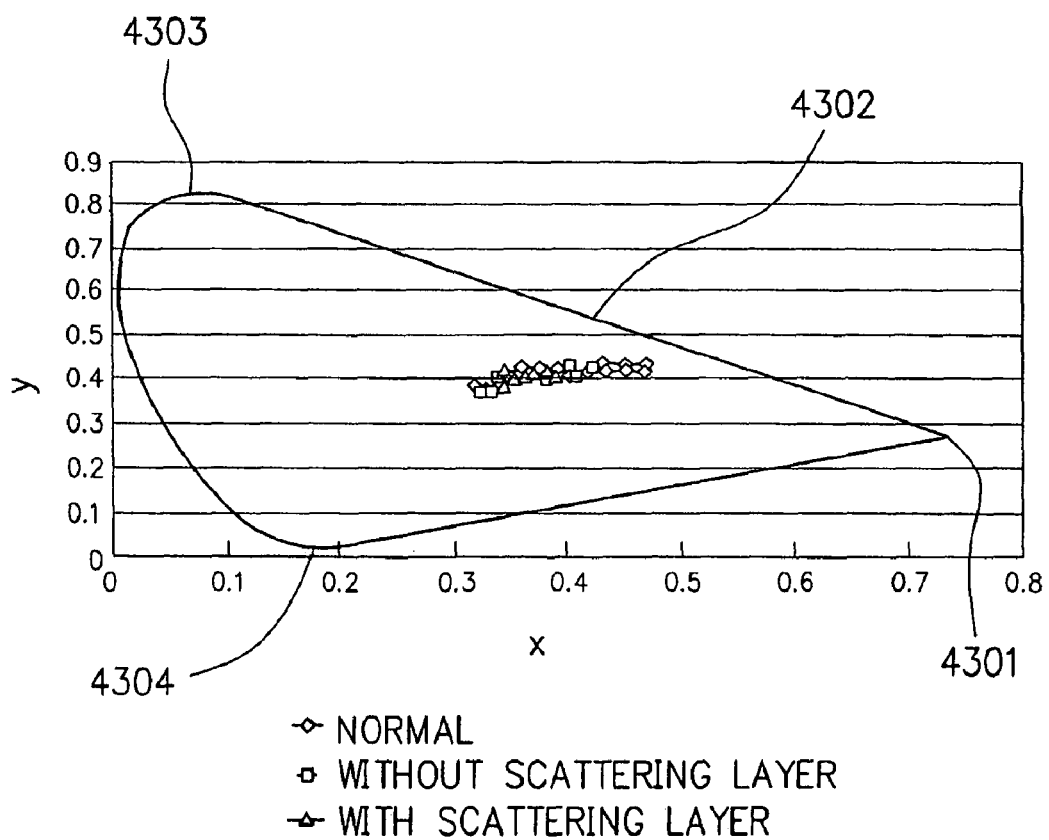
FIG. 43 is a view showing the measured result of coloring when a display, which is in a white display at the front, is viewed from an oblique direction.

FIG. 43 shows the measured result of the visual angle characteristics when this embodiment is actually employed. The coloring in a white display was measured in all directions at intervals of 15 degrees from the front at an inclined angle of 70 degrees. A region 4301 indicates red, a region 4302 yellow, a region 4303 green, a region 4304 blue, and a region of the center thereof white.

A graph shown by rhombuses shows a case of a vertical two-domain panel (indicated as "NORMAL" in FIG. 43) without using the cholesteric layer 4102 and the quarter wave plate 4103, in which a phenomenon of yellowish coloring is viewed. A graph shown by squares shows a case without a scattering layer shown in FIGS. 41A and 41B (indicated as "WITHOUT SCATTERING LAYER" in FIG. 43). A graph shown by triangles shows the liquid crystal panel employing the configuration having the scattering layer shown in FIG. 42 added thereto (indicated as "WITH SCATTERING LAYER" in FIG. 43), in which the coloring could be reduced at any visual angle in any direction.

The above explanation is made about the case of the vertical alignment where no voltage is applied, and an embodiment in which the invention is applied to a horizontal alignment display is explained here. FIGS. 44A and 44B show an example in which the invention is applied to an IPS (in-plane switching mode) liquid crystal display.

FIG. 44A is a cross-sectional view of the IPS-mode liquid crystal display. A liquid crystal layer 4402 is provided between an opposite substrate 4401 and a TFT substrate 4403. The TFT substrate 4403 is formed with a common electrode 4412 and a drain electrode 4411 through an insulating film 4413. The opposite substrate 4401 is not provided with an electrode. When a voltage is applied to the drain electrode 4411, an electric field occurs between the drain electrode 4411 and the common electrode (the ground potential).

FIG. 44B is a plane view of the TFT substrate 4403 of the liquid crystal display in FIG. 44A. The TFT substrate is formed with a gate line 4421, a data line 4422, a drain electrode 4423 and a common electrode 4424. A liquid crystal molecule 4432 is aligned in a clockwise direction of 15 degrees from the direction in which the drain electrode 4423 extends where no voltage is applied thereto. An absorption axis 4442 of a polarizing plate on the light incident side (an absorption axis of a polarizer) is set to be perpendicular to the alignment direction of the liquid crystal molecule 4432 where no voltage is applied. The alignment of a liquid crystal molecule 4431 tilts in a direction perpendicular to the drain electrode 4423 with the application of a voltage. In FIG. 44B, the liquid crystal molecule 4431 is aligned in a clockwise direction of 60 degrees during a white display. Here, an optical axis 4443 of a quarter wave plate is set in a direction which is almost perpendicular to the alignment direction of the liquid crystal molecule 4431 during the white display and forms an angle of 45 degrees with the absorption axis 4442 of the polarizer. An absorption axis 4441 of the analyzer is perpendicular to the absorption axis 4442 of the polarizer.

In such an IPS-mode display here, the alignment direction of the liquid crystal molecules in the white display can not completely be determined. The arrangement in this case is set such that the direction of the optical axis of the quarter wave plate is perpendicular, as much as possible, to the direction which is considered that the liquid crystal molecules are rotated thereto and aligned therein, and that the optical axis of the quarter wave plate and the absorption axis of the polarizer to form an angle of 45 degrees.

According to this embodiment, the backlight 4101 supplies light in FIGS. 41A and 41B. The cholesteric liquid crystal layer 4102 and the quarter wave plate 4103 are sandwiched between the backlight 4101 and the liquid crystal panel 4104. The alignment direction of the liquid crystal molecule of the liquid crystal panel 4104 and the optical axis of the quarter wave plate 4103 are perpendicular to each other.

As shown in FIG. 39, in the liquid crystal panel, the liquid crystal molecules are vertically aligned where no voltage is applied thereto, and separately tilt in the two directions 3711 and 3712 which differ 180 degrees from each other by applying a voltage. Alternatively, the liquid crystal molecules may be arranged to tilt in one direction by applying a voltage.

In FIG. 42, the scattering layer 4203 is formed between the quarter wave plate 4202 and the liquid crystal panel 4104 (FIGS. 41A and 41B). The scattering layer 4203 has a Haze value of 40 or more.

In FIGS. 44A and 44B, the liquid crystal molecule 4431 in the liquid crystal panel is horizontally aligned where a voltage is applied thereto, and the alignment direction is perpendicular to the optical axis 4443 of the quarter wave plate. It should be noted that the liquid crystal molecule in the liquid crystal panel may be horizontally aligned where no voltage is applied thereto, and the alignment direction may be perpendicular to the optical axis of the quarter wave plate. The display mode of the liquid crystal panel is the in-plane switching mode.

As described above, the use of this embodiment enables realization of a bright display and a liquid crystal display with a wide viewing angle.

Sixth Embodiment

Figures 45A, 45B:
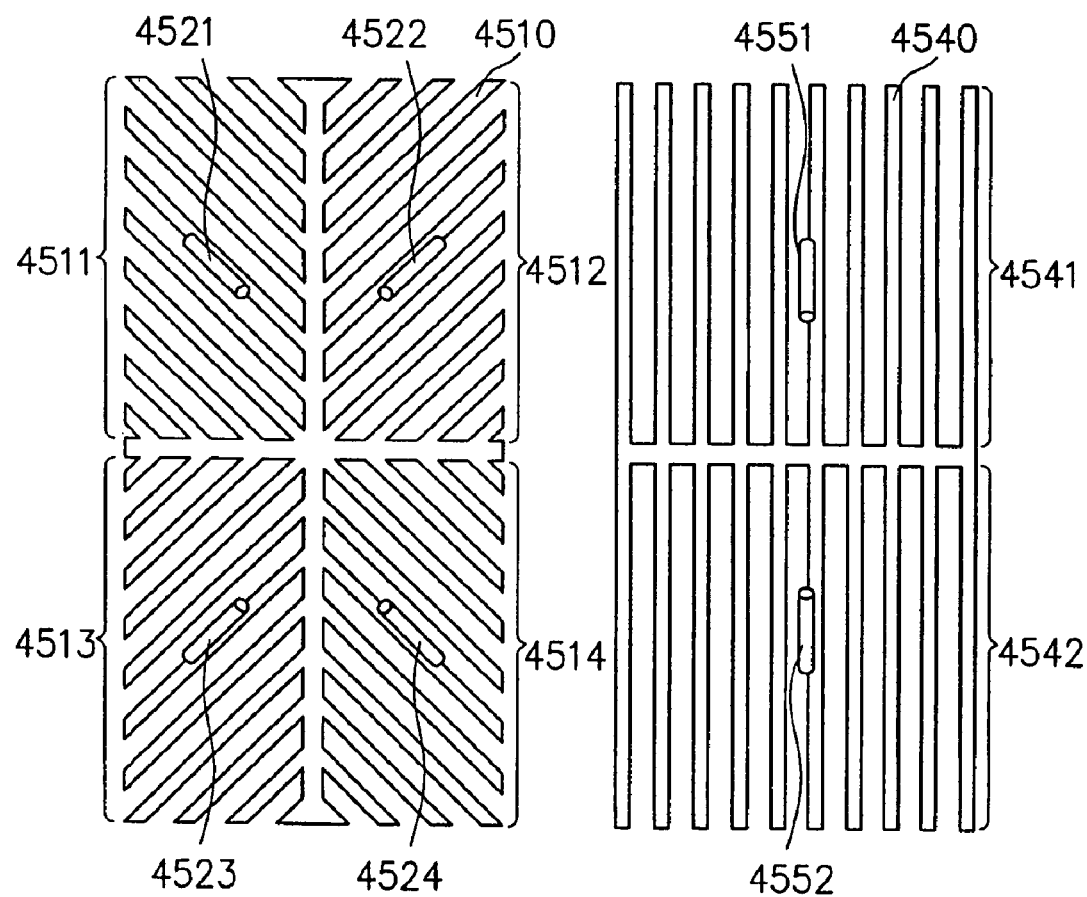
FIGS. 45A and 45B are views showing an electrode configuration of the MVA-mode liquid crystal display device.

FIGS. 45A and 45B show an example of the electrode structure of the MVA-mode liquid crystal panel. FIG. 45A shows a case of four domains, and FIG. 45B shows a case of two domains. The MVA-mode liquid crystal panel is provided with a domain control means, which is constituted by any of or a combination of a projection, a depression, and a slit provided in electrodes 4510 and 4540, on a surface of at least one of a pair of substrates. The MVA-mode liquid crystal panel uses a nematic liquid crystal having negative dielectric anisotropy, in which liquid crystal molecules are aligned almost perpendicular to the substrate when no voltage is applied thereto. The liquid crystal molecules are controlled by the domain control means so that the liquid crystal molecules tilt in a plurality of directions in each pixel when a voltage is applied. On both sides of the liquid crystal panel, a pair of polarizing elements are disposed such that absorption axes 4501 and 4502 (absorption axes 4531 and 4532) thereof are perpendicular to each other.

In the case of the fine slit electrodes 4510 and 4540 having a pitch of about 6 µm (line/space: 3 µm/3 µm), the liquid crystal molecules have a property of tilting in a direction parallel to the slits when a voltage is applied thereto.

Accordingly, when the slit electrode 4510 is formed so that liquid crystal molecules 4521 to 4524 tilt in four directions as shown in FIG. 45A, the alignment of four domains 4511 to 4514 is realized. Alternatively, when the slit electrode 4540 is formed so that liquid crystal molecules 4551 and 4552 tilt in two directions as shown in FIG. 45B, the alignment of two domains 4541 and 4542 is realized.

Figure 46A:
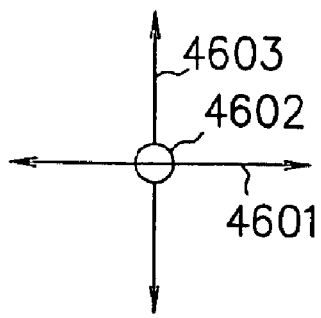
FIGS. 46A to 46D are views showing alignment of liquid crystal molecules.

Next, the relationship between the tilt direction of the liquid crystal molecule and the direction of the absorption axis of the polarizing element is explained with FIGS. 46A to 46D. As shown in FIG. 46A, when the voltage is turned off, a liquid crystal molecule 4602 is aligned perpendicular to the substrate surface. FIG. 46A shows the relationship between the liquid crystal molecule 4602 and absorption axes 4601 and 4603 of the pair of polarizing elements in this event. The light passed through one of the polarizing elements passes through the liquid crystal without receiving influence of the birefringence of the liquid crystal molecule 4602, and then is intercepted by the other polarizing element, resulting in a black display.

Figure 46B:
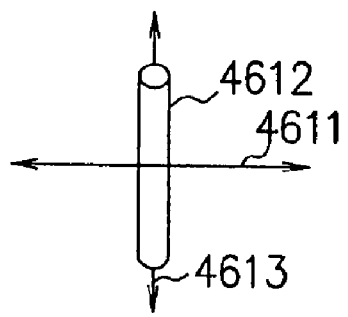
Figure 46C:
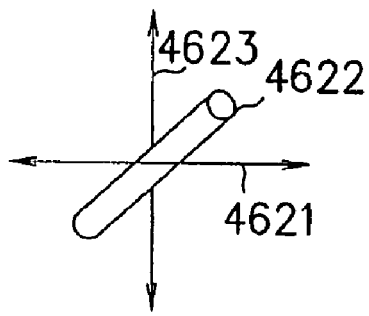

When the voltage is turned on as shown in FIGS. 46B and 46C, the liquid crystal molecule having negative dielectric anisotropy tilts with respect to the substrate surface, and when a sufficiently large voltage is applied, liquid crystal molecules 4612 and 4622 become almost parallel to the substrate surface. In order to realize an optimal white display, the direction in which the liquid crystal molecule tilts is subjected to constraints with respect to the absorption axis.

FIG. 46B shows a case in which the liquid crystal molecule 4612 tilts in a direction parallel or perpendicular to an absorption axis 4613 when the voltage is turned on. In this case, the light passed through one of the polarizing elements passes through the liquid crystal without receiving influence of the birefringence of the liquid crystal molecule 4612, and then is intercepted by the other polarizing element as in the case of the voltage being turned off. Therefore, it is impossible to obtain a white display.

In order to obtain an optimal white display, the tilt direction of the liquid crystal molecule 4622 should form angles of 45 degrees with absorption axes 4621 and 4623 as shown in FIG. 46C. In this case, the linearly polarized light passed through one of the polarizing elements is brought into elliptically polarized light by receiving the influence of the birefringence of the liquid crystal molecule 4622 to create light which passes through the other polarizing element, resulting in a white display.

Figure 46D:
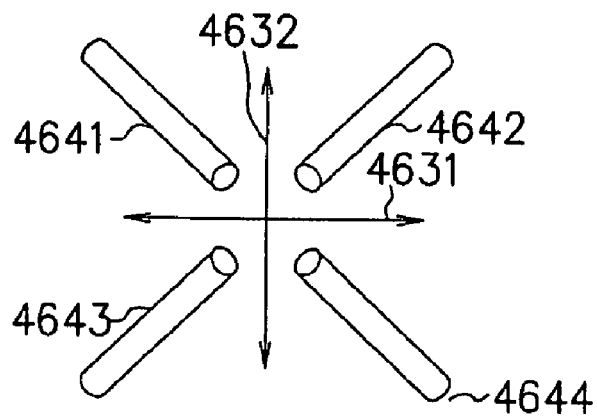

Therefore, as shown in FIG. 46D, the four directions in which liquid crystal molecules 4641 to 4644 should tilt when a voltage is applied thereto, in the MVA-mode liquid crystal panel, are limited to the directions which form angles of 45 degrees with absorption axes 4631 and 4632.

In the MVA-mode liquid crystal panel having regions arranged in a mixed manner in one pixel, in which the liquid crystal molecules tilt in different directions when a voltage is applied thereto, it is desirable that the liquid crystal molecules tilt only in the four directions shown in FIG. 46D. Actually, however, some liquid crystal molecules tilt in directions other than the four directions shown in FIG. 46D.

Figure 47:
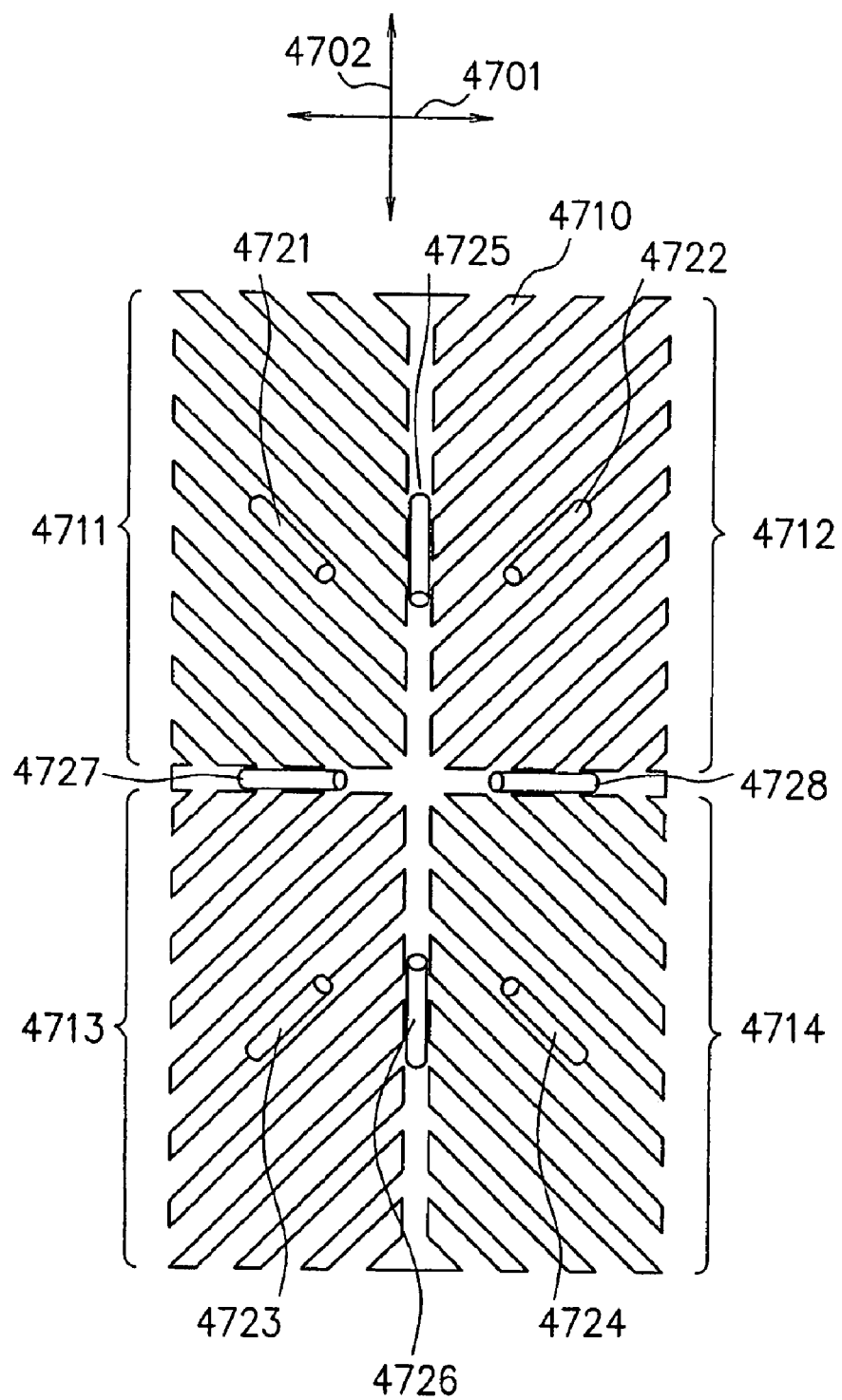
FIG. 47 is a view showing an electrode configuration of four domains.

An MVA-mode liquid crystal panel having an electrode 4710 with four domains 4711 to 4714 shown in FIG. 47 is explained as an example. Liquid crystal molecules 4721 to 4724 tilt in different four directions by a fine slit electrode 4710 which is formed to form angles of 45 degrees with absorption axes 4701 and 4702 of a pair of polarizing elements. At boundary regions where the regions are adjacent to each other, however, liquid crystal molecules 4725 to 4728 are forced to tilt in directions parallel or perpendicular to the absorption axes 4701 and 4702.

Light does not pass through the regions where the liquid crystal molecules 4725 to 4728 tilt in directions parallel or perpendicular to the absorption axes 4701 and 4702. Therefore, in the electrode structure shown in FIG. 47, a black region in the shape of a cross appears in a white display, which causes the transmittance to greatly decrease.

In this embodiment of the invention, the directions of the domain control means periodically disposed at fine pitches in the MVA-mode liquid crystal panel include the directions to form angles of 45 degrees with the absorption axes of the polarizing elements and another direction.

As has been described by now, in the MVA-mode liquid crystal panel, when the liquid crystal molecule tilts in a direction other than the directions to form angles of 45 degrees with the absorption axes of the polarizing elements, the region does not transmit light, which is a cause of decrease in the transmittance. Means for solving this problem is explained hereafter.

A first means is the addition of a chiral material to a liquid crystal material. The addition of the chiral material allows the liquid crystal molecule to tilt while twisting from one substrate to the other substrate when a voltage is applied thereto. This utilizes the similar principle to that of the horizontally aligned liquid crystal panel which is generally called TN mode. Therefore, the twisted angle of the liquid crystal molecules is desirably about 90 degrees.

In other words, it is desirable that d/p=¼, and, at least, it should be satisfied that ⅛≦d/p≦⅜, where the cell gap of the liquid crystal panel is d, and the helical pitch of the chiral material is p.

Figure 48:
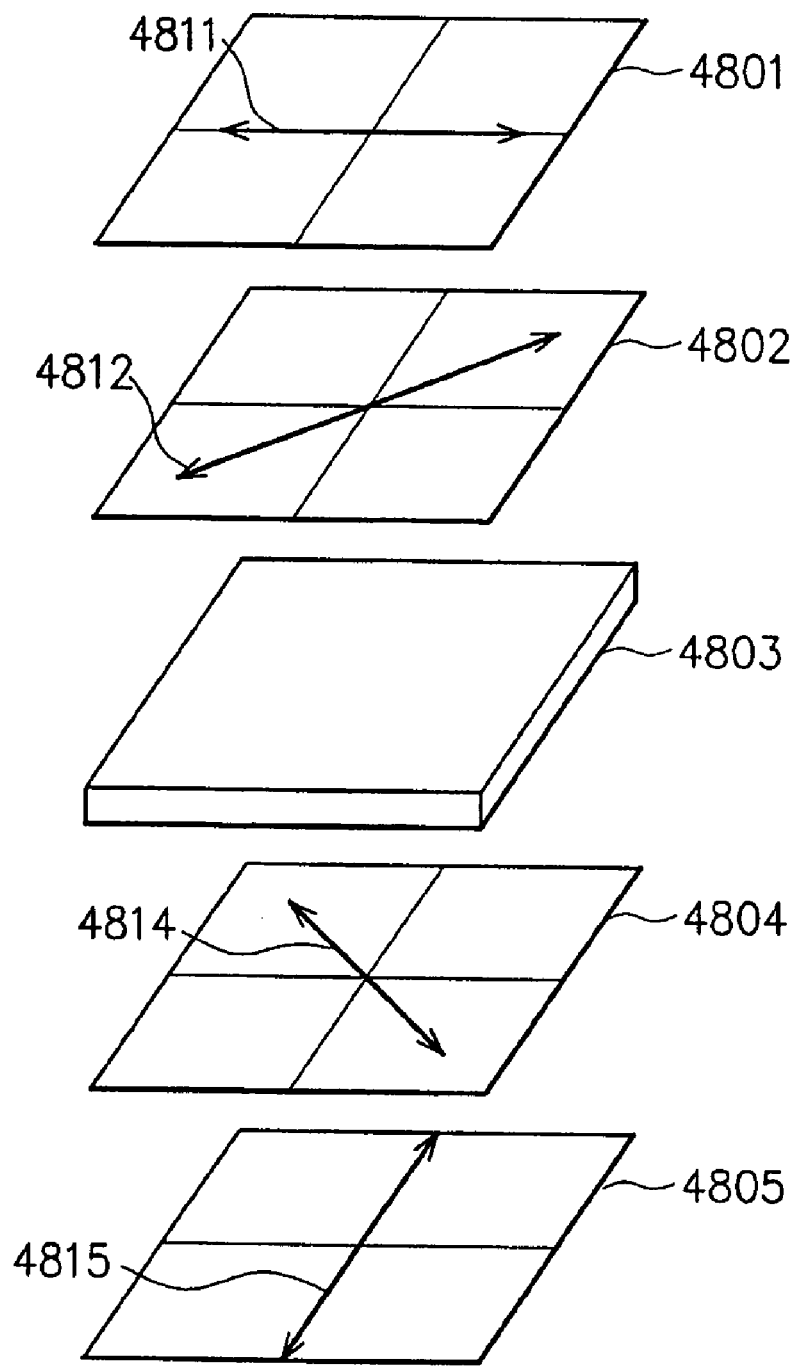
FIG. 48 is a view showing a film configuration.

A second means is, as shown in FIG. 48, the arrangement of a pair of quarter wave plates 4802 and 4804 on both sides of a liquid crystal panel 4803, and further arrangement of a pair of polarizing elements 4801 and 4805 on both sides thereof. Retardation axes 4812 and 4814 of the quarter wave plates 4802 and 4804 and absorption axes 4811 and 4815 of the adjacent polarizing elements 4801 and 4805 form angles of 45 degrees respectively. The arrangement is made such that the retardation axes 4812 and 4814 of the quarter wave plates 4802 and 4804 are perpendicular to each other, and the absorption axes 4811 and 4815 of the polarizing elements 4801 and 4805 are perpendicular to each other.

The light passed through the polarizing element becomes linearly polarized light, and then passes through the quarter wave plate to be circularly polarized light. In this event, the intensity of the passed light does not depend on the tilt direction of the liquid crystal molecule but is determined only by the retardation of a liquid crystal cell.

Figure 49A:
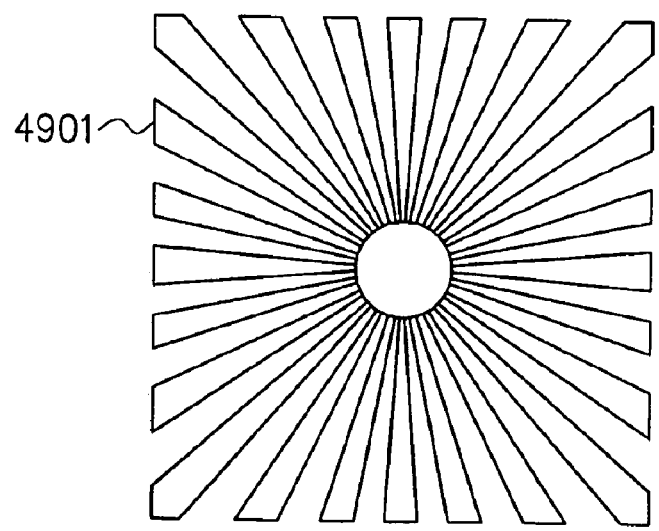
FIGS. 49A to 49C are views showing configurations of the pixel electrode.
Figure 49B:
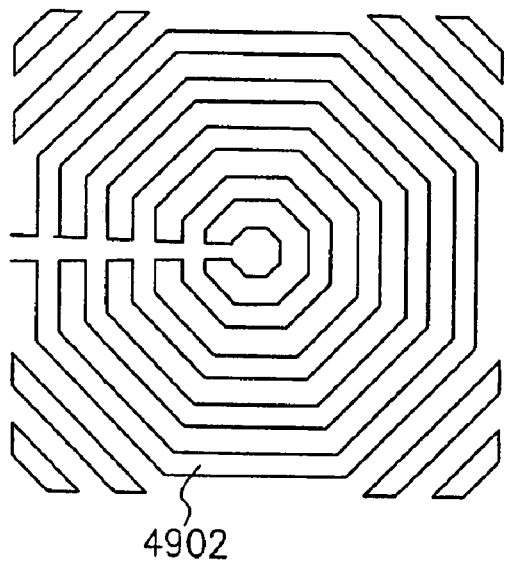
Figure 49C:
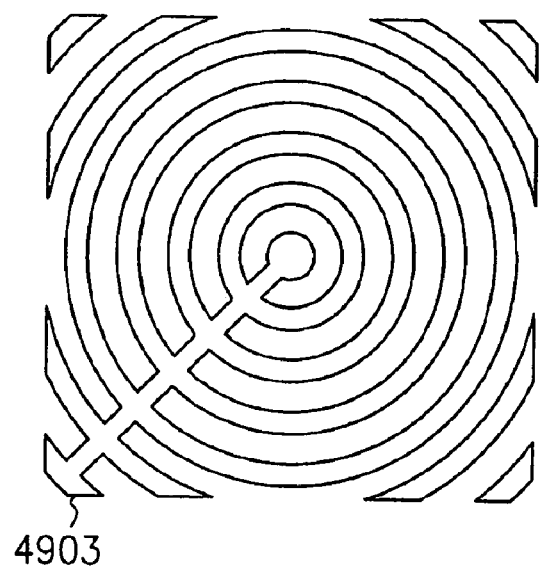

FIGS. 49A to 49C show examples of the pattern of the periodically disposed domain control means (ITO pixel electrode). As shown in FIG. 49A, pixel electrodes 4901 which are the domain control means are disposed in an almost radial pattern, which makes it possible to change the tilt directions of the liquid crystal molecules from almost 0 degrees to 360 degrees sequentially.

Similarly, it is possible to realize various variations of pattern such as a pattern of pixel electrodes 4902 in which the liquid crystal molecules tilt in eight directions as shown in FIG. 49B, or a pattern of concentric pixel electrodes 4903 as shown in FIG. 49C. The pixel electrodes 4901 to 4903 in FIGS. 49A to 49C are one connected pixel electrode respectively.

As described above, the liquid crystal panel is structured such that the directions of the domain control means periodically disposed at fine pitches include the directions to form angles of 45 degrees with the absorption axes of the polarizing elements and other directions, and added with the chiral material or is combined with the ¼ plates, so that a wide viewing angle and high brightness can be realized at the same time.

This embodiment is explained more specifically. An overall electrode is formed over the entire surface of the display region on one of the pair of substrates constituting the liquid crystal panel. On the other substrate, pixel electrodes are formed. The pixel electrode, as shown in FIG. 49A, is composed of the fine slit electrodes 4901 in a radial pattern. Further, on the substrate, a color filter, gate bus lines, data bus lines, TFT devices and the like are formed.

Vertical alignment films are formed on both substrates. Both the substrates are bonded together through spacers, and a nematic liquid crystal having negative dielectric anisotropy, which is added with a chiral material to have a relationship d/p=¼, is sealed therebetween to produce a liquid crystal panel. On both sides of the liquid crystal panel, polarizing elements are arranged in such a manner that the absorption axes thereof are perpendicular to each other.

Another configuration example is explained. An overall electrode is formed over the entire surface of the display region on one of the pair of substrates constituting the liquid crystal panel. On the other substrate, pixel electrodes are formed. The pixel electrode, as shown in FIG. 49A, is composed of the fine slit electrodes 4901 in a radial pattern. Further, on the substrate, a color filter, gate bus lines, data bus lines, TFT devices and the like are formed.

Vertical alignment films are formed on both substrates. Both the substrates are bonded together through spacers, and a nematic liquid crystal having negative dielectric anisotropy is sealed therebetween to produce a liquid crystal panel.

On both sides of the liquid crystal panel, polarizing elements are arranged in such a manner that the absorption axes thereof are perpendicular to each other. A quarter wave plate is disposed between the liquid crystal panel and each of the polarizing elements such that the retardation axis of the quarter wave plate and the absorption axis of the adjacent polarizing element form an angle of 45 degrees, and the retardation axes of the quarter wave plates are perpendicular to each other.

According to this embodiment, as shown in FIG. 48, the liquid crystal panel 4803 has the liquid crystal sealed between the pair of substrates. The pair of polarizing elements 4801 and 4805 are arranged on both sides of the liquid crystal panel 4803 such that the absorption axes thereof are perpendicular to each other. The domain control means are provided on the surface of at least one of the pair of substrates constituting the liquid crystal panel 4803. The domain control means include a periodical pattern of any of or a combination of a projection such as a protrusion, a depression, or a slit provided in the electrode (FIG. 47) to control the alignment of the liquid crystal molecules in the liquid crystal panel.

As shown in FIG. 47, the alignment directions of the liquid crystal molecules 4721 to 4728 by the domain control means include the four directions to form angles of 45 degrees with the absorption axes 4701 and 4702 of the polarizing elements and other directions. In the liquid crystal panel, the liquid crystal molecules are almost vertically aligned with respect to the substrates when no voltage is applied thereto and are controlled by the domain control means to tilt in a plurality of directions in each pixel when a voltage is applied thereto.

As shown in FIGS. 49A to 49C, the liquid crystal panel may include a region where the alignment directions of the liquid crystal molecules by the domain control means sequentially change, a region where they sequentially change from 0 degrees to 360 degrees. In FIG. 49A, the liquid crystal panel includes a region where the domain control means are arranged in a radial pattern, in which the width of the domain control means increases as it goes outward from the center of the radial pattern. In FIG. 49C, the liquid crystal panel includes a region where the domain control means are concentrically arranged.

The liquid crystal panel is added with the chiral material in its liquid crystal material. The condition ⅛≦d/p≦⅜ is satisfied, where the cell gap of the liquid crystal panel is d and the helical pitch of the chiral material is p.

As shown in FIG. 48, the pair of quarter wave plates 4802 and 4804 are provided between the pair of polarizing elements 4801 and 4805 in such a manner to interpose the liquid crystal panel 4803 therebetween. The retardation axes of the pair of quarter wave plates 4802 and 4804 and the absorption axes of the pair of polarizing elements 4801 and 4805 adjacent thereto form angles of 45 degrees respectively, and the retardation axes of the pair of quarter wave plates 4802 and 4804 are perpendicular to each other.

As described above, according to this embodiment, it becomes possible to realize a liquid crystal display device with a wide viewing angle and high brightness.

Seventh Embodiment

The MVA alignment control technique includes the followings.

(1) Alignment Control by a Protrusion or a Slit

Figure 50A:
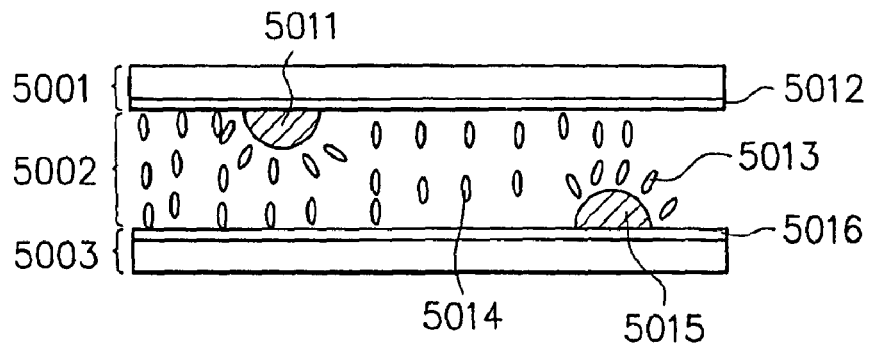
FIGS. 50A to 50D are views showing alignment controls by a protrusion and a slit.
Figure 50B:
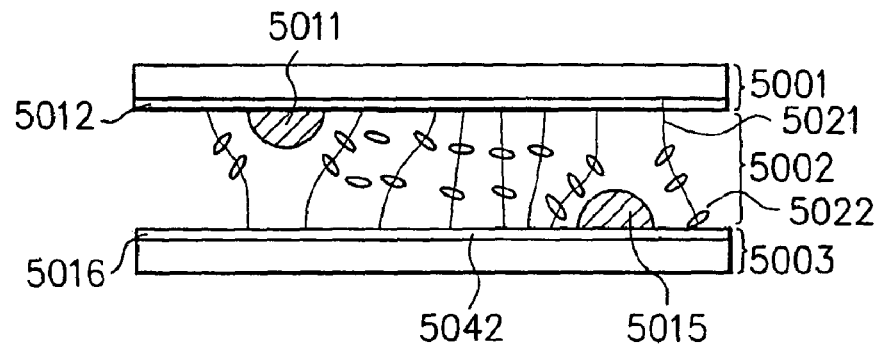

FIGS. 50A and 50B show the alignment control by the protrusion. A liquid crystal layer 5002 is provided between an opposite substrate 5001 and a TFT substrate 5003. The opposite substrate 5001 is provided with a transparent electrode 5012 and a protrusion 5011. The TFT substrate 5003 is provided with a transparent electrode 5016 and a protrusion 5015. As shown in FIG. 50A, liquid crystal molecules 5013 near the protrusions 5011 and 5015 tilt in accordance with the shapes of the protrusions 5011 and 5015 where no voltage is applied thereto. A liquid crystal molecule 5014 which is distant from the protrusions 5011 and 5015 is vertically aligned. As shown in FIG. 50B, electric fields 5021 are formed in accordance with the shapes of the protrusions 5011 and 5015 where a voltage is applied. A force is exerted on a liquid crystal molecule 5022 to align it in a direction perpendicular to the electric field 5021. Thus, the alignment of the liquid crystal molecules can be controlled by the protrusion 5011 and 5015.

Figure 50C:
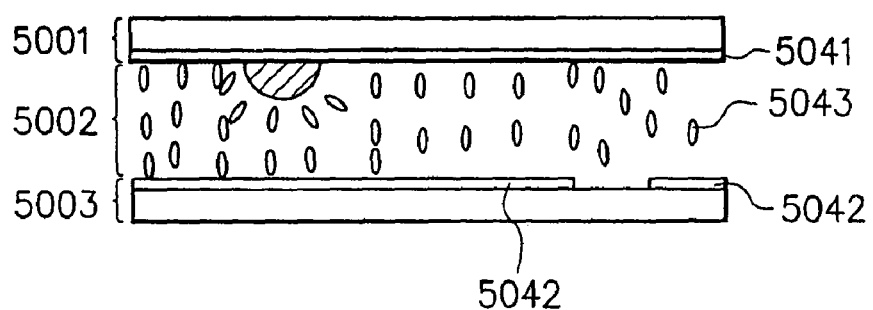
Figure 50D:
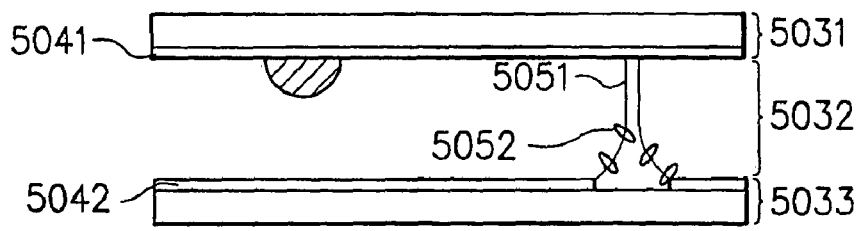

FIGS. 50C and 50D show the alignment control by the electrode slit. A liquid crystal layer 5032 is provided between an opposite substrate 5031 and a TFT substrate 5033. The opposite substrate 5031 is provided with a transparent electrode 5041. The TFT substrate 5033 is provided with a transparent electrode 5042 having a slit. As shown in FIG. 50C, a liquid crystal molecule 5043 is vertically aligned with respect to the substrates where no voltage is applied thereto. As shown in FIG. 50D, an oblique electric field 5051 occurs by the slit of the transparent electrode 5042 where a voltage is applied. A force is exerted on a liquid crystal molecule 5052 to align it in a direction perpendicular to the electric field 5051. Thus, the alignment of the liquid crystal molecule can be controlled by the electrode 5042 in a slit form. It should be noted that the motion of the liquid crystal molecules near the protrusion and near there are the same as those in FIG. 50B, and thus the illustration thereof is omitted.

(2) Alignment Control by an Auxiliary Protrusion or an Auxiliary Slit

Figure 51A:
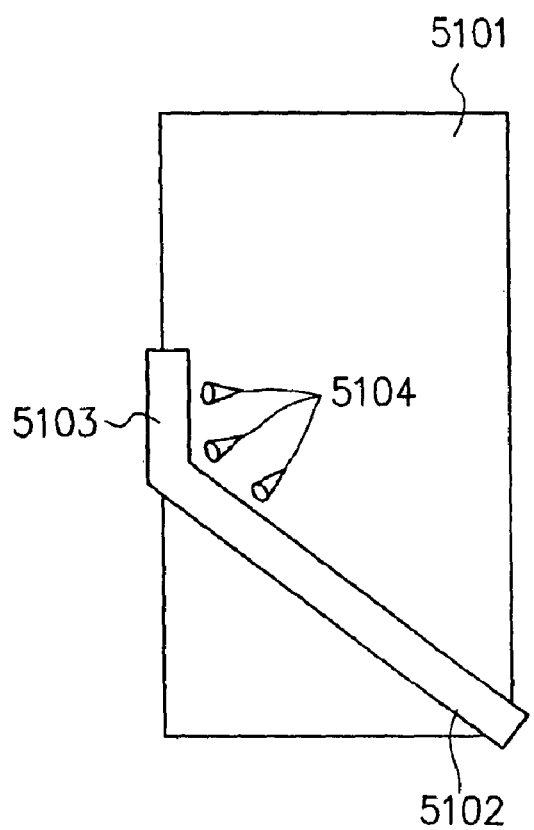
FIGS. 51A to 51C are views showing alignment controls by an auxiliary protrusion and an auxiliary slit.
Figure 51C:
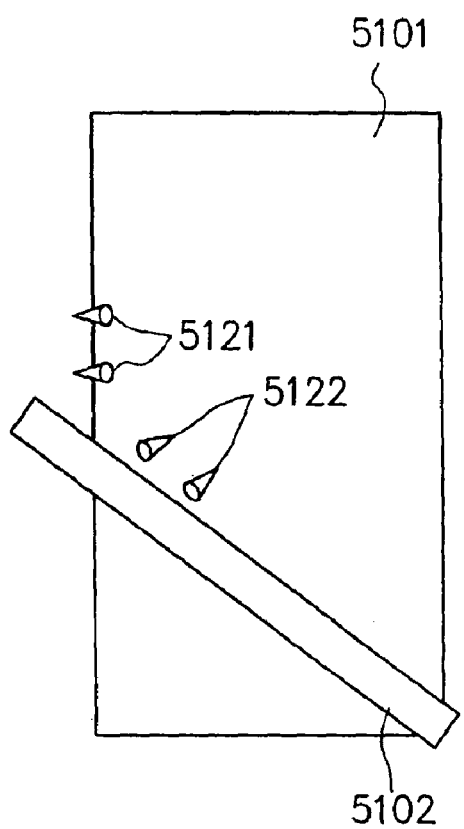

FIG. 51A shows the alignment control by the auxiliary protrusion. A pixel electrode 5101 is provided on the TFT substrate, and a protrusion 5102 is provided on the opposite substrate. Further, an auxiliary protrusion 5103 is provided on the opposite substrate corresponding to an edge part of the pixel electrode 5101. It is possible to match the alignment directions of the liquid crystal molecules 5104 between the protrusion 5102 and the auxiliary protrusion 5103. If there is no auxiliary protrusion 5103, the alignment of liquid crystal molecules 5122 controlled by the protrusion 5102 and the alignment of liquid crystal molecules 5121 controlled by the electric field at the edge part of the pixel electrode 5101 compete with each other as shown in FIG. 51C.

Figure 51B:
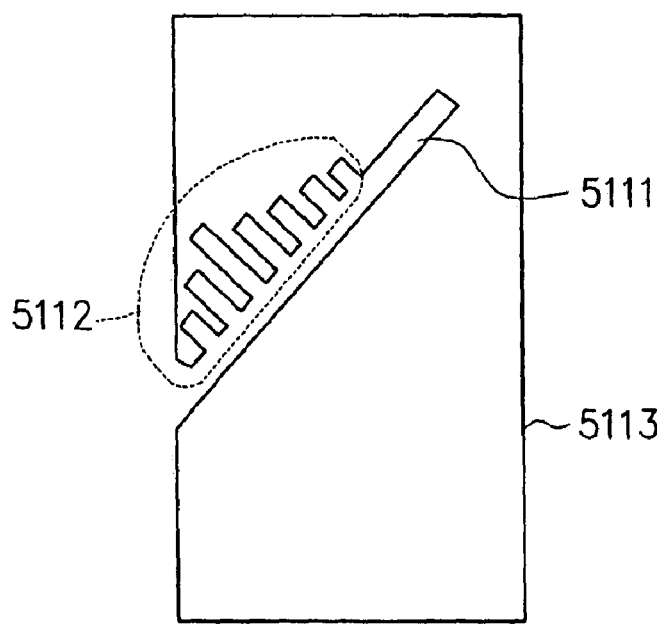

FIG. 51B shows the alignment control by the auxiliary slit. A pixel electrode 5113 is provided with a slit 5111. Further, auxiliary slits 5112 are provided near an edge part of the pixel electrode 5113. It is possible to prevent competition of the alignment by the edge part of the pixel electrode 5113 and the alignment by the slit 5111 to match the alignment directions of the liquid crystal molecules.

(3) Alignment Control by a Fine Pattern (Protrusions or Slits)

Figure 52A:
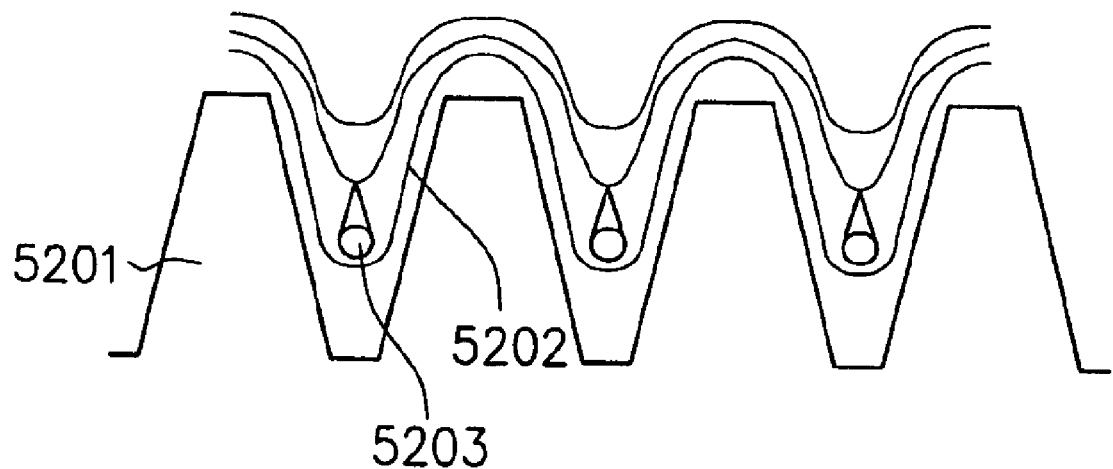
FIGS. 52A and 52B are views showing alignment controls by fine slits.
Figure 52B:
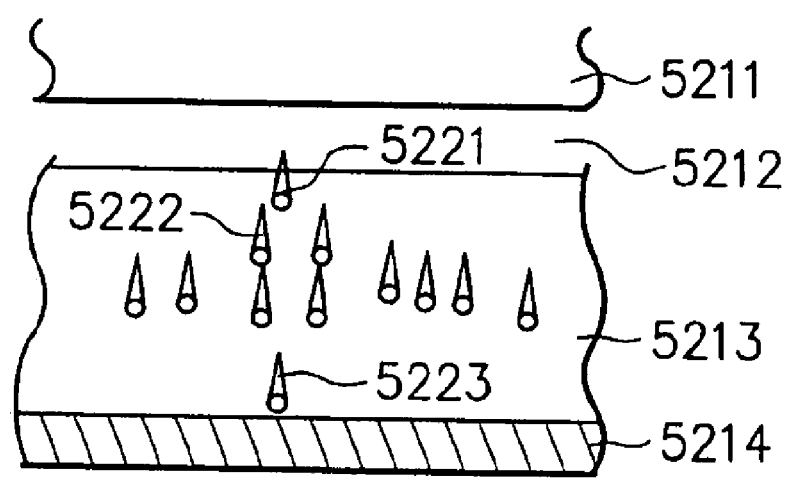

FIG. 52A shows the alignment control by the fine slits. A pixel electrode 5201 has fine slits. An electric field 5202 is formed in accordance with the shape of the silts. A liquid crystal molecule 5203 is aligned in accordance with the electric field 5202. As shown in FIG. 52B, a slit 5212 is provided between pixel electrodes 5211 and 5213, and further a protrusion 5214 is provided. The alignment direction of a liquid crystal molecule 5221 when a voltage is applied is controlled by an electric field occurring near the slit 5212 of the pixel electrode 5213. The alignment of a liquid crystal molecule 5223 is controlled by the protrusion 5214. If the fine slits in FIG. 52A are formed in the pixel electrode 5213, the alignment of a liquid crystal molecule 5222 between the liquid crystal molecules 5221 and 5223 can also be controlled.

(4) Alignment Control by a Pattern in the Shape of Paddy Field

Figure 53:
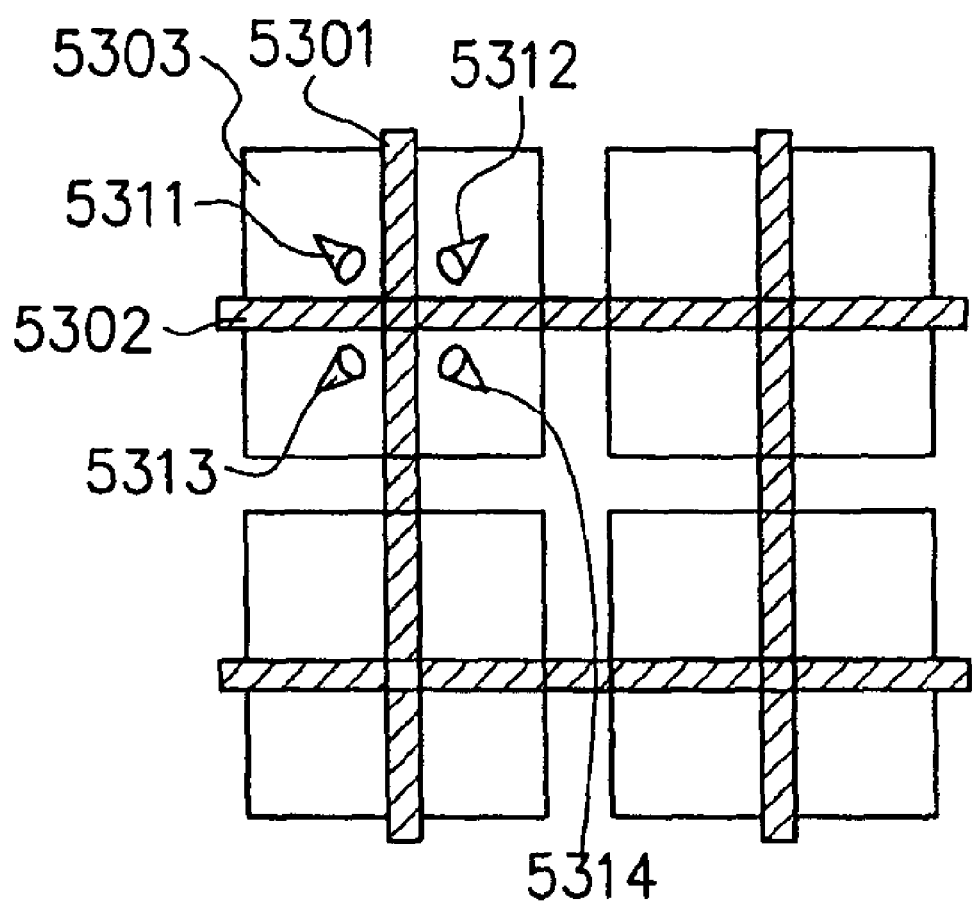
FIG. 53 is a view showing an alignment control by a protrusion in a cross pattern.

FIG. 53 shows the alignment control by the pattern in the shape of paddy field (cross shape). A pixel electrode 5303 is provided on the TFT substrate. Protrusions 5301 and 5302 in a cross shape are provided on the opposite substrate. The protrusions 5301 and 5302 forms four regions to align in different directions liquid crystal molecules 5311 to 5314 in each region.

The above described alignment controls (1) to (4) have respective characteristics, and thus it is desirable to appropriately use them in accordance with application. However, it is necessary to arrange many protrusions and slits, for example, in the control by (1), or some slits might exist just inside the pixel edge as in the top left and the bottom left corner part of the pixel electrode 1404 in the layout in FIG. 14. Because the pixel edge is equivalent to the slit, controls by the pixel edge and the slits are adjacent to influence on each other at the top left and the bottom left corner part. An unstable domain occurs at the pixel corner, which decreases the brightness.

It is difficult to completely control the alignment of the entire region in the pixel by the control of only one kind of controls (1) to (4). Especially, this problem becomes serious in realizing:

a) high brightness (increase in transmittance)
b) high definition
c) fast response.

A combination of the control means of (1) to (4) suitable for important parts of the pixel in a compound manner is more effective than separate performance of the control means.

FIG. 54 shows a first configuration example. A pixel electrode is provided in correspondence with a data line 5401 and a gate line 5402. First, fine slits 5416 are laid out at pixel corner parts to facilitate the layout at the corner parts. In FIG. 54, it is just needed to lay out two linear protrusions 5411 and 5417 in the pixel and extend the fine slits 5416 therefrom toward the pixel corners. This results in not only easy layout but also no formation of unstable domain to increase the transmittance. The alignment is controlled by, in addition to the above, a slit 5412, fine slits 5415, auxiliary slits 5414 and auxiliary protrusions 5413. It should be noted that the protrusions and the auxiliary protrusions are formed on the opposite substrate, and the data line, the gate line, the pixel electrode and the electrode slits are provided on the TFT substrate.

With this configuration, the transmittance can be improved by 10% to 20% as compared to that by the technique (1) by itself. In the pixel, there are a part where the alignment direction of the liquid crystal is preferably changed in a range of 90 degrees or less and a part where it is preferably changed in a range of 90 degrees to 180 degrees. For example, the control by the protrusion of (1) is a control means suitable for changing the alignment direction by 180 degrees, but when the control is applied to the part where 90-degree change is required, it is difficult to perform an ideal control.

The alignment control (1) is applicable to 180 degrees, the alignment controls (2) and (4) are applicable to 90 degrees, and the alignment control (3) is applicable to either above angle depending on its own angle.

FIG. 54 is explained in more detail. The fine slits 5416 are extended to the top right and the bottom right corner of the pixel to fit them to the shapes of the corners. The fine slits 5415 of (3) are provided in a direction perpendicular to the main slit 5412 to enhance the controllability. Further, the fine slits 5415 at the pixel edge part are partially made deep to make them (2) the auxiliary fine slits 5414 to prevent occurrence of an abnormal domain. Of course, (1) the protrusions 5411 and 5417, which are the base of MVA are provided, that is, the techniques of (1) to (3) are laid out at appropriate parts. The transmittance thereof is improved to be 1.15 times as compared to the control only by (1) the protrusion and the slit which are the base of MVA.

Figure 55:
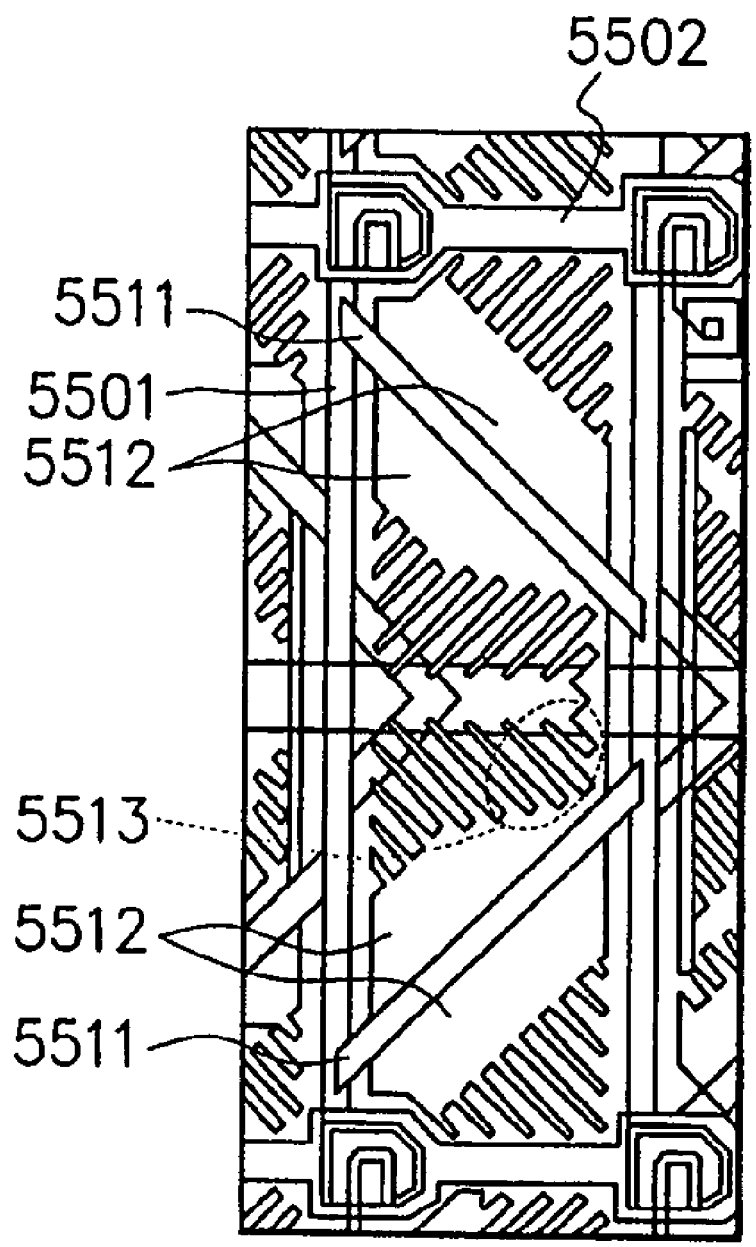
FIG. 55 is a view showing a layout of the liquid crystal display device.

FIG. 55 shows a second configuration example. The TFT substrate is provided with a data line 5501, a gate line 5502, a pixel electrode 5512 and auxiliary fine electrode slits 5513. The opposite substrate is provided with protrusions 5511. In the second configuration example, the technique of (3) is more positively used as compared to the first configuration example, in which the fine slits 5513 are provided to match the shapes of pixel corners and a part where the alignment direction changes 90 degrees at the pixel center. The number of domains in this case is only four, which can suppress loss in transmittance at an alignment divided part to a minimum. The transmittance further improves to be 1.09 times as compares to the first configuration example.

Figure 56:
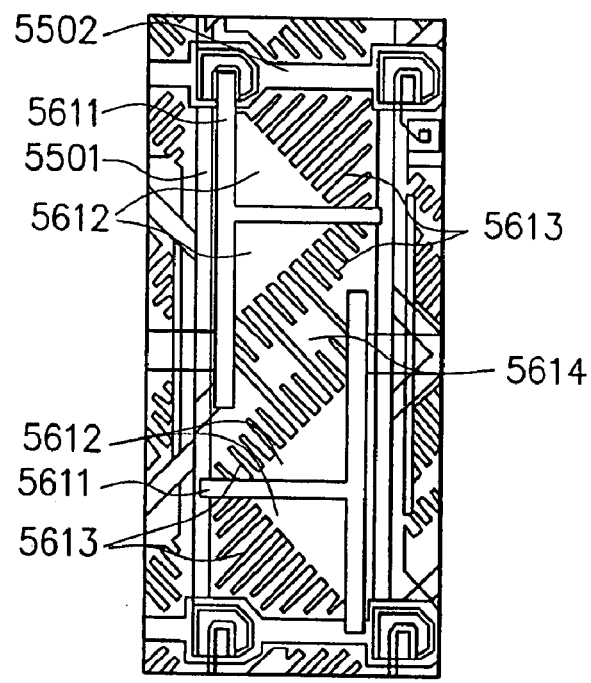
FIG. 56 is a view showing a layout of the liquid crystal display device.

FIG. 56 shows a third configuration example. The TFT substrate is provided with the data line 5501, the gate line 5502, a pixel electrode 5612 and auxiliary fine electrode slits 5613. The opposite substrate is provided with protrusions 5611. The number of domains of the third configuration example is also four that is the same as in the second configuration example. The third configuration example basically resembles the second configuration example, but differs therefrom in that the protrusion 5611 is disposed in the letter T (controls (2) and (4)) and that a main slit 5614 is obliquely provided at the pixel center. The third configuration example includes all of the control methods of (1) to (4). The transmittance improves 1.12 times as compared to the first configuration example.

Figure 57:
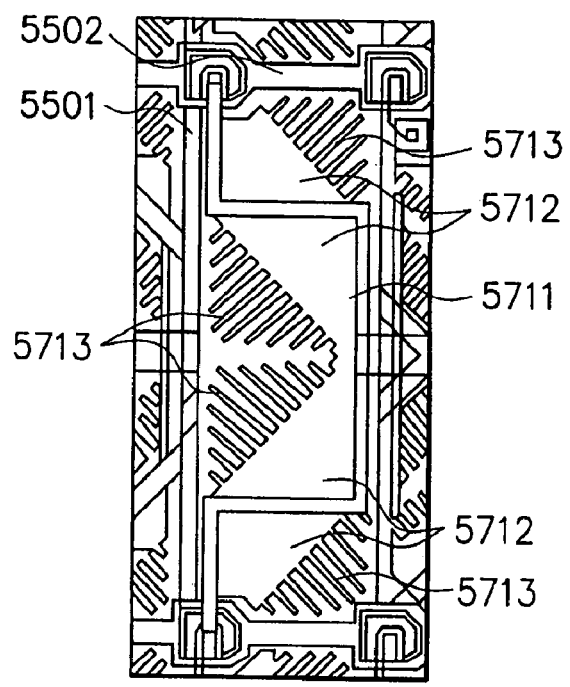
FIG. 57 is a view showing a layout of the liquid crystal display device.

FIG. 57 shows a fourth configuration example. The TFT substrate is provided with the data line 5501 and the gate line 5502, a pixel electrode 5712 and auxiliary fine electrode slits 5713. The opposite substrate is provided with a protrusion 5711. The fourth configuration example resembles the third configuration example but differs therefrom in the manner of disposing the protrusion 5711. The transmittance improves by about 10% as compared to that of the first configuration example.

Figure 58:
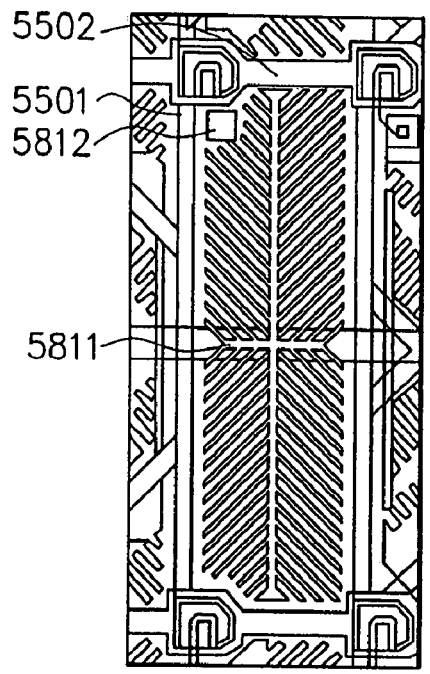
FIG. 58 is a view showing a layout of the liquid crystal display device.
Figure 59:
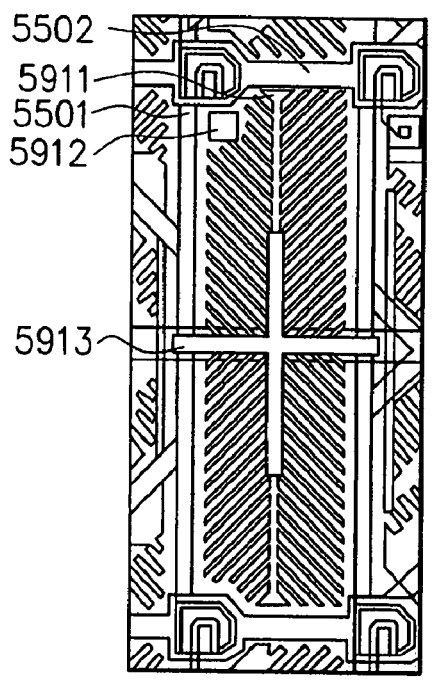
FIG. 59 is a view showing a layout of the liquid crystal display device.

FIG. 58 to FIG. 60 show fifth configuration examples. In FIG. 58, the TFT substrate is provided with the data line 5501, the gate line 5502, a pixel electrode 5811 and a contact region 5812. In FIG. 59, the TFT substrate is provided with the data line 5501, the gate line 5502, a pixel electrode 5911 and a contact region 5912, and the opposite substrate is provided with a protrusion 5913. In FIG. 60, the TFT substrate is provided with the data line 5501, the gate line 5502, a pixel electrode 6011 and a contact region 6012, and the opposite substrate is provided with a protrusion 6013. In each of the fifth configuration examples, the fine electrodes join together in such a manner that they are connected together by a cross pattern at the center of the pixel. Any of the configuration examples has a layout made by combining the controls (2) to (4) in a complex manner. The transmittance improves by about 20% as compared to that of the first configuration example.

Figure 62:
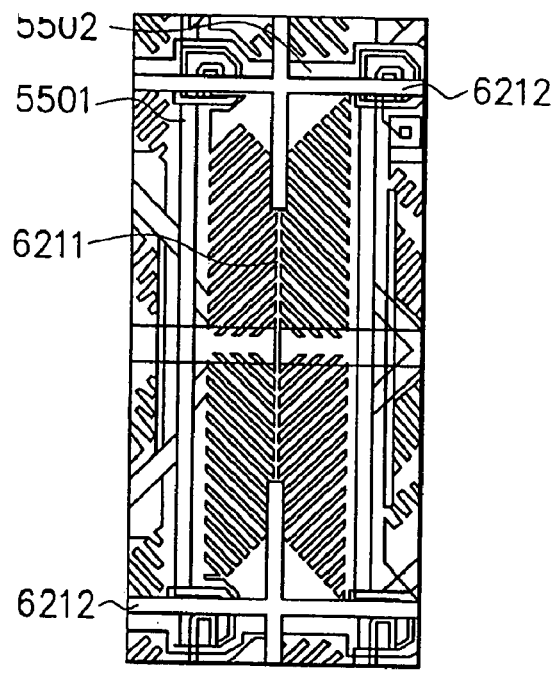
FIG. 62 is a view showing a layout of the liquid crystal display device.

FIG. 61 and FIG. 62 show sixth configuration examples. In FIG. 61, the TFT substrate is provided with the data line 5501, the gate line 5502 and a pixel electrode 6111, and the opposite substrate is provided with protrusions 6112. In FIG. 62, the TFT substrate is provided with the data line 5501, the gate line 5502 and a pixel electrode 6211, and the opposite substrate is provided with protrusions 6212. The sixth configuration examples are similar to the fifth configuration examples, but differ therefrom in the method of connecting the fine electrodes in which they are connected by a linear pattern at the center of the pixel. The transmittance improves by about 20%, as in the fifth configuration examples, as compared to that of the first configuration example. Each of the second to sixth configuration examples, which has four domains, is more advantageous when it is applied to a higher definition case.

Figure 63:
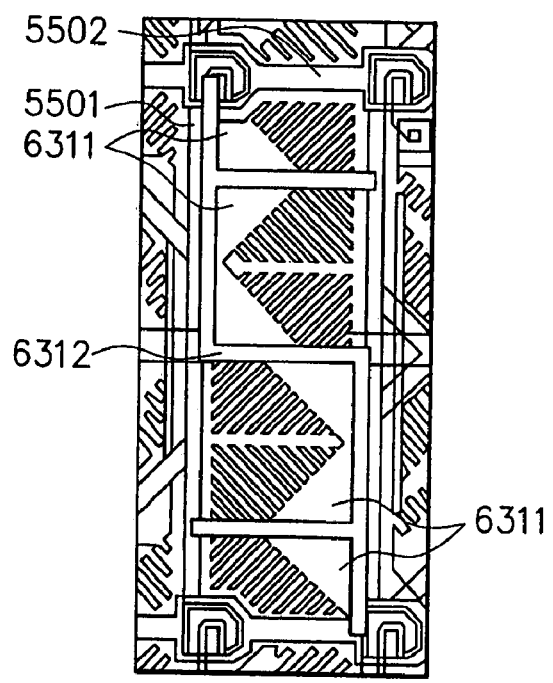
FIG. 63 is a view showing a layout of the liquid crystal display device.
Figure 64:
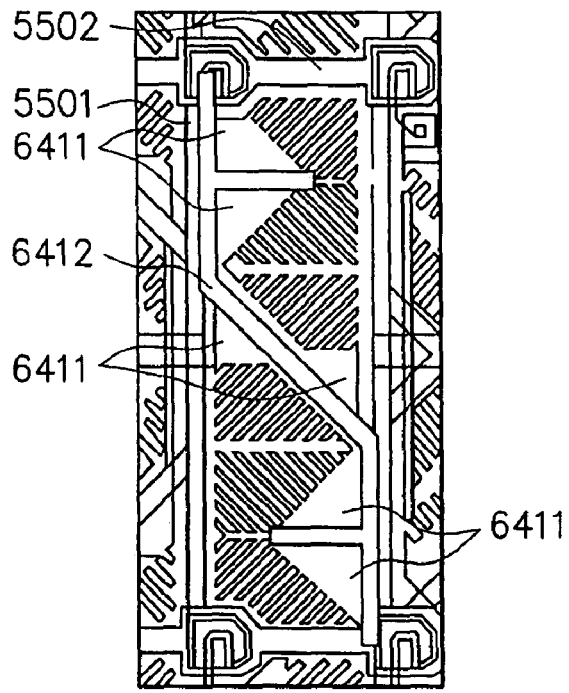
FIG. 64 is a view showing a layout of the liquid crystal display device.
Figure 65:
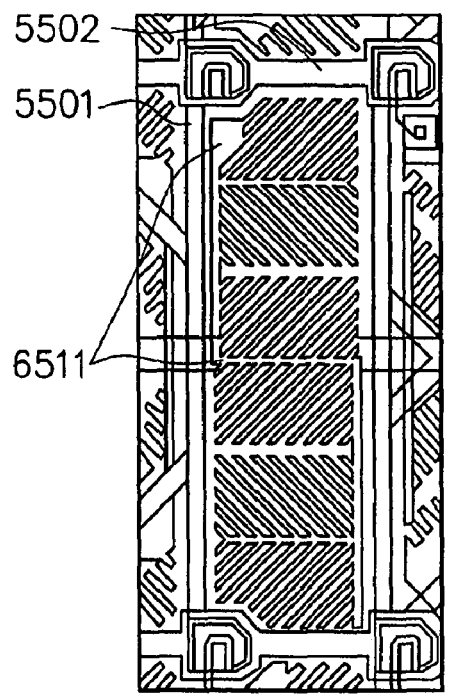
FIG. 65 is a view showing a layout of the liquid crystal display device.
Figure 66:
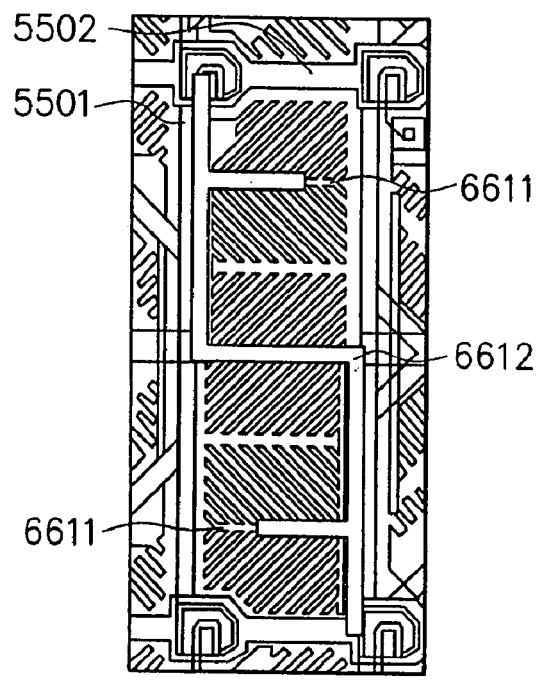
FIG. 66 is a view showing a layout of the liquid crystal display device.

FIG. 63 to FIG. 66 show seventh configuration examples. In FIG. 63, the TFT substrate is provided with the data line 5501, the gate line 5502 and a pixel electrode 6311, and the opposite substrate is provided with a protrusion 6312. In FIG. 64, the TFT substrate is provided with the data line 5501, the gate line 5502 a pixel electrode 6411, and the opposite substrate is provided with a protrusion 6412. In FIG. 65, the TFT substrate is provided with the data line 5501, the gate line 5502 and a pixel electrode 6511. FIG. 66, the TFT substrate is provided with the data line 5501, the gate line 5502 and a pixel electrode 6611, and the opposite substrate is provided with a protrusion 6612. Each of the seventh configuration examples has six divided domains. The seventh configuration examples are suitable for a relatively large pixel (which does not mean that the second to sixth configuration examples can not apply to a large pixel). This is because, if a large pixel is divided by a small division number, one divided region has a large area, resulting in a larger region to be covered by one control element. The transmittance in the seventh configuration examples also improves by about 10% as compared to that of the first configuration example.

Figure 67:
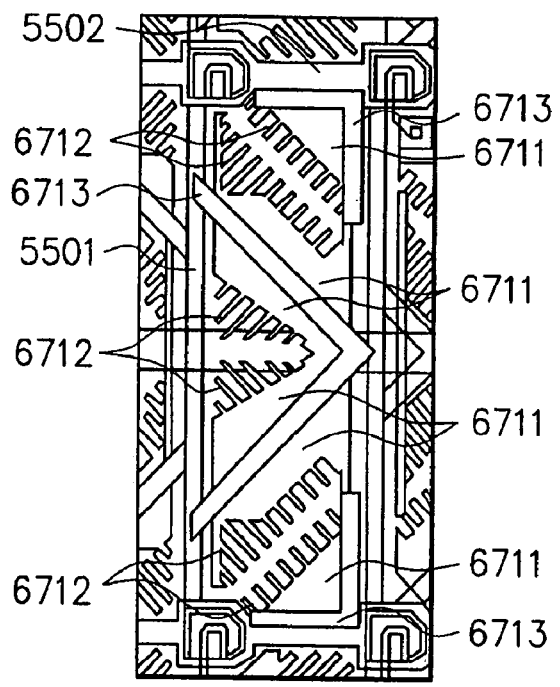
FIG. 67 is a view showing a layout of the liquid crystal display device.
Figure 68:
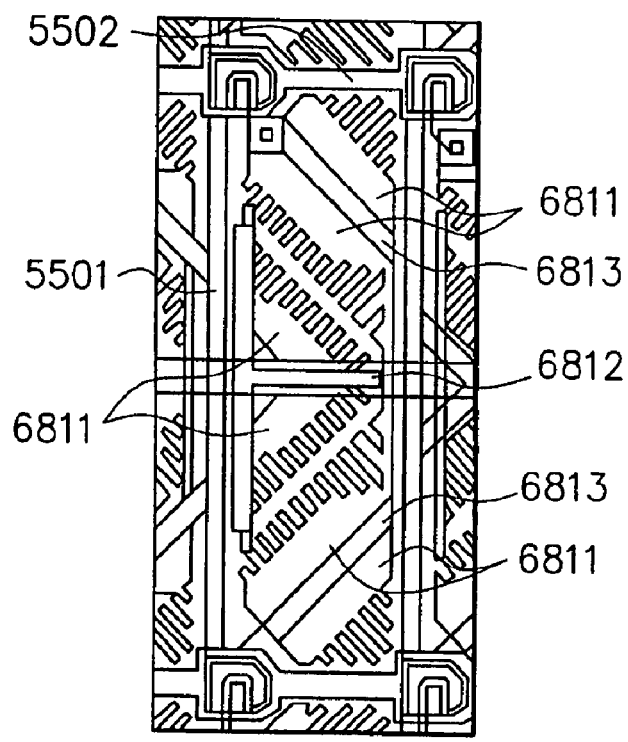
FIG. 68 is a view showing a layout of the liquid crystal display device.

FIG. 67 and FIG. 68 show eighth configuration examples. In FIG. 67, the TFT substrate is provided with the data line 5501, the gate line 5502, a pixel electrode 6711 and fine slits 6712, and the opposite substrate is provided with protrusions 6713. In FIG. 68, the TFT substrate is provided with the data line 5501, the gate line 5502, a pixel electrode 6811 and protrusions 6813, and the opposite substrate is provided with a protrusion 6812. The eighth configuration examples have six domains, which are improved versions of the first configuration example. The transmittance becomes higher than that of the first configuration example inversely to the area of the protrusion existing in the pixel which is smaller than that of the first configuration example. The transmittance improves by about 5% as compared to that of the first configuration example.

A ninth configuration example adopts a slightly different idea from that of the other configuration examples. Although FIG. 67 is a view showing only one pixel, in the ninth configuration example, a pixel adjacent to this pixel is laid out in a manner horizontally reversed (the adjacent pixels are not necessarily reversed, but pixels in close vicinity should be reversed). Two pixels are brought into one set to obtain domains in four directions. The transmittance improves by about 10% as compared to that of the first configuration example.

Figure 69:
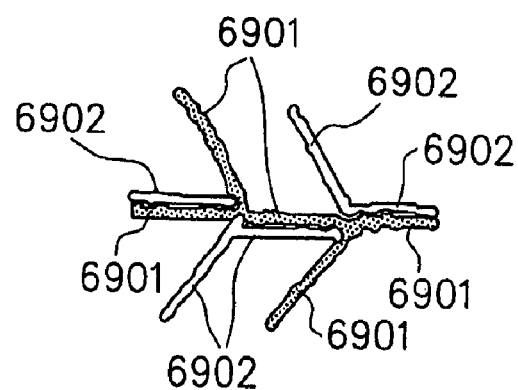
FIG. 69 is a view showing a layout of the protrusions.

FIG. 69 shows a tenth configuration example. A protrusion 6901 is provided on the opposite substrate (upper substrate), and a protrusion 6902 is provided on the TFT substrate (lower substrate). At a region where the alignment direction is changed 90 degrees, the protrusion patterns on the upper and lower substrates are interchanged. This allows the directions of liquid crystal molecules to be changed without any difficulty, resulting in stable alignment. As a result of applying this pattern to the center of the pixel of the first configuration example, the transmittance improves by about 0.5%.

The above-described configuration examples are to be considered as illustrative, and the above-described improvement in transmittance can be expected by basically combining the controls (1) to (4) at appropriate parts (improper combination naturally decreases effect). Further, it is, of course, possible to further stable the alignment using a polymerization method of polymerizing monomers blended in the liquid crystal, thereby increasing the response speed. Moreover, it is possible to further enhance the transmittance by combining with a quarter wave plate.

According to this embodiment, as shown in FIG. 50A, the surfaces of the two substrates 5001 and 5003 have been subjected to vertical alignment processing, so that the liquid crystal layer 5002 is vertically aligned where no voltage is applied thereto. As shown in FIG. 50B, the liquid crystal layer 5002 is a negative type liquid crystal layer sandwiched between the substrates, in which liquid crystal molecules point in a direction perpendicular to the electric fields 5021 caused by application of voltage. The domain control means conducts control such that the liquid crystal molecules tilt in directions of a plurality of liquid crystal domains in each pixel, and includes first and second domain control means. The first domain control means is provided in a part of the pixel or a peripheral region thereof to vary the alignment direction of the liquid crystal in a range of 90 degrees to 180 degrees across the center of the partially provided domain control means. The second domain control means varies the alignment direction of the liquid crystal in a range of 0 degrees to 90 degrees. The first and second domain control means preferably control the liquid crystal domain to have 4 to 12 domains which are formed in the pixel.

The first domain control means is composed of any of or a combination of some of: the dielectric projection (protrusion) 5214 extending in a direction differing from the direction of the liquid crystal domain by 45 degrees to 90 degrees (FIG. 52B); the electrode slits 5213 and 5212 extending in the direction differing from the direction of the liquid crystal domain by 45 degrees to 90 degrees (FIG. 52B); the electrode slits 5201 elongated in the direction of the liquid crystal domain and periodically repeated in the direction differing from the direction of the liquid crystal domain by 45 degrees to 90 degrees (FIG. 52A); and the dielectric projections elongated in the direction of the liquid crystal domain and periodically repeated in the direction differing from the direction of the liquid crystal domain by 45 degrees to 90 degrees.

The second domain control means is the dielectric projections (protrusions) 5301 and 5302 extending in a direction differing from the direction of the liquid crystal domain by 0 degrees to 45 degrees (FIG. 53), or the electrode slit extending in a direction differing from the direction of the liquid crystal domain by 45 degrees.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

As described above, the proportions of a region where liquid crystal molecules tilt in a direction of 0 degrees to 180 degrees and a region where liquid crystal molecules tilt in a direction of 180 degrees to 360 degrees are made different to be appropriate proportions, which makes it possible to perform a suitable display even if a screen is viewed from the top or the bottom direction.

Further, the shape of a pixel electrode is formed in accordance with of a gate line and a data line, which allows the alignment directions of the liquid crystal molecules by the pixel electrode to match the alignment directions of the liquid crystal molecules by the gate line and the data line.

Furthermore, a half wave plate is provided between a pair of polarizing layers, which enables realization of a liquid crystal display device with a wide viewing angle and high brightness.

Moreover, a predetermined retardation film is provided between first and second polarizing plates, which enables realization of a liquid crystal display device with a wide viewing angle and high brightness.

Further, the alignment direction of the liquid crystal molecule of a liquid crystal panel and the optical axis of a quarter wave plate are arranged perpendicular to each other, which can prevent coloring of the display screen even if it is viewed at an incline angle.

Further, by virtue of a domain control means, the alignment directions of the liquid crystal molecules include directions to form angles of 45 degrees with the absorption axes of polarizing elements and other directions, which enables a display with high brightness.

Further, both first and second domain control means are provided, which improves controllability of the alignment of the liquid crystal in the entire pixel.

What is claimed is:

1. A liquid crystal display device, comprising:
  a pair of opposing substrates;
  a plurality of scan bus lines each extending in a first direction;
  a plurality of data bus lines each extending in a second direction;
  a plurality of pixels each including a pixel electrode; and
  a subsidiary capacitor bus (Cs) line extending into the plurality of pixels in the first direction and, in at least one pixel, the Cs bus line having a first portion extending in the first direction and a second portion extending from the first portion in the second direction different from the first direction;
  wherein the first portion comprises a first section and a second section which are defined by the second portion;
  the pixel electrode includes a backbone section, a plurality of comb-teeth sections extending from the backbone section and an overlapping part overlapping at least a part of the first section, at least a part of the second section or at least a part of the second portion of the Cs bus line in an overlapping area;
  the overlapping part includes at least a part of the backbone section; and
  wherein a metal layer is provided in the overlapping area of the at least one pixel, between the pixel electrode and the Cs bus line and extending in the first direction.

2. The liquid crystal display device as defined in claim 1, wherein the first portion of the Cs bus line is wider than the metal layer in the overlapping area.

3. The liquid crystal display device as defined in claim 1, wherein the metal layer is formed wider at a point of an area overlapping the connection point between the first and second portion of the Cs bus line.

4. A liquid crystal display device, comprising:
a pair of opposing substrates;
a plurality of scan bus lines each extending in a first direction;
a plurality of data bus lines each extending in a second direction;
a plurality of pixels each including a pixel electrode; and
a subsidiary capacitor bus (Cs) line extending into the plurality of pixels in the first direction and, in at least one pixel, the Cs bus line having a first portion extending in the first direction and a second portion extending from the first portion in the second direction different from the first direction;
wherein the first portion comprises a first section and a second section which are defined by the second portion;
the pixel electrode includes a backbone section, a plurality of comb-teeth sections extending from the backbone section and an overlapping part overlapping at least a part of the first section, at least a part of the second section or at least a part of the second portion of the Cs bus line in an overlapping area;
the overlapping part includes at least a part of the backbone section; and
wherein the overlapping part overlaps at least a part of the first section, at least a part of the second section, and at least a part of the second portion of the Cs bus line in the overlapping area.

* * * * *